(12) United States Patent
Dantus et al.

(10) Patent No.: US 8,675,699 B2
(45) Date of Patent: Mar. 18, 2014

(54) LASER PULSE SYNTHESIS SYSTEM

(75) Inventors: Marcos Dantus, Okemos, MI (US);
Vadim V. Lozovoy, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 679 days.

(21) Appl. No.: 12/692,326

(22) Filed: Jan. 22, 2010

(65) Prior Publication Data
US 2010/0187208 A1 Jul. 29, 2010

Related U.S. Application Data

(60) Provisional application No. 61/146,889, filed on Jan. 23, 2009.

(51) Int. Cl.
*H01S 3/10* (2006.01)
(52) U.S. Cl.
USPC ............................................. 372/25; 372/26
(58) Field of Classification Search
USPC ........................................................ 372/25, 26
See application file for complete search history.

(56) References Cited

U.S. PATENT DOCUMENTS

| | | | |
|---|---|---|---|
| 3,214,563 A | 10/1965 | Ford | |
| 3,611,182 A | 10/1971 | Treacy | |
| 3,919,881 A | 11/1975 | Metherell | |
| 3,988,704 A | 10/1976 | Rice et al. | |
| 4,167,662 A | 9/1979 | Steen | |
| 4,288,691 A | 9/1981 | Horton | |
| 4,394,780 A | 7/1983 | Mooradian | |
| 4,477,905 A | 10/1984 | Sweeney | |
| 4,512,660 A | 4/1985 | Goldberg | |
| 4,621,006 A | 11/1986 | Terry et al. | |
| 4,655,547 A | 4/1987 | Heritage et al. | |
| 4,746,193 A | 5/1988 | Heritage et al. | |
| 4,772,854 A | 9/1988 | Silberberg | |
| 4,812,776 A | 3/1989 | Sasaki | |
| 4,819,239 A | 4/1989 | Sharp et al. | |
| 4,834,474 A | 5/1989 | George et al. | |
| 4,853,065 A | 8/1989 | Terry et al. | |
| 4,856,860 A | 8/1989 | Silberberg et al. | |
| 4,866,699 A | 9/1989 | Brackett et al. | |
| 4,913,934 A | 4/1990 | Sharp et al. | |
| 4,928,316 A | 5/1990 | Heritage et al. | |

(Continued)

FOREIGN PATENT DOCUMENTS

| EP | 0605110 A2 | 7/1994 |
|---|---|---|
| EP | 0842729 A1 | 5/1998 |

(Continued)

OTHER PUBLICATIONS

Foing, J.P. et al. "Femtosecond Pulse Phase Measurement by Spectrally Resolved Up-Conversion—Application to Continuum Compression," IEEE J. Quantum Electron. 28, 2285 (1992).

(Continued)

*Primary Examiner* — Yuanda Zhang
(74) *Attorney, Agent, or Firm* — Harness, Dickey & Pierce, P.L.C.

(57) ABSTRACT

A laser pulse synthesis system is provided. A further aspect of the present system uses a phase-only modulator to measure ultrashort laser pulses. An additional aspect achieves interferences between split subpulses even though the subpulses have different frequencies. Yet another aspect of a laser system employs multi-comb phase shaping of a laser pulse. In another aspect, a laser system includes pulse characterization and arbitrary or variable waveform generation through spectral phase comb shaping.

56 Claims, 15 Drawing Sheets

(56) References Cited

U.S. PATENT DOCUMENTS

| | | |
|---|---|---|
| 4,999,840 A | 3/1991 | Negus |
| 5,021,282 A | 6/1991 | Terry et al. |
| 5,034,613 A | 7/1991 | Denk et al. |
| 5,048,029 A | 9/1991 | Skupsky et al. |
| 5,077,619 A | 12/1991 | Toms |
| 5,095,487 A | 3/1992 | Meyerhofer et al. |
| 5,130,994 A | 7/1992 | Madey et al. |
| 5,132,512 A | 7/1992 | Sanders et al. |
| 5,132,824 A | 7/1992 | Patel et al. |
| 5,154,963 A | 10/1992 | Terry |
| 5,166,818 A | 11/1992 | Chase et al. |
| 5,235,606 A | 8/1993 | Mourou et al. |
| 5,239,607 A | 8/1993 | da Silva et al. |
| 5,341,236 A | 8/1994 | Stappaerts |
| 5,349,591 A | 9/1994 | Weston et al. |
| 5,359,410 A | 10/1994 | Diels et al. |
| 5,400,350 A | 3/1995 | Galvanauskas |
| 5,406,408 A | 4/1995 | Ellingson et al. |
| 5,414,540 A | 5/1995 | Patel et al. |
| 5,414,541 A | 5/1995 | Patel et al. |
| 5,463,200 A | 10/1995 | James et al. |
| 5,526,155 A | 6/1996 | Knox et al. |
| 5,526,171 A | 6/1996 | Warren |
| 5,530,544 A | 6/1996 | Trebino et al. |
| 5,541,947 A | 7/1996 | Mourou et al. |
| 5,572,355 A | 11/1996 | Cotton et al. |
| 5,585,913 A | 12/1996 | Hariharan et al. |
| 5,589,955 A | 12/1996 | Amako et al. |
| 5,615,673 A | 4/1997 | Berger et al. |
| 5,631,758 A | 5/1997 | Knox et al. |
| 5,633,885 A | 5/1997 | Galvanauskas et al. |
| 5,637,966 A | 6/1997 | Umstadter et al. |
| 5,682,262 A | 10/1997 | Wefers et al. |
| 5,684,595 A | 11/1997 | Kato et al. |
| 5,689,361 A | 11/1997 | Damen et al. |
| 5,704,700 A | 1/1998 | Kappel et al. |
| 5,719,650 A | 2/1998 | Wefers et al. |
| 5,726,855 A | 3/1998 | Mourou et al. |
| 5,754,292 A | 5/1998 | Kane et al. |
| 5,759,767 A | 6/1998 | Lakowicz et al. |
| 5,774,213 A | 6/1998 | Trebino et al. |
| 5,793,091 A | 8/1998 | Devoe |
| 5,798,867 A | 8/1998 | Uchida et al. |
| 5,822,097 A | 10/1998 | Tournois |
| 5,828,459 A | 10/1998 | Silberberg |
| 5,832,013 A | 11/1998 | Yessik et al. |
| 5,862,287 A | 1/1999 | Stock et al. |
| 5,867,304 A | 2/1999 | Galvanauskas et al. |
| 5,883,309 A | 3/1999 | Vossiek et al. |
| 5,936,732 A | 8/1999 | Smirl et al. |
| 5,956,173 A | 9/1999 | Svelto et al. |
| 5,994,687 A | 11/1999 | Chanteloup et al. |
| 6,002,480 A | 12/1999 | Izatt et al. |
| 6,008,899 A | 12/1999 | Trebino et al. |
| 6,042,603 A | 3/2000 | Fisher et al. |
| 6,057,919 A | 5/2000 | Machida et al. |
| 6,058,132 A | 5/2000 | Iso et al. |
| 6,072,813 A | 6/2000 | Tournois |
| 6,080,148 A | 6/2000 | Damasco et al. |
| 6,081,543 A | 6/2000 | Liu et al. |
| 6,111,251 A | 8/2000 | Hillenkamp |
| 6,122,419 A | 9/2000 | Kurokawa et al. |
| 6,130,426 A | 10/2000 | Laukien et al. |
| 6,166,385 A | 12/2000 | Webb et al. |
| 6,181,463 B1 | 1/2001 | Galvanauskas et al. |
| 6,184,490 B1 | 2/2001 | Schweizer |
| 6,191,386 B1 | 2/2001 | Albright et al. |
| 6,198,568 B1 | 3/2001 | Galvanauskas et al. |
| 6,219,142 B1 | 4/2001 | Kane |
| 6,259,104 B1 | 7/2001 | Baer |
| 6,272,156 B1 | 8/2001 | Reed et al. |
| 6,288,782 B1 | 9/2001 | Worster et al. |
| 6,296,810 B1 | 10/2001 | Ulmer |
| 6,316,153 B1 | 11/2001 | Goodman et al. |
| 6,327,068 B1 | 12/2001 | Silberberg et al. |
| 6,337,606 B1 | 1/2002 | Brombaugh et al. |
| 6,344,653 B1 | 2/2002 | Webb et al. |
| 6,391,220 B1 | 5/2002 | Zhang et al. |
| 6,396,856 B1 | 5/2002 | Sucha et al. |
| 6,402,898 B1 | 6/2002 | Brumer et al. |
| 6,421,154 B1 | 7/2002 | Diels et al. |
| 6,479,822 B1 | 11/2002 | Nelson et al. |
| 6,480,656 B1 | 11/2002 | Islam et al. |
| 6,498,801 B1 | 12/2002 | Dudelzak et al. |
| 6,504,612 B2 | 1/2003 | Trebino |
| 6,515,257 B1 | 2/2003 | Jain et al. |
| 6,566,667 B1 | 5/2003 | Partlo et al. |
| 6,577,782 B1 | 6/2003 | Leaird et al. |
| 6,603,600 B2 | 8/2003 | Pang |
| 6,610,351 B2 | 8/2003 | Shchegolikhin et al. |
| 6,610,977 B2 | 8/2003 | Megerle |
| 6,621,613 B2 | 9/2003 | Silberberg et al. |
| 6,625,181 B1 | 9/2003 | Oshemkov et al. |
| 6,678,450 B1 | 1/2004 | Franson |
| 6,697,196 B2 | 2/2004 | Suzuki |
| 6,753,957 B1 | 6/2004 | Graft et al. |
| 6,757,463 B2 | 6/2004 | Hutchinson et al. |
| 6,795,456 B2 | 9/2004 | Scaggs |
| 6,801,318 B2 | 10/2004 | Fu et al. |
| 6,801,551 B1 | 10/2004 | Delfyett et al. |
| 6,804,000 B2 | 10/2004 | Roorda et al. |
| 6,804,045 B2 | 10/2004 | Barty |
| 6,842,285 B2 | 1/2005 | Gluckstad |
| 6,857,744 B2 | 2/2005 | Nakada et al. |
| 6,879,426 B1 | 4/2005 | Weiner |
| 6,885,325 B2 | 4/2005 | Omelyanchouk et al. |
| 6,885,683 B1 | 4/2005 | Fermann et al. |
| 6,914,668 B2 | 7/2005 | Brestel et al. |
| 6,915,040 B2 | 7/2005 | Willner et al. |
| 6,917,631 B2 | 7/2005 | Richardson et al. |
| 6,930,779 B2 | 8/2005 | McGrew |
| 6,963,591 B2 | 11/2005 | Tulloch et al. |
| 7,033,519 B2 | 4/2006 | Taylor et al. |
| 7,049,543 B2 | 5/2006 | Roos et al. |
| 7,057,788 B2 | 6/2006 | Ohbayashi et al. |
| 7,088,435 B2 | 8/2006 | Brestel et al. |
| 7,096,125 B2 | 8/2006 | Padmanabhan et al. |
| 7,105,811 B2 | 9/2006 | Dantus et al. |
| 7,113,327 B2 | 9/2006 | Gu et al. |
| 7,132,223 B2 | 11/2006 | Schroeder et al. |
| 7,169,709 B2 | 1/2007 | Koide |
| 7,170,030 B2 | 1/2007 | Haight et al. |
| 7,170,598 B2 | 1/2007 | Walla et al. |
| 7,224,518 B2 | 5/2007 | Tauser et al. |
| 7,256,885 B2 | 8/2007 | Silberberg et al. |
| 7,276,103 B2 | 10/2007 | Woste et al. |
| 7,289,203 B2 | 10/2007 | Frankel |
| 7,342,223 B2 | 3/2008 | Ohkubo et al. |
| 7,348,569 B2 | 3/2008 | Feurer et al. |
| 7,369,773 B2 | 5/2008 | Weiner |
| 7,391,557 B1 | 6/2008 | Bruch et al. |
| 7,403,282 B2 | 7/2008 | Silberberg et al. |
| 7,408,601 B1 | 8/2008 | Huang et al. |
| 7,411,166 B2 | 8/2008 | Wolleschensky et al. |
| 7,439,497 B2 | 10/2008 | Dantus et al. |
| 7,450,618 B2 | 11/2008 | Dantus et al. |
| 7,474,467 B2 | 1/2009 | Trebino |
| 7,609,731 B2 | 10/2009 | Dantus et al. |
| 7,826,051 B2 | 11/2010 | Silberberg et al. |
| 8,208,504 B2 | 6/2012 | Dantus et al. |
| 8,208,505 B2 | 6/2012 | Dantus et al. |
| 8,265,110 B2 | 9/2012 | Dantus et al. |
| 8,300,669 B2 | 10/2012 | Dantus et al. |
| 8,311,069 B2 | 11/2012 | Dantus et al. |
| 2001/0015990 A1 | 8/2001 | Miyai |
| 2001/0017727 A1 | 8/2001 | Sucha et al. |
| 2002/0025490 A1 | 2/2002 | Shchegolikhin et al. |
| 2002/0086245 A1 | 7/2002 | Zait et al. |
| 2002/0097761 A1 | 7/2002 | Sucha et al. |
| 2003/0063884 A1 | 4/2003 | Smith et al. |
| 2003/0099264 A1 | 5/2003 | Dantus et al. |
| 2003/0123051 A1 | 7/2003 | McGrew |
| 2003/0194165 A1 | 10/2003 | Silberberg et al. |
| 2003/0210400 A1 | 11/2003 | Joffre et al. |

(56) References Cited

U.S. PATENT DOCUMENTS

| | | |
|---|---|---|
| 2004/0012837 A1 | 1/2004 | Kaplan et al. |
| 2004/0021243 A1 | 2/2004 | Shih et al. |
| 2004/0031906 A1 | 2/2004 | Glecker |
| 2004/0058058 A1 | 3/2004 | Shchegolikhin et al. |
| 2004/0089804 A1 | 5/2004 | Dantus et al. |
| 2004/0128081 A1 | 7/2004 | Rabitz et al. |
| 2004/0145735 A1 | 7/2004 | Silberberg et al. |
| 2004/0155184 A1 | 8/2004 | Stockman et al. |
| 2004/0233944 A1 | 11/2004 | Dantus et al. |
| 2004/0240037 A1 | 12/2004 | Harter |
| 2004/0263950 A1 | 12/2004 | Fermann et al. |
| 2005/0021243 A1 | 1/2005 | Dantus et al. |
| 2005/0036202 A1 | 2/2005 | Cohen et al. |
| 2005/0103759 A1 | 5/2005 | Li et al. |
| 2005/0155958 A1 | 7/2005 | Arai et al. |
| 2005/0161669 A1 | 7/2005 | Jovanovich et al. |
| 2005/0185188 A1 | 8/2005 | McGrew |
| 2005/0226287 A1 | 10/2005 | Shah et al. |
| 2005/0230365 A1 | 10/2005 | Lei et al. |
| 2005/0232313 A1 | 10/2005 | Fermann et al. |
| 2006/0000988 A1 | 1/2006 | Stuart et al. |
| 2006/0006964 A1 | 1/2006 | Huang et al. |
| 2006/0019171 A1 | 1/2006 | Hosono et al. |
| 2006/0028655 A1 | 2/2006 | Cordingley et al. |
| 2006/0032841 A1 | 2/2006 | Tan et al. |
| 2006/0039419 A1 | 2/2006 | Deshi |
| 2006/0051025 A1 | 3/2006 | Mizuuchi et al. |
| 2006/0056468 A1 | 3/2006 | Dantus et al. |
| 2006/0058683 A1 | 3/2006 | Chance |
| 2006/0066848 A1 | 3/2006 | Frankel |
| 2006/0071803 A1 | 4/2006 | Hamburger et al. |
| 2006/0096426 A1 | 5/2006 | Park |
| 2006/0096962 A1 | 5/2006 | Park |
| 2006/0119743 A1 | 6/2006 | Lin |
| 2006/0120412 A1 | 6/2006 | Liu |
| 2006/0134004 A1 | 6/2006 | Gellermann et al. |
| 2006/0169677 A1 | 8/2006 | Deshi |
| 2006/0187974 A1 | 8/2006 | Dantus |
| 2006/0207975 A1 | 9/2006 | Ehrmann et al. |
| 2006/0207976 A1 | 9/2006 | Bovatsek et al. |
| 2006/0243712 A1 | 11/2006 | Haight et al. |
| 2006/0274403 A1 | 12/2006 | Kaplan et al. |
| 2006/0285071 A1 | 12/2006 | Erickson et al. |
| 2007/0034615 A1 | 2/2007 | Kleine |
| 2007/0093970 A1 | 4/2007 | Padmanabhan et al. |
| 2007/0103778 A1 | 5/2007 | Kaplan et al. |
| 2008/0170218 A1 | 7/2008 | Dantus et al. |
| 2008/0309931 A1 | 12/2008 | Silberberg et al. |
| 2009/0122819 A1 | 5/2009 | Dantus et al. |
| 2009/0188901 A1 | 7/2009 | Dantus |
| 2009/0207869 A1 | 8/2009 | Dantus et al. |
| 2009/0238222 A1 | 9/2009 | Dantus et al. |
| 2009/0256071 A1 | 10/2009 | Dantus et al. |
| 2009/0257464 A1 | 10/2009 | Dantus et al. |
| 2009/0296744 A1 | 12/2009 | Dantus et al. |

FOREIGN PATENT DOCUMENTS

| | | |
|---|---|---|
| EP | 1625939 A2 | 2/2006 |
| EP | 1742311 A1 | 1/2007 |
| JP | 01113189 A | 5/1989 |
| JP | 11095051 A | 4/1999 |
| JP | 2000055781 A | 2/2000 |
| JP | 2001337301 A | 12/2001 |
| JP | 2002139716 A | 5/2002 |
| JP | 2003155256 A | 5/2003 |
| WO | WO-9957318 A2 | 11/1999 |
| WO | WO-0070647 A1 | 11/2000 |
| WO | WO-0154323 A2 | 7/2001 |
| WO | WO-02061799 A2 | 8/2002 |
| WO | WO-2004023413 A2 | 3/2004 |
| WO | WO-2005088783 A1 | 9/2005 |
| WO | WO-2005111677 A2 | 11/2005 |
| WO | WO-2006079083 A2 | 7/2006 |
| WO | WO-2006111682 A1 | 10/2006 |
| WO | WO-2006138442 A2 | 12/2006 |
| WO | WO-2007001308 A2 | 1/2007 |
| WO | WO-2007002231 A1 | 1/2007 |
| WO | WO-2007028119 A2 | 3/2007 |
| WO | WO-2007064703 | 6/2007 |
| WO | WO-2007145702 A2 | 12/2007 |
| WO | WO-2008063602 A2 | 5/2008 |

OTHER PUBLICATIONS

Rhee, T.K. et al. "Chirped-Pulse Amplification of 85-Fs Pulses at 250 Khz with 3rd-Order Dispersion Compensation by Use of Holographic Transmission Gratings," Opt. Lett. 19, 1550 (1994).

Albrecht, T.F. et al. "Chirp Measurement of Large-Bandwidth Femtosecond Optical Pulses Using 2-Photon Absorption," Opt. Commun. 84, 223 (1991).

Ranka et al., "Autocorrelation Measurement of 6-fs Pulses Based on the Two-Photon-induced Photocurrent in a GaAsP Photodiode," Opt. Lett. 22 (17), 1344-1346 (1977).

Rivet, S. et al., "Complete pulse characterization: measurements of linear and nonlinear properties" Opt. Commun. 181, 425-435 (2000).

Weiner, A.M. "Ultrafast Optics" Chapter 3 entitled "Ultrafast-Pulse Measurement Methods" (pp. 85-146), (2009).

Dantus, Marcos et al. "Two-photon microscopy with Sub-8fs laswer pulse" PDPA Frontiers in Optics/Laser Science XXVI; Oct. 24-28, 2010, pp. 1-18.

Eramo, R. et al. "Third-harmonic generation in positively dispersive gases with a novel cell", vol. 33, No. 9, Applied Optics, Mar. 20, 1994, pp. 1691-1696.

P. Main et al.; "Generation of Ultrahigh Peak Power Pulses by Chirped Pulse Amplification;" IEEE Journal of Quantum Electronics, vol. 24, No. 2, Feb. 1988; pp. 398-403.

P. K. Mukhopadhyay et al.; "All-Fiber Low-Noise High-Power Femtosecond Yb-Fiber Amplifier System Seeded by an All-Normal Dispersion Fiber Oscillator;" IEEE Journal of Selected Topics in Quantum Electronics, vol. 15, No. 1, Jan./Feb. 2009; pp. 145-152.

Limped J. et al.; "All fiber chirped-pulse amplification system based on compression in air-guiding photonic bandgap fiber;" Optics Express, vol. 11, No. 24, Dec. 1, 2003; pp. 3332-3337.

Strickland D. et al.; "Compression of amplified chirped optical pulses;" Optics Communications, vol. 56, No. 3; Dec. 1, 1985; pp. 219-221.

Chirped pulse amplification; Internet excerpt from Wikipedia; published on Aug. 7, 2008; 4 pages.

Backus S. et al.; "High power ultrafast lasers;" Review of Scientific Instruments, vol. 69, No. 3, Mar. 1998; pp. 1207-1223.

Xu L. et al.; "Experimental generation of an ultra-broad spectrum based on induced-phase modulation in a single-mode glass fiber;" Optics Communications, 162 (1999); pp. 256-260.

Weiner A.M.; "Femtosecond pulse processing;" Optical and Quantum Electronics 32, 2000; pp. 473-487.

Efimov A. et al.; "Programmable dispersion compensation and pulse shaping in a 26-fs chirped-pulse amplifier;" Optics Letters, vol. 23, No. 20, Oct. 15, 1998; pp. 1612-1614.

Fowles, "Introduction to Modem Optics," 1989, Dover 2e, pp. 2-19.

Ogawa et al, Dependence of the Laser Two-Photon Ionization Process in Solution on the Laser Pulse Width, Analytical Chemistry, vol. 73, Mar. 20, 2001, pp. 2066-2069.

Zeek, E. et al., "Pulse Compression by Use of Deformable Mirrors," Optics Letters, OSA, Optical Society of America, vol. 24, No. 7, Apr. 1, 1999, pp. 493-495.

Sardesai, H et al. "A Femtosecond Code-Division Multiple-Access Communication System Test Bed," Journal of Lightwave Technology, IEEE Service Center, vol. 16, No. 11, Nov. 1, 1998, p. 1953-1964.

"BNS Liquid Crystal Solutions Spatial Light Modulators 1×12,288 Linear Series," brochure, Apr. 2006, Boulder Nonlinear Systems, Inc., pp. 1-4.

"Femtosource Scientific," brochure, FEMTOLASERS Productions GmbH (believed to be published prior to Jan. 15, 2009) 2 pages.

"Shape Your Pulses. Control Your Experiment." advertisement, Laser Focus World, (Dec. 1997) p. 26, CRI, Inc.

(56) References Cited

OTHER PUBLICATIONS

"Shaping Light," brochure, Boston Micromachines Corporation, (believed to have been published prior to Jun. 18, 2010).
A. Apolonski et al.; "Controlling the Phase Evolution of Few-Cycle Light Pulses"; Physical Review Letters, vol. 85, No. 4; Jul. 24, 2000; pp. 740-743.
A. Assion et al.; "Coherent control by a single phase shaped femtosecond laser pulse"; Chemical Physics Letters 259; Sep. 13, 1996; pp. 488-494.
A. Baltuska et al.; "Attosecond control of electronic processes by intense light fields"; Nature magazine, vol. 421; Feb. 6, 2003; pp. 611-615.
A. Efimov et al.; "Minimization of dispersion in an ultrafast chirped pulse amplifier using adaptive learning"; Appl. Phys. B 70 (Suppl); 2000; pp. S133-S141.
A. Glass et al.; "Control of the photodissociation of CsCl"; Applied Physics B 71; 2000; pp. 267-276.
A. Pe're et al.; Optical Code-Division Multiple Access Using Broad-Band Parametrically Generated Light; J. of Lightwave Tech.; vol. 22, No. 6; Jun. 2004; pp. 1463-1471.
A. Poppe et al; "Few-cycle optical waveform synthesis"; Applied Physics B 72; 2001; pp. 373-376.
A. Powe et al.; "Molecular Fluorescence, Phosphorescence, and Chemiluminescence Spectrometry"; Anal. Chem., vol. 76, No. 15; Aug. 15, 2004; pp. 4614-4634.
A. Prakelt et al.; "Phase control of two-photon transition with shaped femtosecond laser-pulse sequences"; Physical Review A 70; 2004; pp. 063407-1-06407-10.
A.J. Wurzer et al.; "Highly localized vibronic wavepackets in large reactive molecules"; Applied Phys. B 71, 2000; pp. 405-409.
A.M. Weiner et al.; "Femtosecond Pulse Sequences Used for Optical Manipulation of Molecular Motion"; Reports; Mar. 16, 1990; pp. 1317-1319.
A.N. Naumov et al.; "Frequency-time and time-space mappings for single-shot coherent four-wave mixing with chirped pulses and broad beams"; Journal of Raman Spectroscopy, 2001; pp. 960-970.
A.V. Sokolov; "Subfemtosecond compression of periodic laser pulses"; Optics Letters, vol. 24, No. 17, Sep. 1, 1999; pp. 1248-1250.
Akozbek, N. et al.; "Continuum Generation of the Third-Harmonic Pulse Generated by an Intense Femtosecond IR Laser Pulse in Air;" Applied Physics B (Lasers and Optics), Springer-Verlag, Germany, vol. B77, No. 2-3, XP002476096; Sep. 2003, pp. 177-183.
Alexeev, I. et al., "Ultraviolet Light Generation by Intense Laser Filaments Propagating in Air," Conference on Lasers & Electro-Optics (CLEO), Baltimore, Maryland, USA, XP010876479; May 22-27, 2005, pp. 189-191.
Alfred Kwok et al.; "Frequency-Resolved Optical Gating Using Cascaded Second-Order Nonlinearities"; Journal of Selected Topics in Quantum Electronics, vol. 4, No. 2; Mar./Apr. 1998; pp. 271-277.
Allen J. Bard et al.; "Holy Grails in Chemistry"; American Chemical Society, vol. 28, No. 3; Mar. 1995.
Allison Albrecht Ferro et al.; "Complete femtosecond linear free induction decay, Fourier algorithm for dispersion relations and accuracy of the rotating wave approximation"; Journal of Chemical Physics, vol. 114, No. 10; Mar. 8, 2001; pp. 4649-4656.
Allison W. Albrecht et al.; "Experimental distinction between phase shifts and time delays: Implications for femtosecond spectroscopy and coherent control of chemical reactions"; Journal of Chemical Physics, vol. 111, No. 24; Dec. 22, 1999; pp. 10934-10955.
Alois Renn et al.; "Multidimensional Holography by Persistent Spectral Hole Burning"; The Journal of Physical Chemistry A, vol. 106, No. 13; Apr. 4, 2002; pp. 3045-3060.
Amichay Vardi et al.; "Laser catalysis with pulses"; Physical Review A, vol. 58, No. 2; Aug. 1998; pp. 1352-1360.
Anderson, M.E. et al.; "The effects of noise on ultrashort-optical-pulse measurement using SPIDER"; Appl. Phys. B 70 (Suppl); 2000; pp. S85-S93.
Andrius Baltuska et al.; "Second-Harmonic Generation Frequency-Resolved Optical Gating in the Single-Cycle Regime"; IEEE Journal of Quantum Electronics, vol. 35, No. 4; Apr. 1999; pp. 459-478.

Anthony P. Peirce et al.; "Optimal control of quantum-mechanical systems: Existence, numerical approximation and applications"; Physical Review A, vol. 37, No. 12; Jun. 15, 1988; pp. 4950-4964.
Arthur L. Smirl et al.; "Heavy-Hole and Light-Hole Quantum Beats in the Polarization State of Coherent Emission from Quantum Wells"; IEEE Journal of Quantum Electronics, vol. 35, No. 4; Apr. 1999; pp. 523-531.
Assion, A. et al; "Control of Chemical Reactions by Feedback-Optimized Phase-Shaped Femtosecond Laser Pulses"; Science Magazine, vol. 282; Oct. 30, 1998; pp. 919-922.
Atabek, O. et al., Intense Laser Control of the Chemical Bond, Theochem Elsevier Netherlands, vol. 493, Dec. 15, 1999, pp. 89-101.
Atsushi Yabushita et al.; "SHG FROG and XFROG methods for phase/intensity characterization of pulses propagated through an absorptive optical medium"; Optics Communications; Oct. 15, 2001; pp. 227-232.
Aviv Circular Dichroism Spectrometer, Model 400, Aviv Biomedical, Inc., http://www.avivbiomedical.com, Nov. 29, 2006; 2 pages.
B. Broers et al.; "Efficient Population Transfer in a Three-Level Ladder System by Frequency-Swept Ultrashort Laser Pulses"; Physical Review Letters, vol. 69, No. 14; Oct. 5, 1992; pp. 2062-2065.
B. Chatel et al.; "Role of quadratic and cubic spectral phases in ladder climbing with ultrashort pulses"; Physical Review A 70; 2004; pp. 053414-1-053414-10.
B. Dayan et al.; "Coherent control with broadband squeezed vacuum"; arXiv:quant-ph/0302038 v1; Feb. 5, 2003 (4 pages).
B. Dayan et al.; "Nonlinear Interactions with an Ultrahigh Flux of Broadband Entangled Photons"; Physical Review Letters, PRL 94; Feb. 4, 2005, 2004; pp. 043602-1-043602-4.
B. Dayan et al.; "Two Photon Absorption and Coherent Control with Broadband Down-Converted Light"; Physical Review Letters, vol. 93, No. 2; Jul. 9, 2004; pp. 023005-1-023005-4.
B. Natarajan et al.; "Abstract-Innovative pulse shaping for high-performance wireless TDMA"; IEEE Communications Letters; 5 (9): 372-374; Sep. 2001 (1 page).
B. Xu, Y. Coello, V.Lozovoy, D. Harris; M. Dantus, Pulse Shaping of Octave Spanning Femtosecond Laser Pulses, Optics Express, vol. 14, No. 22, Oct. 30, 2006, six pages.
B.D. Fainberg; "Diagram Technique for Nonlinear Optical Spectroscopy in the Fast Electronic Dephasing Limit"; Journal of the Chinese Chemical Society, 47; 2000; pp. 579-582.
B.J. Pearson et al.; "Coherent control using adaptive learning algorithms"; Physical Review A, vol. 63; 2001; pp. 063412-1-063412-12.
Bado, Philippe et al., "Micromachining Handbook," Femtosecond Lasers Micromachining Handbook, Clark-MXR, Inc., http://www.cmxr.com/Industrial/Handbook/Index.htm, accessed Apr. 3, 2006 (38 pages).
Baltuska, Andrius et al.; "Amplitude and phase characterization of 4.5-fs pulses by frequency-resolved optical gating"; Optics Letters, vol. 23, No. 18; Sep. 15, 1998; pp. 1474-1476.
Baltuska, Andrius et al.; "Visible Pulse Compression to 4 fs by Optical Parametric Amplification and Programmable Dispersion Control;" Optics Letters, vol. 27, No. 5, Mar. 1, 2002, pp. 306-308.
Barry, Liam P., et al., "A High-Speed Optical Star Network Using TDMA and All-Optical Demultiplexing Techniques", IEEE Journal on Selected Areas in Communications, vol. 14, No. 5, (Jun. 1996), pp. 1030-1038.
Baumert, T. et al. "Femtosecond pulse shaping by an evolutionary algorithm with feedback"; Appl. Phys. B 65; 1997; pp. 779-782.
Ben R. Torralva et al; "Mechanisms for laser control of chemical reactions"; Journal of Modern Optics, vol. 49, No. 3/4; 2002; pp. 593-625.
Bender, Daniel A., et al., "Modified spectrum autointerferometric correlation (MOSAIC) for single-shot pulse characterization," Optics Letters, vol. 32, No. 19 (Oct. 1, 2007) Optical Society of America, pp. 2822-2824.
Bern Kohler et al.; "Controlling the Future of Matter"; Acc. Chem. Res., vol. 28, No. 3; 1995; pp. 133-140.
Bern Kohler et al.; "Mode-Locking Matter with Light"; J. Phys. Chem 1993, 97; pp. 12602-12608.
Bern Kohler et al.; "Quantum Control of Wave Packet Evolution with Tailored Femtosecond Pulses"; Physical Review Letters, vol. 74, No. 17; Apr. 24, 1995; pp. 3360-3363.

(56) References Cited

OTHER PUBLICATIONS

Bhattacharya, N. et al.; "Implementation of Quantum Search Algorithm using Classical Fourier Optics"; Phys. Rev. Lett.; vol. 88. No. 13; Apr. 1, 2002; p. 137901-1-137901-4.
Bjarne Amstrup et al.; "Control of HOD photodissociation dynamics via bond-selective infrared multiphoton excitation and a femtosecond ultraviolet laser pulse"; J. Chem. Phys., vol. 97, No. 11; Dec. 1, 1992; pp. 8285-8295.
Bonacina, Luigi, et al., "Multiobjective genetic approach for optimal control of photoinduced processes," Physical Review A. 76, The American Physical Society, (2007) pp. 023408-1 through 023408-5.
Bowlan, Pamela, et al., "Directly measuring the spatio-temporal electric field of focusing ultrashort pulses," Optics Express, vol. 15, No. 16 (2007) pp. 10219-10230.
Brattke, S. et al.; "Generation of Photon Number States on Demand via Cavity Quantum Electrodynamics"; Phys. Rev. Lett.; vol. 86; Apr. 16, 2001; pp. 3534-3537.
Brixner T., et al., Quantum Control by Ultrafast Polarization Shaping, Phys Rev Lett, vol. 92, No. 20, May 21, 2004, pp. 208301-1.
Brixner, T. et al.; "Feedback-controlled femtosecond pulse shaping"; Appl. Phys. B 70 (Suppl); 2000; pp. S119-S124.
Brixner, T., et al., "Adaptive Shaping of Femtosecond Polarization Profiles," J. Opt. Soc. Am. vol. 20, No. 5, May 2003; pp. 878-881.
Brixner, T., et al., "Femtosecond Polarlization Pulse Shaping," Optics Letters, vol. 26, No. 8, Apr. 15, 2001; pp. 557-559.
Broers, B. et al.; "Diffraction and focusing of spectral energy in multiphoton processes"; Phys Rev. A 46; 1992; p. 2749-2756.
Broers, B. et al.; "Large interference effects of small chirp observed in two-photon absorbtion"; Opt. Commun. 91; 1992; p. 57-61.
Brown, E. J. et al.; "Femtosecond Transient-Grating Techniques: Population and Coherence Dynamics Involving Ground and Excited States;" J. Chem. Phys., vol. 110, No. 12, Mar. 22, 1999; pp. 5772-5788.
Brown, E. J. et al.; "Population and Coherence Control by Three-Pulse Four-Wave Mixing;" J. Chem. Phys., vol. 111, No. 9, Sep. 1, 1999; pp. 3779-3782.
Brown, E. J. et. al. "Ultrafast Rotational Anisotropy Measurements: Unidirectional Detection;" J. Phys. Chem. A, vol. 103, No. 16, 1999 pp. 2912-2916.
Brown, E. J. et. al. "Ultrafast Rotational Anisotropy Measurements; Strong-Field Nonlinear Saturation Effects;" J. Phys. Chem. A, vol. 105, No. 34, 2001; pp. 8004-8010.
Bucksbaum, Philip; "An atomic dimmer switch"; Nature; Nov. 19, 1998; vol. 396; pp. 217-219.
Buist, A.H. et al.; "Probing microscopic chemical environments with high-intensity chirped pulses"; Optics Letters 24; 1999; pp. 244-246.
Butcher, Steve, et al., "Multiphoton approach shapes ultrafast pulses," Pulse Shaping, (2006) Institute of Physics and IOP Publishing Ltd., 3 pages.
Bychkov S. S. et al., Laser Synthesis of Chiral Molecules in Isotropic Racemic Media, Journal of Experimental and Theoretical Physics, Nauka/Interperiodica, MO, vol. 93, No. 1, Jul. 1, 2001, pp. 24-32.
Béjot, Pierre, et al., "Laser noise compression by filamentation at 400 nm in argon," Optics Express, vol. 15, No. 20 (Oct. 2007) pp. 13295-13309.
C. Dorrer et al.; "Characterization of chirped-pulse amplification systems with spectral phase interferometry for direct electric-field reconstruction"; Applied Physics B 70 (Suppl.), 2000; pp. S77-S84.
C. Dorrer et al.; "Single-shot real-time characterization of chirped-pulse amplification systems by spectral phase interferometry for direct electric-field reconstruction"; Optics Letters, vol. 24, No. 22; Nov. 15, 1999; pp. 1644-1646.
C. Dorrer et al.; "Spatio-temporal characterization of the electric field of ultrashort optical pulses using two-dimensional shearing interferometry"; Applied Physics B74 (Suppl.), 2002; pp. S209-S217.
C. Dorrer; "Implementation of spectral phase interferometry for direct electric-field reconstruction with a simultaneously recorded reference interferogram"; Optics Letters, vol. 24, No. 21; Nov. 1, 1999; pp. 1532-1534.

C. Iaconis et al.; "Direct measurement of the two-point field correlation function"; Optics Letters, vol. 21, No. 21; Nov. 1, 1996; pp. 1783-1785.
C. Radzewicz et al.; "A poor man's FROG"; Optics Communications, Dec. 15, 2000; pp. 329-333.
C. Rangan et al.; "Optimally shaped terahertz pulses for phase retrieval in a Rydberg-atom data register"; Physical Review A, vol. 64; 2001; pp. 033417-1-033417-5.
C.P.J. Barty et al.; "Generation of 18-fs, multiiterawatt pulses by regenerative pulse shaping and chirped-pulse amplification"; Optics Letters, vol. 21, No. 9; May 1, 1996; pp. 668-670.
C.Y. Chien et al.; "Single-shot chirped-pulse spectral interferometry used to measure the femtosecond ionization dynamics of air"; Optics Letters, vol. 25, No. 8; Apr. 15, 2000; pp. 578-580.
Celine Nicole et al.; "Saturation of wave-packet interferences: Direct observation of spin precession in potassium atoms"; Physical Review A, vol. 60, No. 3; Sep. 1999; pp. R1755-R1758.
Cerqueira, Arismar et al., "Full Nonlinear Conversion of Broadband Frequency Combs generated by Four-Wave Mixing in Highly Nonlinear Fibers," (2009) Optical Society of America, 4 pages.
Ch. Warmuth et al.; "Molecular quantum dynamics in a thermal system: fractional wave packet revivals probed by random-phase fluorescence interferometry"; Journal of Chemical Physics, vol. 114, No. 22; Jun. 8, 2001; pp. 9901-9910.
Ch. Warmuth et al.; "Studying vibrational wavepacket dynamics by measuring fluorescence interference fluctuations"; Journal of Chemical Physics, vol. 112, No. 11; Mar. 15, 2000; pp. 5060-5069.
Chantal Daniel et al.; "Analysis and control of laser induced fragmentation processes in CpMn(CO)3"; Chemical Physics 267; 2001; pp. 247-260.
Chantal Daniel et al.; "Deciphering the Reaction Dynamics Underlying Optimal Control Laser Fields"; Science Magazine, vol. 299; Jan. 24, 2003; pp. 536-539.
Chen J. et al., Femtosecond Laser-Induced Dissociative Ionization and Coulomb Explosion of Ethanol, International Journal of Mass Spectrometry, Elsevier, Amsterdam, NL, vol. 241, No. 1, Feb. 15, 2005, pp. 25-29.
Chen, Bi-Chang, et al., "Characterization of a broadband pulse for phase controlled multiphoton microscopy by single beam SPIDER," Optics Letters, vol. 32, No. 16, Optical Society of America (Aug. 15, 2007) pp. 2411-2413.
Chilla, Juan L.A. et al.; "Direct determination of the amplitude and the phase of femtosecond light pulses"; Optics Letters; vol. 16, No. 1; Jan. 1, 1991; pp. 39-41.
Choi, K-S et al.; "Charge Density Wave Caused by Reducing $ThSe_3$ by One Electron. Superstructure and Short-Range Order in $ATh_2 Se_6$ (A =K, Rb) Studied by X-Ray Diffraction, Electron Diffraction, and Diffuse Scattering;" J. Am. Chem. Soc., vol. 120, No. 41, 1998; pp. 10706-10714.
Chris Iaconis et al; "Self-Referencing Spectral Interferometry for Measuring Ultrashort Optical Pulses"; IEEE Journal of Quantum Electronics, vol. 35, No. 4; Apr. 1999; pp. 501-509.
Christophe Dorrer et al.; "Accuracy criterion for ultrashort pulse characterization techniques: application to spectral phase interferometry for direct electric field reconstruction"; Appl. Phys. B 74, vol. 19, No. 5, May 2002 ; pp. 1019-1029.
Christophe Dorrer et al.; "Phase Amplitude Coupling in Spectral Phase Modulation"; IEEE Journal of Selected Topics in Quantum Electronics, vol. 4, No. 2; Mar./Apr. 1998; pp. 342-345.
Christophe Dorrer et al.; "Spectral resolution and sampling issues in Fourier-transform spectral interferometry"; J. Opt. Soc. Am. B, vol. 17, No. 10; Oct. 2000; pp. 1795-1802.
Christophe Dorrer; "Influence of the calibration of the detector on spectral interferometry"; J. Opt. Soc. Am. B; vol. 16, No. 7; Jul. 1999; pp. 1160-1168.
Christopher J. Bardeen et al.; "Effect of Pulse Shape on the Efficiency of Multiphoton Processes: Implications for Biological Microscopy"; Journal of Biomedical Optics, vol. 4, No. 3; Jul. 1999; pp. 362-367.
Christopher J. Bardeen et al.; "Feedback quantum control of molecular electronic population transfer"; Chemical Physics Letters 280; 1997; pp. 151-158.

(56) References Cited

OTHER PUBLICATIONS

Christopher J. Bardeen et al.; "Quantum control of I2 in the gas phase and in condensed phase solid Kr matrix"; J. Chem. Phys., vol. 106, No. 20; May 22, 1997; pp. 8486-8503.
Christopher J. Bardeen et al.; "Quantum Control of NaI Photodissociation Reaction Product States by Ultrafast Tailored Light Pulses"; J. Phys. Chem. A, vol. 101, No. 20; 1997; pp. 3815-3822.
Christopher J. Bardeen et al.; "Quantum Control of Population Transfer in Green Fluorescent Protein by Using Chirped Femtosecond Pulses"; J. Am. Chem. Soc., vol. 120, No. 50; 1998; 13023-13027.
Christopher J. Bardeen et al.; "Using time-dependent rate equations to describe chirped pulse excitation in condensed phases"; Chemical Physics Letters 302; 1999; pp. 405-410.
Chu, K.C. et al.; "Direct measurement of the spectral phase of femtosecond pulses"; Optics Letters, vol. 20, No. 8; Apr. 15, 1995; pp. 904-906.
Chung, Jung-Ho, "Ambiguity of Ultrashort Pulse Shapes Retrieved From the Intensity Autocorrelation and the Power Spectrum," IEEE Journal on Selected topics in Quantum Electronics, vol. 7, No. 4 (Jul./Aug. 2001) pp. 656-666.
Clara et al.; "Femtoscond laser mass spectroscopy of ferrocenes: Photochemical stabilization by bridged cyclopentadienyl rings?"; International Journal of Mass Spectrometry, Elsevier Science Publishers, vol. 203, No. 1-3; Dec. 26, 2000; pp. 71-81.
Clement, Tracy Sharp et al.; "Single-Shot measurement of the amplitude and phase of ultrashort laser pulses in the violet"; Optics Letters, vol. 20, No. 1; Jan. 1, 1995; pp. 70-72.
Coello, Yves, "Interference without an interferometer: a different approach to measuring, compressing, and shaping ultrashort laser pulses," J. Opt. Soc. Am. B/vol. 25, No. 6 (Jun. 2008) pp. A140-A150.
Comstock et al.; "Multiphoton intrapulse interference 6; binary phase shaping"; Optics Express Opt. Soc.. America USA, vol. 12, No. 6, Mar. 22, 2004; pp. 1061-1066.
Comstock, M. et al.; "Femtosecond Photon Echo Measurements of Electronic Coherence Relaxation Between The $X(^1E_g+)$ and $B(^3\Pi_{0u}+)$ states of $I_2$ In the Presence of He, Ar, $N_2$, $O_2$, $C_3H_8$;" J. Chem. Phys., vol. 119, No. 13, Oct. 1, 2003; pp. 6546-6553.
Comstock, M. et al.; "Rotational Wavepacket Revivals for Phase Modulation of Ultrafast Pulses;" Chemical Physics Letters, 372, 2003; pp. 739-744.
Comstock, M. et al.; "Ultrafast Laser Induced Molecular Alignment and Deformation: Experimental Evidence From Neutral Molecules and From Fragment Ions;" J. Phys. Chem. A, vol. 107, No. 40, 2003; pp. 8271-8281.
Comstock, M. et al.; "Ultrafast Transient-Grating Study of Molecules After High Intensity Excitation;" in Ultrafast Phenomena XII, 2000; 2 pages.
Cormack, I.G. et al.; "Practical measurement of femtosecond optical pulses using time-resolved optical gating"; Optics Communications 194; Jul. 15, 2001; pp. 415-424.
Craig W. Siders et al.; "Multipulse Interferometric Frequency-Resolved Optical Gating"; IEEE Journal of Quantum Electronics, vol. 35, No. 4, Apr. 1999; pp. 432-440.
Cumpston, B.H. et al.; "New Photopolymers based on Two-Photon Absorbing Chromophores and Application to Three-Dimensional Microfabricaton and Optical Storage"; Mat. Res. Soc. Symp. Proc; vol. 488; 1998; pp. 217-225.
Cumpston,B.H. et al.; "Two-photon polymerization initiators for three-dimensional optical data storage and microfabrication"; Letters to Nature; vol. 398; Mar. 4, 1999; pp. 51-54.
CVI Laser Corporation; "TNM-2 Negative Group Velocity Dispersion Mirrors"; www.cvilaser.com/ultra-fast; Jan. 13, 2002 (2 pages).
D. Abramavicius et al.; "Disentangling multidimensional femtosecond spectra of excitons by pulse shaping with coherent control"; J. of Chem. Phys., vol. 120, No. 18; May 8, 2004; pp. 8373-8378.
D. Lalovic et al.; "Quantum mechanics in terms of non-negative smoothed Wigner functions"; Physical Review A, vol. 46, No. 3; Aug. 1, 1992; pp. 1206-1212.

D. Oron et al.,; "All-optical processing in coherent nonlinear spectroscopy"; Physical Review A 70; 2004; pp. 023415-1-023415-4.
D. Oron et al.,; "Femtosecond Phase-and-Polaration Control for Background-Free Coherent Anti-Stokes Raman Spectroscopy"; Physical Review Letters, vol. 90, No. 91; May 30, 2003; pp. 213902-1-213902-4.
D. Yelin et al.; "Adaptive femtosecond pulse compression"; Optics Letters, vol. 22, No. 23, Dec. 1, 1997; pp. 1793-1795.
D. Zeidler et al.; "Amplification of tailored white-light continuum"; Applied Physics, B74 (Suppl), 2002; pp. S51-S56.
D. Zeidler et al.; "Evolutionary algorithms and their application to optimal control studies"; Physical Review A, vol, 64; 2001; pp. 023420-1-023420-13.
D.H. Schirrmeister et al; "Femtosecond pulse dependence of dissipation in molecular systems"; Chemical Physics Letters Dec. 4, 1998; pp. 383-390.
D.J. Maas et al.; "Population transfer via adiabatic passage in the rubidium quantum ladder system"; Physical Review A, vol. 59, No. 2; Feb. 1999; pp. 1374-1381.
D.J. Maas et al.; "Rotational interference in vibrational ladder climbing in NO by chirped infared laser pulses"; Physical Review A, vol. 60, No. 2; Aug. 1999; pp. 1351-1362.
D.J. Maas et al.; Vibrational ladder climbing in NO By (sub)picosecond frequency-chirped infrared laser pulses; Chemical Physics Letters 290; 1998; pp. 75-80.
D.J. Maas et al.; "Vibrational ladder climbing in NO by ultrashort infrared laser pulses"; Chemical Physics Letters 270; May 16, 1997; pp. 45-49.
D.M. Villeneuve et al.; "Using frequency-domain manipulation of stretched femtosecond laser pulses to create fast rise and fall times on picosecond pulses"; Applied Physics B74 (Suppl), 2002; pp. S157-S161.
D.S. Chemla et al; "Ultrafast phase dynamics of coherent emission from excitons in GaAs quantum wells"; Physical Review B, vol. 50, No. 12, Sep. 15, 1995; pp. 8439-8453.
D.W. Schumacher et al.; "Phase Dependence of Intense Field Ionization"; Physical Review A, vol. 54, No. 5; Nov. 1996; pp. 4271-4278.
D.W. Schumacher et al.; "Phase Dependence of Intense Field Ionization: A Study Using Two Colors"; Physical Review Letters, vol. 73, No. 10; Sep. 5, 1994; pp. 1344-1347.
D.W. Schumacher et al.; "Programmable cesium Rydberg wave packets"; Physical Review A, vol. 52, No. 6; Dec. 1995; pp. 4719-4726.
Dai-Sik Kim et al.; "Femtosecond-pulse distortion in quantum wells"; Appl. Phys B 74, vol. 48. No. 24; Dec. 15, 1993; pp. 17902-17905.
Dan Oron et al.; "Narrow-Band Coherent Anti-Stokes Raman Signals from Broad-Band Pulses"; Physical Review Letters, vol. 88, No. 6; Feb. 11, 2002; pp. 063004-1-063004-4.
Daniel J. Kane et al.; "Convergence test for inversion of frequency-resolved optical gating spectrograms"; Optics Letters, vol. 25, No. 16, Aug. 15, 2000; pp. 1216-1218.
Daniel J. Kane et al.; "Simultaneous measurement of two ultrashort laser pulses from a single spectrogram in a single shot"; Optical Society of America; vol. 14, No. 4, Apr. 1997; pp. 935-943.
Daniel J. Kane; "Real-Time Measurement of Ultrashort Laser Pulse Using Principal Component Generalized Projection"; IEEE Journal of Selected Topics in Quantum Electronics; vol. 4, No. 2; Mar./Apr. 1998; pp. 278-284.
Dantus, Marcos et al., "Stereoisomer Recognition by MS with Shaped Laser Pulses," American Chemical Society. Abstracts of paper. At the national meeting, American Chemical Society, Washington, D.C., U.S. vol. 231 (Mar. 26, 2006) pp. 1-ANYL, XP009082814, ISSN: 0065-7727, the whole document.
Dantus, Marcos et al.; "Femtosecond Laser Observations of Molecular Vibration and Rotation;" Nature, vol. 343, Feb. 22, 1990; pp. 737-739.
Dantus, Marcos et al.; "Femtosecond Real-Time Probing of Reactions. II. The Dissociation Reaction of ICN;" J. Chem. Phys., vol. 89, No. 10, Nov. 15, 1988; pp. 6128-6140.
Dantus, Marcos et al.; "Femtosecond Real-Time Probing of Reactions. V. The reaction of IHgI;" J. Chem. Phys., vol. 91, No. 12, Dec. 15, 1989; pp. 7437-7450.

(56) References Cited

OTHER PUBLICATIONS

Dantus, Marcos et al.; "Real-Time Femtosecond Probing of "Transition States" In Chemical Reactions;" J. Chem. Phys., vol. 87, No. 4, Aug. 15, 1987; pp. 2395-2397.

Dantus, Marcos et al.; "Ultrafast Spectroscopy;" Encyclopedia of Applied Physics, vol. 22, 1998; pp. 431-456.

Dantus, Marcos, et al., "MIIPS characterizes and corrects femtosecond optical pulses," Ultrafast Optical Systems, Laser Focus World, (May 2007) XP001539450, 4 pages.

Dantus, Marcos. "Laser Control of Chemical Reactions." Chemical & Engineering News, vol. 79, 2001; p. 191.

Dantus, Marcos; "Ahmed Zewail, Nobel Laureate in Chemistry;" European Photochemistry Association (EPA) Newsletter, No. 69, Jul. 2000; 5 pages.

Dantus, Marcos; "Femtosecond Laser Pulses: Principles and Experiments;" (Book Review) J. Am. Chem. Soc., vol. 121, No. 37, 1999; pp. 8677-8678.

Dantus, Marcus; "Ultrafast Probing and Control of Molecular Dynamics: Beyond the Pump-Probe Method"; pp. 169-188. Kuhn & Weyh SRZ Sep. 4, 2001.

David C. Clary; "Quantum Theory of Chemical Reaction Dynamics"; Science, vol. 279, Mar. 20 1998; p. 1879.

David J. Jones et al.; "Carrier-Envelope Phase Control of Femtosecond Mode-Locked Lasers and Direct Optical Frequency Synthesis"; Science magazine, vol. 288; Apr. 28, 2000; pp. 635-639.

David J. Tannor et al.; "Control of selectivity of chemical reaction via control of wave packet evolution"; J. Chem. Phys., vol. 83, No. 10; Nov. 15, 1985; pp. 5013-5018.

David M. Jonas et al.; "Femtosecond Wavepacket Spectroscopy: Influence of Temperature, Wavelength and Pulse Duration"; J. Phys. Chem.; 1995; pp. 2594-2608.

David N. Fittinghoff et al.; "Frequency-Resolved Optical Gating Measurement of Ultrashort Pulses Passing Through a High Numerical Aperture Objective"; IEEE Journal of Quantum Electronics, vol. 35, No. 4, Apr. 1999; pp. 479-486.

David N. Fittinghoff et al.; "Measurement of the intensity and phase of ultraweak, ultrashort laser pulses"; Optics Letters, vol. 21, No. 12; Jun. 15, 1996; pp. 884-886.

David N. Fittinghoff et al.; "Noise sensitivity in frequency-resolved optical-gating measurements of ultrashort pulses"; J. Opt. Soc. Am. B, vol. 12, No. 10, Oct. 1995; pp. 1955-1967.

Dela Cruz, J. et al., "Use of coherent control methods through scattering biological tissue to achieve functional imaging," PNAS, vol. 101, No. 49, Dec. 7, 2004, pp. 16996-17001.

Dela Cruz, J. M. et al.; "Coherent Control Improves Biomedical Imaging With Ultrashort Shaped Pulses;" Journal of Photochemistry and Photobiology A: Chemistry 180, Mar. 2006; pp. 307-313.

Dela Cruz, J.M. et al.; "Multiphoton Intrapulse Interference 3: Probing Microscopic Chemical Environments"; J. Phys. Chem. A 2004, 108; pp. 53-58.

Dela Cruz, Johanna M., et al., "Multidimensional analysis with shaped femtosecond pulses: identification of conformational and geometric isomers and mixtures using mass spectrometry," American Chemical Society. Abstracts of paper. At the national meeting, American Chemical Society, Washington, D.C., U.S., vol. 230, (Aug. 28, 2005) p. U418, XP009082815, ISSN: 0065-7727, the whole document.

Dela Cruz, Johanna M., et al., "Quantitative mass spectrometric identification of isomers applying coherent laser control," Journal of Physical Chemistry A ACS USA, vol. 109, No. 38 (Sep. 29, 2005) pp. 8447-8450, XP002431289, ISSN: 1089-5639, figure 1.

Delfyett, Peter J., et al., "High-Power Ultrafast Laser Diodes", IEEE Journal of Quantum Electronics, vol. 28, No. 10, (Oct. 1992), pp. 2203-2219.

Delong, K.W., et al., "Frequency Resolved Optical Gating with the Use of 2nd-Harmonic Generation." Journal of Optical Society of America B-Optical Physics, 1994. 11 (11): pp. 2206-2215.

Derryck T. Reid; "Algorithm for Complete and Rapid Retrieval of Ultrashort Pulse Amplitude and Phase from a Sonogram"; IEEE Journal of Quantum Electronics; vol. 35, No. 11, Nov. 1999; pp. 1584-1589.

Dietrich, P. et al.; "Determining the absolute carrier phase of a few-cycle laser pulse"; Optics Letters, vol. 25, No. 1, Jan. 1, 2000; pp. 16-18.

Ding. Y.; "Femtosecond pulse shaping by dynamic holograms in photorefractive multiple quantum wells"; Optics Letters; vol. 22, No. 10; May 15, 1997; pp. 718-720.

Dong Gun Lee et al.; "Coherent Control of High-Order Harmonics with Chirped Femtosecond Laser Pulses"; Physical Review Letters, vol. 87, No. 24, Dec. 10, 2001; pp. 243902-1-243902-4.

Donna Strickland et al.; "Compression of Amplified Chirped Optical Pulses"; Optics Communications; vol. 55, No. 6; Oct. 15, 1985; pp. 447-449.

Doron Meshulach et al.; "Coherent quantum control of two-photon transitions by a femtosecond laser pulse"; Nature magazine, vol. 396; Nov. 19, 1998; pp. 239-242.

Dorrer, C. et al.; "Direct space-time characterization of the electric fields of ultrashort optical pulses"; Optics Letters, vol. 27, No. 7; Apr. 1, 2002; pp. 548-550.

Dorrer, Christophe et al.; "Precision and consistency criteria in spectral phase interferometry for direct electric-field reconstruction"; J. Opt. Soc. Am. B, vol. 19, No. 5; May 2002; pp. 1030-1038.

Dreischuh, A., Experimental Demonstraction of Pulse Shaping and Shortening by Spatial Filtering of an Induced-Phase-Modulated Probe Wave, IEEE Journal of Quantum Electronics, vol. 33, No. 3, (Mar. 1997), pp. 329-335.

Drexler W. et al.; "In vivo ultrahigh-resolution optical coherence tomography"; Optics Letters; vol. 24, No. 17; Sep. 1, 1999; pp. 1221-1223.

Dudley, John M. et al.; "Complete Characterization of Ultrashort Pulse Sources at 1550 nm"; IEEE Journal of Quantum Electronics, vol. 35, No. 4; Apr. 1999; pp. 441-450.

Dudovich, N. et al; "Transform-limited pulses are not optimal for resonant multiphoton transitions"; Phys. Rev. Lett. 86; 2001; pp. 47-50.

Dugan, M.A., et al., "High-resolution acousto-optic shaping of unamplified and amplified femtosecond laser pulses", J. Opt. Soc. Am. B, vol. 14, No. 9, (Sep. 1997), pp. 2348-2358, Optical Society of America.

E. Tokunaga et al.; "Frequency-domain interferometer for femtosecond time-resolved phase spectroscopy"; Optics Letters, vol. 17, No. 16; Aug. 15, 1992, pp. 1131-1133.

E. Zeek et al.; "Adaptive pulse compression for transform-limited 15-fs high-energy pulse generation"; Optics Letters, vol. 25, No. 8; Apr. 15, 2000; pp. 587-589.

E.T.J. Nibbering et al.; "Spectral determination of the amplitude and the phase of intense ultrashort optical pulses"; J. Opt. Soc. Am. B, vol. 13, No. 2; Feb. 1996; pp. 317-329.

Efimov, A., et al., "Programmable shaping of ultrabroad-bandwidth pulses from a Ti:sapphire laser", Journal B/vol. 12, No. 10 (Oct. 1995) pp. 1968-1980, Optical Society of America.

Elizabeth Mirowski et al.; "Effect of nonresonant frequencies on the enhancement of quantum beat amplitudes in rovibrational states of Li2: The role of state spacing"; Journal of Chemical Physics, vol. 117, No. 24; Dec. 22, 2002; pp. 11228-11238.

F. Gelmukhanov et al.; "Dynamics of two-photon absorption by molecules and solutions"; J. Opt. Soc. Am. B, vol. 19, No. 5, May 2002; pp. 937-945.

F. Legare et al.; "Laser pulse control of Raman processes by chirped non-adiabatic passage"; Journal of Raman Spectroscopy; 2000; pp. 15-23.

F. Romstad et al.; "Measurement of Pulse Amplitude and Phase Distortion in a Semiconductor Optical Amplifier: from Pulse Compression to Breakup"; IEEE Photonics Technology Letters, vol. 12, No. 12; Dec. 2000; pp. 1674-1676.

F.M. Reinert, M. Ninck, W. Luthy, T. Feurer, Shaping a Femtosecond Pulse with a Programmable Thermo-Optically Driven Phase Modulator, Optics Express, vol. 15, No. 7, Apr. 2, 2007, six pages.

(56) References Cited

OTHER PUBLICATIONS

Fermann, M.E., et al., "Additive-pulse-compression mode locking of a neodymium fiber laser", Optics Letters, vol. 16, No. 4, (Feb. 15, 1991), Optical Society of America.

Fetterman, et al., "Ultrafast pulse shaping: amplification and characterization", Optics Express, vol. 3, No. 10, (Nov. 9, 1998), pp. 366-375.

Feurer, T., et al., "Coherent Control Over Collective Polariton Excitations: The Dawn of Polaritonics", 2002 Thirteenth International Conference on Ultrafast Phenomena, Technical Digest (Tops vol. 72); Opt. Soc. America; XP008086358 (pp. 541-545).

Fork, R.L., et al., "Compression of optical pulses to six femtoseconds by using cubic phase compensation", Optics Letters, (Jul. 1987), vol. 12, No. 7, Optical Society of America.

Fujimoto, Masatoshi, et al., "Programmable shaping of a subterawatt, femtosecond laser pulse by modulating the spectral phase of the preamplified pulse," Optics Communications, 280 (2007) ScienceDirect, pp. 404-407.

G. Roberts; "Abstract-Interference effects in femtosecond spectroscopy"; Philosophical Transactions of the Royal Society of London Series A—Mathematical Physical and Engineering Sciences; 360 (1794): 987-1021; May 15, 2002 (1 page).

G.G. Paulus et al.; "Absolute-phase phenomena in photoionization with few-cycle laser pulses"; Nature, vol. 414; Nov. 8, 2001; pp. 182-184.

Gabriel Turinici et al.; "Quantum wavefunction controllability"; Chemical Physics 267; 2001; pp. 1-9.

Galler, A., et al., "Pulse shaper assisted short laser pulse characterization," Applied Physics B90, Lasers and Optics (Jan. 2008) pp. 427-430.

Gallmann, L. et al.; "Spatially resolved amplitude and phase characterization of femtosecond optical pulses"; Optics Letters, vol. 26, No. 2; Jan. 15, 2001; pp. 96-98.

Gallmann, L. et al.; "Techniques for the characterization of sub-10-fs optical pulses: a comparision"; Appl. Phys. B 70 (Suppl): 2000; pp. S67-S75.

Gallmann, L., et al., "Characterization of sub-6-fs optical pulses with spectral phase interferometry for direct electric-field reconstruction," Optics Letters, vol. 24, No. 18 (Sep. 15, 1999) p. 13140-1316.

Gee, S., et al., "Ultrashort Pulse Generation by Intracavity Modelocked Semiconductor Lasers", IEEE Journal of Quantum Electronics, vol. 36, No. 9, Sep. 2000, XP-002462407, pp. 1035-1040.

Geindre, J.P. et al.; "Single-shot spectral interferometry with chirped pulses"; Optics Letters, vol. 26, No. 20; Oct. 15, 2001; pp. 1612-1614.

Gomes, A.S.L., et al., "Optical fibre-grating pulse compressors", Tutorial Review, Optical and Quantum Electronics 20, (1988), pp. 95-112.

Goswami, D.; "Optical pulse shaping approaches to coherent control"; Physics Reports 374; 2004; pp. 385-481.

Goswami, D.; "Ultrafast Pulse Shaping Approaches to Quantum Computing"; Indian Institute of Technology; Dec. 24, 2003 (8 pages).

Greg Taft et al.; "Measurement of 10-fs Laser Pulses"; IEEE Journal of Selected Topics in Quantum Electronics, vol. 2, No. 3, Sep. 1996; pp. 575-585.

Gregory D. Goodno et al.; "Ultrafast heterodyne-detected transient-grating spectroscopy using diffractive optics"; Optical Society of America, vol. 15, No. 6, Jun. 1998; pp. 1791-1794.

Grimberg, B. I. et al.; "Ultrafast Nonlinear Spectroscopic Techniques in the Gas Phase And Their Density Matrix Representation;" J. Phys. Chem. A, vol. 106, No. 5, Feb. 7, 2002; pp. 697-718.

Gross, P. et al.; "Femtosecond Photoassociation: Coherence and Implications for Control in Bimolecular Reactions;" J. Chem. Phys., vol. 106, No. 19, May 15, 1997; pp. 8013-8021.

Gunaratne, T. et al.; "Influence of Bandwidth and Phase Shaping on Laser Induced Breakdown Spectroscopy With Ultrashort Laser Pulses;" Chemical Physics Letters 423, Apr. 3, 2006; pp. 197-201.

Gunn, J M et al: "Polarization and phase control of remote surface-plasmon-mediated two-photo-induced emission and waveguiding" Nano Letters American Chem. Soc. USA, vol. 6, No. 12, Aug. 2006.

H. Miao, A. Weiner, C. Langrock, R. Roussev, M. Fejer, Sensing and Compensation of Femtosecond Waveform Distortion Induced by All-Order Polarization Mode Dispersion at Selected Polarization States, Optics Letters, vol. 32, No. 4, Feb. 15, 2007, pp. 424-426.

H. Takada et al.; "Large-ratio stretch and recompression of sub-10-fs pulses utilizing dispersion managed devices and a spatial light modulator"; Appl. Phys. B 74 [Suppl.]; 2002; pp. S253-S257.

H. Wang et al.; "Abstract-20-fs pulse shaping with a 512-element phase-only liquid crystal modulator"; IEEE Journal of Selected Topics in Quantum Electronics; 7 (4): 718-727; Jul./Aug. 2001 (1 page).

H. Zou, C. Zhou, Femtosecond Pulse Shaping with Space-to-Time Conversion Based on Planar Optics, Optik Optics, ScienceDirect, 2006/2007, pp. 5-8.

H.A. Kim et al.; "Expanded concept of the adiabatic population transfer using dressed states"; Physical Review A, vol. 59, No. 2; Feb. 1999; pp. 1404-1407.

H.S. Eisenberg et al.; "Phase Defects in Self-Focusing of Ultrashort Pulses"; Physical Review Letters, vol. 83, No. 3, Jul. 19, 1999; pp. 540-543.

H.S. Moon et al.; "Coherence control using the ratio of Rabi frequencies for complete coherent inversion in a four-level system"; J. Phys. B At. Mol. Phys. vol. 32; 1999; pp. 987-999.

Hacker, M. et al.; "Frequency doubling of phase-modulated, ultrashort laser pulses"; Appl. Phys. B 73; 2001; pp. 273-277.

Haner, M., et al., "Generation of programmable, picosecond-resolution shaped laser pulses by fiber-grating pulse compression", Optics Letters, vol. 12, No. 6, (Jun. 1987), pp. 398-400, Optical Society of America.

Hanna, Sherif F. et al., "Electronic-resonance-enhanced coherent anti-Stokes Raman spectroscopy of nitric oxide"; Applied Physics Letters; vol. 83, No. 9, Sep. 1, 2003; pp. 1887-1889.

Hans U. Stauffer et al.; "Simultaneous phase control of Li2 wave packets in two electronic states"; Journal of Chemical Physics, vol. 116, No. 3; Jan. 15, 2002; pp. 946-954.

Hasan, T. et al.; "Photodynamic Therapy of Cancer"; Chapter 40 in Holland Frei Cancer Medicine; BC Dekker Inc.; 2003.

Heritage, J.P., "Picosecond pulse shaping by spectral phase and amplitude manipulation", Optics Letters, vol. 10, No. 12, (Dec. 1985), pp. 609-611, Optical Society of America.

Herschel Rabitz et al.; "Optimal Control of Molecular Motion: Design, Implementation and Inversion"; Acc. Chem. Res., vol. 33, No. 8; 2000; pp. 572-578.

Herschel Rabitz et al.; "Whither the Future of Controlling Quantum Phenomena?"; Science magazine, vol. 288; May 5, 2000; pp. 824-828.

Hilary K. Eaton et al.; "Investigating Nonlinear Femtosecond Pulse Propagation with Frequency-Resolved Optical Gating"; IEEE Journal of Quantum Electronics, vol. 35, No. 4, Apr. 1999; pp. 451-458.

Hillegas, C.W. et al.; "Femtosecond laser pulse shaping by use of microsecond radio-frequency pulses"; Optics Letters; vol. 19, No. 10; May 15, 1994; pp. 737-739.

Hoki, K. et al., Locally Designed Pulse Shaping for Selective Preparation of Enantiomers from their Racemate, Journal of Chemical Physics, New York, NY, US, vol. 114, No. 4, Jan. 22, 2001, pp. 1575-1581.

Hoki, K. et al., Selective Preparation of Enantiomers from a Racemate by Laser Pulses: Model Simulation for Oriented Atropisomers with Coupled Rotations and Torsions, Chemical Physics Elsevier Netherlands, vol. 267, No. 1-3, Jun. 1, 2001, pp. 59-79.

Hornung, Thomas et al.; "Adapting optimum control theory and using learning loops to provide experimentally feasible shaping mask patterns"; Journal of Chemical Physics; vol. 115, No. 7; Aug. 15, 2001; pp. 3105-3111.

Hosseini, S. Abbas et al.; "Coherent control of multiphoton transitions with femtosecond pulse shaping"; Physical Review A; pp. 033410-1-033410-7.

Hu et al.; "A New Nonlinear Optical Crystal-$BaAlBO_3F_2(BABF)$"; Japanese Journal of Applied Physics, vol. 41, No. 10B, Part 2, Oct. 15, 2002; pp. L1131-L1133.

(56) References Cited

OTHER PUBLICATIONS

I. Amat-Roldan et al.; "Measurement of electric field by interferometric spectral trace observation"; Optics Letters, vol. 30, No. 9; May 1, 2005; pp. 1063-1065.

I. Amat-Roldan et al.; "Starch-based second-harmonic-generated colinear frequency-resolved optical gating pulse characterization at the focal plane of a high-numerical-aperture lens"; Optics Letters, vol. 29, No. 19; Oct. 1, 2004; pp. 2282-2284.

I. Bar et al.; "Direct observation of preferential bond fission by excitation of a vibrational fundamental: Photodissociation of HOD (0,0,1)"; J. Chem. Phys., vol. 93, No. 3; Aug. 1, 1990; pp. 2146-2148.

I. Bar et al.; "Mode-selective bond fission: Comparison between the photodissociation of HOD (0,0,1) and HOD (1,0,0)"; J. Chem. Phys. vol. 95, No. 5; Sep. 1, 1991; pp. 3341-3346.

I.G. Cormack et al.; "Rapid measurement of ultrashort-pulse amplitude and phase from a two-photon absorption sonogram trace"; J. Opt. Soc. Am. B; vol. 18, No. 9, Sep. 2001; pp. 1377-1382.

Iaconis, C. et al.; "Direct Interferometric Techniques for Characterizing Ultrashort Optical Pulses"; IEEE Journal of Selected Topics in Quantum Electronics, vol. 4, No. 2; Mar./Apr. 1998; pp. 285-294.

Iaconis, C. et al.; "Spectral phase interferometry for direct electric-field reconstruction of ultrashort optical pulses"; Optics Letters, vol. 23, No. 10, May 15, 1998; pp. 792-794.

Imeshev, G. et al. "Engineerable femtosecond pulse shaping by second-harmonic generation with Fourier synthetic quasi-phase-matching gratings"; Optics Letters; vol. 23, No. 11; Jun. 1, 1998; pp. 864-866.

J. Ahn et al.; "Information Storage and Retrieval Through Quantum Phase"; Science Magazine, vol. 287; Jan. 21, 2000; pp. 463-465.

J. Ahn et al.; "Quantum Phase Retrieval of a Rydberg Wave Packet Using a Half-Cycle Pulse"; Physical Review Letters, vol. 86, No. 7; Feb. 12, 2001; pp. 1179-1182.

J. M. Dudley, et al.; "Direct measurement of pusle distortion near the zero-disperson wavelength in an optical fiber by frequency-resolved optical gating"; Optics Letters, vol. 22, No. 7; Apr. 1, 1997; 457-459.

J. Peatross et al.; "Temporal decorrelation of short laser pulses"; J. Opt. Soc. Am. B, vol. 15, No. 1; Jan. 1998; pp. 216-222.

J. W. Nicholson et al.; "Full-field characterization of femtosecond pulses by spectrum and cross-correlation measurements"; Optics Letters, vol. 24, No. 23; Dec. 1, 1999; pp. 1774-1776.

J.F. Christian et al.; "Rubidium electronic wavepackets probed by a phase-sensitive pump-probe technique"; Optics Communications, vol. 103, No. 1/2; Nov. 1, 1993; pp. 79-84.

J.G. Underwood et al.,; "Switched Wave Packets: A Route to Nonperturbative Quantum Control"; Physical Review Letters, vol. 90, No. 22; Jun. 6, 2003; pp. 223001-1-223001-4.

J.J. Garcia-Ripoll et al.; "Speed Optimized Two-Qubit Gates with Laser Coherent Control Techniques for Ion Trap Quantum Computing"; Physical Review Letters, vol. 91, No. 15; Oct. 10, 2003; pp. 157901-1-157901-4.

J.J. Gerdy et al.; "Femtosecond selective control of wave packet population"; Chemical Physics Letters, vol. 171, No. 1/2; Jul. 27, 1990; pp. 1-4.

J.M. Geremia et al.; "Incorporating physical implementation concerns into closed loop quantum control experiments"; Journal of Chemical Physics, vol. 113, No. 24; Dec. 22, 2000; pp. 10841-10848.

J.P. Likforman et al.; "Measurement of photon echoes by use of femtosecond Fourier-transform Spectral Interferometry"; Optics Letters, vol. 22, No. 14; Jul. 15, 1997; pp. 1104-1106.

J.P. Ogilvie et al.; "Fourier transform measurement of two-photon excitation spectra: applications to microscopy and optimal control"; Optics Letters, vol. 30, No. 8; Apr. 15, 2005; pp. 911-913.

J.S. Keller et al.; "Selective bond fission in methyl mercaptan at 193 nm via radial derivative coupling between the 21A and 11A adiabatic electronic states"; J. Chem. Phys. vol. 96, No. 6; Mar. 15, 1992; pp. 4324-4329.

J.S. Melinger et al.; "Adiabatic population inversion in I2 vapor with picosecond laser pulses"; J. Chem Phys. vol. 95, No. 3; Aug. 1, 1991; pp. 2210-2213.

J.S. Melinger et al.; "Adiabatic population transfer with frequency-swept laser pulses"; J. Chem. Phys. vol. 101, No. 8; Oct. 15, 1994; pp. 6439-6454.

J.S. Melinger et al.; "Generation of Narrowband Inversion with Broadband Laser Pulses"; vol. 68, No. 13; Mar. 30, 1992; pp. 2000-2003.

J.W. Nicholson et al.; "Unbalanced third-order correlations for full characterization of femtosecond pulses"; Optics Letters, vol. 25, No. 24; Dec. 15, 2000; pp. 1801-1803.

Jasco Comparison Proven Spectroscopy & Chromatography Technology, J-815 Circular Dichroism Spectropolarimeter, Jasco UK, http://www.jasco.co.uk/j800.asp, Nov. 29, 2006; 2 pages.

Jeffrey A. Cina; "Nonlinear wavepacket interferometry for polyatomic molecules"; Journal of Chemical Physics, vol. 113, No. 21; Dec. 1, 2000; pp. 9488-9496.

Jeffrey L. Krause et al.; "Creating and Detecting Shaped Rydberg Wave Packets"; Physical Review Letters, vol. 79, No. 25; Dec. 22, 1997; pp. 4978-4981.

Jeffrey L. Krause et al.; "Optical control of molecular dynamics: Molecular cannons, reflectrons and wave-packet focusers"; J. Chem. Phys. 99(9); Nov. 1, 1993; pp. 6562-6578.

Jeffrey L. Krause et al.; "Quantum Control of Molecular Dynamics: The Strong Response Regime"; J. Phys. Chem; 1995, 99; pp. 13736-13747.

Jennifer L. Herek et al.; "Quantum control of energy flow in light harvesting"; Nature magazine, vol. 417; May 30, 2002; pp. 533-535.

Jerome Degert et al.; "Realization of a Time-Domain Fresnel Lens with Coherent Control"; Physical Review Letters, vol. 89, No. 20; Nov. 11, 2002; pp. 203003-1-203003-4.

Jerome Tignon et al.; "Spectral Interferometry of Semiconductor Nanostructures"; IEEE Journal of Quantum Electronics, vol. 35, No. 4; Apr. 1999; pp. 510-522.

Ji, Na, et al, "High-speed, low-photodamage nonlinear imaging using passive pulse splitters," Nature Methods, vol. 5, No. 2 (Feb. 2008) pp. 197-202.

Jiang, et al. "Spectral line-by-line pulse shaping," Optics Letters, vol. 30, No. 12 (Jun. 15, 2005) Optical Society of America, pp. 1557-1559.

Jiang, et al., "Line-by-line pulse shaping control of optical arbitrary waveform generation," Optics Express, vol. 13, No. 25, (Dec. 12, 2005) Optical Society of America, pp. 10431-10439.

Jianshu Cao et al.; "A simple physical picture for quantum control of wave packet localization"; J. Chem Phys., 107; Aug. 1, 1997; pp. 1441-1450.

Jianshu Cao et al.; "Intrapulse Dynamical Effects in Multiphoton Processes: Theoretical Analysis"; J. Phys. Chem. A; vol. 102, 1998; pp. 4284-4290.

Jianshu Cao et al.; "Molecular Pi Pulse for Total Inversion of Electronic State Population"; Physical Review Letters, vol., 80, No. 7; Feb. 16, 1998; pp. 1406-1409.

Jianshu Cao et al.; "Molecular pie pulses: Population inversion with positively chirped short pulses"; Journal of Chemical Physics, vol. 113, No. 5; Aug. 1, 2000; pp. 1898-1909.

Jianwei Che et al.; "Detection and Control of Molecular Quantum Dynamics"; J. Phys. Chem.; 1995; pp. 14949-14958.

Jianwei Che et al.; "Semiclassical Dynamics and Quantum Control in Condensed Phases: Application to 12 in a Solid Argon Matrix"; J. Phys. Chem. 1996, 100; pp. 7873-7883.

John D. Hybl et al; "Two-dimensional Fourier transform electronic spectroscopy"; Journal of Chemical Physics, vol. 115, No. 14; Oct. 8, 2001; pp. 6606-6622.

John M. Jean et al.; "Application of a multilevel Redfield theory to electron transfer in condensed phases"; J. Chem. Phys. 96; Apr. 15, 1992; pp. 5827-5842.

John M. Papanikolas et al.; "Erratum: Manipulation of rovibrational wave packet composition in the Li2 E(Eg) shelf state using intermediate state selection and shaped femtosecond laser pulses"; J. Chem Phys. 107, 4172; 1997; p. 10830.

John M. Papanikolas et al.; "Manipulation of rovibrational wave packet composition in the Li2 E(1Eg) shelf state using intermediate state selection and shaped femtosecond laser pulses"; J. Chem. Phys., vol. 107, No. 11; Sep. 15, 1997; pp. 4172-4178.

(56) References Cited

OTHER PUBLICATIONS

Joshua B. Ballard et al.; "Optimization of wave packet coefficients in Li 2 using an evolutionary algorithm: The role of resonant and nonresonant wavelengths"; Journal of Chemical Physics, vol. 116, No. 4; Jan. 22, 2002; pp. 1350-1360.
Joshua B. Ballard et al.; "Simultaneous control of time-dependent population transfer dynamics and wave-packet quantum interferences in Li2 by shaped ultrafast pulses"; Physical Review A 66; 2002; pp. 043402-1-043402-7.
Juan L.A. Chilla et al.; "Analysis of a Method of Phase Measurement of Ultrashort Pulses in the Frequency Domain"; IEEE Journal of Quantum Electronics, vol. 27, No. 5, May 1991; pp. 1228-1235.
Julie A. Gruetzmacher et al.; "Few-cycle mid-infrared pulse generation, characterization and coherent propagation in optically dense media"; Review of Scientific Instruments, vol. 73, No. 6; Jun. 2002; pp. 2227-2236.
Julie A. Gruetzmacher et al.; "Time and Frequency-Gated FID: a New Approach to Study the Vibrational Dephasing of Water"; Ultrafast Phenomena XII, 66; pp. 530-532.
Julie A. Mueller et al.; "Competing isomeric product channels in the 193 nm photodissociation of 2-chloropropene and in the unimolecular dissociation of the 2-propenyl radical"; Journal of Chemical Physics, vol. 114, No. 10; Mar. 8, 2001; pp. 4505-4521.
June-Koo Rhee et al.; "Real-time dispersion analyzer of femtosecond laser pulses with use of a spectrally and temporally resolved upconversion technique"; J. Opt. Soc. Am. B, vol. 13, No. 8; Aug. 1996; pp. 1780-1785.
Jung-Ho Chung et al.; "Ambiguity of Ultrashort Pulse Shapes Retrieved From the Intensity Autocorrelation and the Power Spectrum"; IEEE Journal on Selected Topics of Quantum Electronics, vol. 7, No. 4; Jul./Aug. 2001; pp. 656-666.
K.C. Chu et al.; "Temporal interferometric measurement of femtosecond spectral phase"; Optics Letters, vol. 21, No. 22; Nov. 15, 1996; pp. 1842-1844.
K.D. Belfield et al.; "Multiphoton-absorbing organic materials for microfabrication, emerging optical applications and non-destructive three-dimensional imaging"; J. of Phys. Organic Chem., 13; 2000; pp. 837-849.
K.H. Hong et al.; "Time-frequency analysis of chirped femtosecond pulses using Wigner distribution function"; Applied Physics B74 (Suppl), 2002; pp. S231-S236.
Kaindl, Robert A. et al.; "Generation, shaping, and characterization of intense femtosecond pulses tunable from 3 to 20 μm"; J. Opt. Soc. Am. B; vol. 17, No. 12; Dec. 2000; pp. 2085-2094.
Kakehata, Masayuki et al.; "Single-shot measurement of carrier-envelope phase changes by spectral interferometry"; Optics Letters, vol. 26, No. 18; Sep. 15, 2001; pp. 1436-1438.
Kane, Daniel J. et al.; "Single-shot measurement of the intensity and phase of a femtosecond UV laser pulse with frequency-resolved optical gating"; Optics Letters, vol. 19, No. 14; Jul. 15, 1994; pp. 1061-1063.
Kane, Daniel J. et al.; "Single-shot measurement of the intensity and phase of an arbitrary ultrashort pulse by using frequency-resolved optical gating"; Optics Letters, vol. 18, No. 10; May 15, 1993; pp. 823-825.
Kapteyn, Henry C. et al.; "A Comparison of Multipass Vs. Regenerative Ti:Sapphire Laser Amplifiers;" Kapteyn-Murnane Laboratories Inc., Boulder, CO, USA, www.kmlabs.com; (2003) 2 pages.
Kazunori Naganuma et al; "General Method for Ultrashort Light Pulse Chirp Measurement"; IEEE Journal of Quantum Electronics, vol. 25, No. 5; Jun. 1989; pp. 1225-1233.
Kazuya Takasago et al.; "Evaluation of Femtosecond Pulse Shaping with Low-Loss Phase-Only Masks"; IEEE Journal of Selected Topics in Quantum Electronics, vol. 4, No. 2; Mar./Apr. 1998; pp. 346-352.
Kenji Mishima et al.; "A theoretical study on laser control of a molecular nonadiabatic process by ultrashort chirped laser pulses"; Journal of Chemical Physics, vol. 109., No. 5; Aug. 1, 1998; pp. 1801-1809.
Kenji Mishima et al.; "Theoretical study on quantum control of photodissociation and photodesorption dynamics by femtosecond chirped laser pulses"; Journal of Chemical Physics, vol. 110, No. 16; Apr. 22, 1999; pp. 7756-7769.
Kim, D.S. et al; "Femtosecond pulse distortion in GaAs quantum wells and its effect on pump-probe or four-wave-mixing experiments"; Physical Review B; vol. 50, No. 24; Dec. 15, 1994; pp. 18240-18249.
Kohler, Bern et al.; "Phase and intensity characterization of femtosecond pulses from a chirped-pulse amplifier by frequency-resolved optical gating"; Optics Letters, vol. 20, No. 5; Mar. 1, 1995; pp. 483-485.
Kolenda, Jürgen, et al., "Pulse Shaping with the MIIPS-Process," Laser Technology, (Jan. 2008) Photonik International, p. 68.
Konorov, S.O., "Laser Breakdown with Millijoule Trains of Picosecond Pulses Transmitted through a Hollow-Core Photonic-Crystal Fiber", Laser Physics, vol. 13, No. 4, (2003) pp. 652-656.
Kosik, Ellen M., et al., "The effects of noise on ultrashort optical pulse measurement using SPIDER"; The Institute of Optics, University of Rochester, Rochester, NY; (2000) pp. 21-23.
Krausz, F., et al., "Generation of 33-fs optical pulses from a solid-state laser", Optics Letters, (Feb. 1, 1992), vol. 17, No. 3, Optical Society of America.
Kroner, D. et al., Asymmetric Laser Excitation in Chiral Molecules: Quantum Simulations for a Proposed Experiment, Chemical Physics Letters Elsevier Netherland, vol. 372, No. 1-2, Apr. 22, 2003, pp. 242-248.
Kubo, Atsushi, et al., "Femtosecond Imaging of Surface Plasmon Dynamics in a Nanostructured Silver Film," NANO Letters, vol. 5, No. 6 (2005) American Chemical Society, pp. 1123-1127.
L. Lepetit et al.; "Linear techniques of phase measurement by femtosecond spectral interferometry for applications in spectroscopy"; J. Opt. Soc. Am. B, vol. 12, No. 12; Dec. 1995; pp. 2467-2474.
L. Lepetit et al.; "Two-dimensional nonlinear optics using Fourier-transform spectral interferometry"; Optics Letters, vol. 21, No. 8; Apr. 15, 1996; pp. 564-566.
L. Marmet et al.; "Observation of Quasi-Landau Wave Packets"; Physical Review Letters, vol. 72, No. 24; Jun. 13, 1994; pp. 3779-3782.
L. Misoguti et al.; "Generation of Broadband VUV Light Using Third-Order Cascaded Processes"; Physical Review Letters, vol. 87, No. 1, Jul. 2, 2001; pp. 013601-1-013601-4.
L. Windhorn et al.; "Molecular dissociation by mid-IR femtosecond pulses"; Chemical Physics Letters 357, May 3, 2002; pp. 85-90.
L. Xu et al.; "Abstract-Programmable chirp compensation for 6-fs pulse generation with a prism-pair-formed pulse shaper"; IEEE Journal of Quantum Electronics; 36 (8): 893-899; Aug. 2000 (1 page).
L.D. Noordam et al.; "Redistribution of Rydberg States by Intense Picosecond Pulses"; Physical Review Letters, vol. 68, No. 10; Mar. 9, 1992; pp. 1496-1499.
L.D. Ziegler et al.; "Nonlinear polarization description of phase-locked pulse-pair spectroscopy"; J. Chem. Phys., vol. 97, No. 7; Oct. 1, 1992; pp. 4704-4713.
L.J. Butler et al.; "Bond selective photochemistry in CH2BrI through electronic excitation at 210 nm"; J. Chem. Phys., vol. 84, No. 7; Apr. 1, 1986; pp. 4104-4106.
L.J. Butler et al.; "The electronic state-selective photodissociation of CH2BrI at 248, 210 and 193 nm"; J. Chem. Phys. vol. 86, No. 4; Feb. 15, 1997; pp. 2051-2074.
Laarmann, T., et al., "Femtosecond pulse shaping as analytic tool in mass spectrometry of complex polyatomic systems," J Phys B-at Mol Opt 2008;41(7).
Langchi Zhu et al.; "Coherent Laser Control of the Product Distribution Obtained in the Photoexcitation of Hi"; Science Magazine, vol. 270; Oct. 6, 1995; pp. 77-80.
Lange, H. Rudiger et al.; "Reconstruction of the Time Profile of Femtosecond Laser Pulses through Cross-Phase Modulation"; IEEE Journal of Selected Topics in Quantum Electronics, vol. 4, No. 2; Mar./Apr. 1998; pp. 295-300.
Larson, D.R. et al.; "Water soluble quantum dots for multiphoton imaging in vivo"; Science 300: May 30, 2003; pp. 1434-6.

(56) References Cited

OTHER PUBLICATIONS

Leibfried, D. et al.; "Quantum information with trapped ions at NIST"; Journal of Modern Optics; vol. 50, No. 6/7; Apr.-May 2003; pp. 1115-1129.
Lemoff, B.E., et al., "Quintic-phase-limited, spatially uniform expansion and recompression of ultrashort optical pulses", Optics Letters, vol. 18, No. 19, (Oct. 1, 1993), pp. 1651-1653, Optical Society of America.
Lim, Sang-Hyun et al.; "Single-Pulse Phase-Control Interferometric Coherent Anti-Stokes Raman Scattering Spectroscopy;" Physical Review A, 72, (Oct. 2005); pp. 041803-1-041803-4.
Link, Stephan et al.; "Optical Properties and Ultrafast Dynamics of Metallic Nanocrystals;" Annu. Rev. Phys. Chem. 54, 2003; pp. 331-369.
Liu, Yongqian, et al., "Terahertz Waveform Synthesis via Optical Pulse Shaping", IEEE Journal of Selected Topics in Quantum Electronics, (Sep. 1996), vol. 2, No. 3, pp. 709-719.
Lorenzo Pesce et al.; "Quantum dynamics simulation of the ultrafast photoionization of Li2"; Journal of Chemical Physics, vol. 114, No. 3; Jan. 15, 2001; pp. 1259-1271.
Lozovoy, V. V. et al.: "Multiphoton Intrapulse Interference. IV. Ultrashort Laser Pulse Spectral Phase Characterization and Compensation;" Optics Letters, vol. 29, No. 7, Apr. 1, 2004; pp. 775-777.
Lozovoy, V. V. et al.; "Cascaded Free-Induction Decay Four-Wave Mixing;" Chemical Physics 266, 2001, pp. 205-212.
Lozovoy, V. V. et al.; "Femtosecond Spectrally Dispersed Three-Pulse Four-Wave Mixing: The Role of Sequence and Chirp in Controlling Intramolecular Dynamics;" J. Raman Spectroscopy 31, 2000; pp. 41-49.
Lozovoy, V. V. et al.; "Photon Echo Pulse Sequences With Femtosecond Shaped Laser Pulses As a Vehicle for Molecule-Based Quantum Computation;" J. Chemical Physics Letters 351, Jan. 10, 2002; pp. 213-221.
Lozovoy, V. V. et al.; "Spectral Phase Optimization of Femtosecond Laser Pulses for Narrow-Band, Low-Background Nonlinear Spectroscopy;" Optics Express, vol. 13, No. 26, Dec. 26, 2005; pp. 10882-10887.
Lozovoy, V. V. et al.; "Systematic Control of Nonlinear Optical Processes Using Optimally Shaped Femtosecond Pulses;" ChemPhysChem, Wiley-VCH Verlag GmbH & Co. KGaA, Weinheim, 6, 2005; pp. 1970-2000.
Lozovoy, V. V. et al.; "The Role of Microscopic and Macroscopic Coherence in Laser Control;" Chemical Physics 267, 2001; pp. 99-114.
Lozovoy, V. V. et al.; "The Role of Pulse Sequences in Controlling Ultrafast Intramolecular Dynamics With Four-Wave Mixing;" Int. Rev. In Physical Chemistry, vol. 19, No. 4, 2000; pp. 531-552.
Lozovoy, V. V., et al., "Laser Control of Physicochemical Processes; Experiments and Applications," The Royal Society of Chemistry 2006, Annu. Rep. Prog. Chem, Sect. C, 102. www.rsc.org/annrepc (2006) pp. 227-258.
Lozovoy, V.V. et al; "What Role Can Four-Wave Mixing Techniques Play in Coherent Control?;" Advances in Multiphoton Processes and Spectroscopy 14; and Quantum Control of Molecular Reaction Dynamics, edited by R.J. Gordon and Y. Fujimura, World Scientific, Singapore, 2000; pp. 62-79.
Lozovoy, V.V.; "Multiphoton intrapulse interference. II. Control of two- and three-photon laser induced fluorescence with shaped pulses"; J. Chem. Phys. 118 (7); Feb. 15, 2005; pp. 3187-3196.
Lozovoy, Vadim V., et al., "Direct measurement of spectral phase for ultrashort laser pulses," Optics Express, vol. 16, No. 2 (Jan. 21, 2008) pp. 592-597.
Lu, Y.M. et al.; "Highly sensitive two-photon chromophores applied to three dimensional lithographic microfabrication: design, synthesis and characterization towards two-photon absorbtion cross section"; J. Mater Chem. 14(1); 2004; pp. 75-80.
Lutfur R. Khundkar et al.; "Ultrafast Molecular Reaction Dynamics in Real-Time: Progress Over a Decade"; Annu. Rev. Phys. Chem., 1990; pp. 15-60.
M. Armstrong et al.; "Versatile seven-femtosecond pulse compressor of parametrically amplified pulses using adaptive optics: studies of the primary events in protein dynamics"; Applied Physics B 74 (Suppl), 2002; pp. S127-S132.
M. Bergt et al.; "Controlling the Femtochemistry of Fe(CO)5"; J. Phys. Chem. A, vol. 103, No. 49; 1999; pp. 10381-10387.
M. Bergt et al.; "Time-resolved organometallic photochemistry Femtosecond fragmentation and adaptive control of CpFe(CO)2X (X=Cl,Br,I)"; Journal of Organometallic Chemistry 661; 2002; pp. 199-209.
M. Dantus et al., "Experimental Coherent Laser Control of Physicochemical Processes", Chem. Rev. 2004, 104, pp. 1813-1859.
M. Gruebele; "Fully quantum coherent control"; Chemical Physics 267; 2001; pp. 33-46.
M. Hacker et al., "Iterative Fourier Transform Algorithm for Phase-Only Pulse Shaping", Optics Express, vol. 9, No. 4, Aug. 13, 2001, pp. 191-199.
M. Hentschel et al.; "Attosecond metrology"; Nature, vol. 414; Nov. 29, 2001; pp. 509-513.
M. Hentschel et al.; "Generation of 0.1-TW optical pulses with a single-stage Ti:sapphire amplifier at a 1-kHz repetition rate"; Appl. Phys. B 70 [Suppl.]; 2000; pp. S161-S164.
M. Ovchinnikov et al.; "Semiclassical molecular dynamics computation of spontaneous light emission in the condensed phase: Resonance Raman spectra"; Journal of Chemical Physics, vol. 114, No. 16; Apr. 22, 2001; pp. 7130-7143.
M. Renard et al.; "Controlling ground-state rotational dynamics of molecules by shaped femtosecond laser pulses"; Physical Review A 69; 2004; 043401-1-043401-6.
M. Schurenberg et al.; "Abstract-Laser desorption/ionization mass spectrometry of peptides and proteins with particle suspension matrixes"; Analytical Chemistry; 71 (1): 221-229; Jan. 1, 1999 (1 page).
M. Sterling et al.; "Interrogation and control of condensed phase chemical dynamics with linearly chirped pulses: 12 in solid Kr"; J. Chem. Phys. 104; May 1, 1996; pp. 6497-6506.
M. Wollenhaupt et al.; "Interferences of Ultrashort Free Electron Wave Packets"; Physical Review Letters, vol. 89, No. 17; Oct. 21, 2002; pp. 173001-1-173001-4.
M.A. Bouchene et al.; "Temporal coherent control induced by wave packet interferences in one and two photon atomic transitions"; The European Physical Journal D, vol. 2; 1998; pp. 131-141.
M.C. Chen et al.; "Coherent control multiphoton processes in semiconductor saturable Bragg reflector with freezing phase algorithm"; Appl. Phys. B 80; 2005; pp. 333-340.
M.C. Chen et al.; "Freezing phase scheme for fast adaptive control and its application to characterization of femtosecond coherent optical pulses reflected from semiconductor saturable absorber mirrors"; J. Opt. Soc. Am. B, vol. 22, No. 5; May 2005; pp. 1134-1142.
M.E. Fermann et al.; "Shaping of ultrashort optical pulses by using an integrated acousto-optic tunable filter"; Optics Letters, vol. 18, No. 18; Sep. 15, 1993; pp. 1505-1507.
M.F. DeCamp et al.; "Dynamics and coherent control of high-amplitude optical phonons in bismuth"; Physical Review B, vol. 64; 2001; pp. 092301-1-092301-3.
M.M. Salour et al.; "Observation of Ramsey's Interference Fringes in the Profile of Doppler-Free Two-Photon Resonances"; Physical Review Letters, vol. 38, No. 14; Apr. 4, 1977; pp. 757-760.
M.O. Scully, et al.; "Fast Cars: Engineering a laser spectroscopic technique for rapid identification of bacterial spores"; PNAS; vol. 99, No. 17; Aug. 20, 2002; pp. 10994-11001.
M.R. Fetterman et al.; "Propagation of Complex Laser Pulses in Optically Dense Media"; The American Physical Society, Physical Review Letters, vol. 82, No. 20, May 17, 1999; pp. 3984-3987.
MA R., et al., Intense Femtosecond Laser Field-Induced Coulomb Fragmentation of C2H4, International Journal of Mass Spectrometry, Elsevier, Amsterdam, NL, vol. 242, No. 1, Mar. 15, 2005, pp. 43-48.
Marco A. Krumbugel et al.; "Direct ultrashort-pulse intensity and phase retrieval by frequency-resolved optical gating and a computational neural network"; Optics Letters, vol. 21, No. 2; Jan. 15, 1996; pp. 143-145.

(56) References Cited

OTHER PUBLICATIONS

Marcos Dantus; "Coherent Nonlinear Spectroscopy: From Femtosecond Dynamics to Control"; Annu. Rev. Phys. Chem. 2001; pp. 639-679, C1-C7.
Marcos Dantus; GeneticAlgorithm-v4.nb to simulate an adaptive genetic algorithm;Oct. 2001; pp. 1-7.
Marvet, Una et al.; "Femtosecond Concerted Elimination of Halogen Molecules From Halogenated Alkanes;" Phys. Chem. Chem. Phys., 2, 2000; pp. 885-891.
Marvet, Una et al.; "Femtosecond Dynamics of Photoinduced Molecular Detachment From Halogenated Alkanes. I. Transition State Dynamics and Product Channel Coherence;" J. Chem. Phys., vol. 109, No. 11, Sep. 15, 1998.
Marvet, Una et al.; "Femtosecond Dynamics of Unimolecular and Unrestricted Bimolecular Reactions;" J. Phys. Chem. A, vol. 102, No. 23, 1998; pp. 4111-4117.
Marvet, Una et al.; "Femtosecond Observation of a Concerted Chemical Reaction;" Chemical Physics Letters, 256, Jun. 21, 1996; pp. 57-62.
Marvet, Una et al.; "Femtosecond Photoassociation Spectroscopy: Coherent Bond Formation;" Chemical Physics Letters, 245, Nov. 3, 1995; pp. 393-399.
Matuschek. N.; "Back-side-coated chirped mirrors with ultrasmooth broadband dispersion characteristics"; Applied Physics B 71; Sep. 6, 2000; pp. 509-522.
May, Volkhard et al., "Theory of ultrafast nonresonant multiphoton transitions in polyatomic molecules: Basics and application to optimal control theory," J. Chem. Phys. 127 (2007) pp. 144102-1 through 144102-11.
McGraw-Hill Encyclopedia of Science & Technology, 6th Ed.; "Mass spectrometry"; 1987; pp. 492-502 (12 pages).
Meshulach D. et al.; "Adaptive ultrashort pulse compression and shaping"; Optics Communications 138; 1997; pp. 345-348.
Meshulach, D. et al.; "Adaptive real-time femtosecond pulse shaping"; J. Opt. Soc. Am. B; vol. 15, No. 5; May 1998; pp. 1615-1619.
Meshulach, D., et al., "Adaptive Compression of Femtosecond Pulses", presented at the Ultrafast Optics 1997 Conference, Aug. 1997, Monterey California (3 pages).
Meshulach, M. et al.; "Coherent quantum control of multiphoton transitions by shaped ultrashort optical pulses" Phys. Rev. A 60; 1999; pp. 1287-1292.
Michael J. Bronikowski et al.; "Bond-specific chemistry: OD:OH product ratios for the reactions H+HOD(100) and H+HOD(001)"; J. Chem. Phys., vol. 95, No. 11; Dec. 1, 1991; pp. 8647-8648.
Michael J. Stimson et al.; "Noisy-light correlation functions by frequency resolved optical gating"; J. Opt. Soc. Am. B, vol. 15, No. 2; Feb. 1998; pp. 505-514.
Michael Messina et al.; "Quantum control of multidimensional systems: Implementation within the time-dependent Hartree approximation"; J. Chem Phys. 104; Jan. 1996; pp. 173-182.
Michel F. Emde et al.; "Spectral interferometry as an alternative to time-domain heterodyning"; Optics Letters, vol. 22, No. 17; Sep. 1, 1997; pp. 1338-1340.
Michelmann, K. et al.; "Measurement of the Page function of an ultrashort laser pulse"; Optics Communications; Oct. 15, 2001, pp. 163-170.
Midorikawa, Katsumi, et al., "Phase-Matched High-Order Harmonic Generation by Guided Intense Femtosecond Pulses," IEEE Journal of Selected Topics in Quantum Electronics, vol. 5, No. 6 (Nov./Dec. 1999) pp. 1475-1485.
Mitra et al.; "Nonlinear Limits to the Information Capacity of Optical Fibre Communications"; Nature; vol. 411; Jun. 28, 2001; pp. 1027-1030.
Mohamed Aziz Bouchene et al.; "Interplay between wave packet interferences and second harmonic generation"; Optics Communications 181; 2000; pp. 327-336.
Mohamed Aziz Bouchene et al.; "Wavepacket interferometry with chirped pulses"; J. Phys. B At. Mol. Opt. Phys. 32; 1999; pp. 5167-5177.

Montgomery, Matthew A., "Elucidation of Control Mechanisms Discovered during Adaptive Manipulation of [Ru(dpb)3](PF6)2 emission in the Solution Phase," American Chemical Society, J. Phys. Chem. A, vol. 111, No. 8 (2007) pp. 1426-1433.
Moshe Shapiro et al.; "Coherently Controlled Asymmetric Synthesis with Achiral Light"; Physical Review Letters, vol. 84, No. 8; Feb. 21, 2000; pp. 1669-1672.
Moshe Shapiro et al.; "Nonadiabatic wave packet dynamics: Experiment and theory in IBr"; Journal of Chemical Physics, vol. 110, No. 5; Feb. 1, 1999; pp. 2465-2473.
Moshe Shapiro et al.; On the Origin of Pulse Shaping Control of Molecular Dynamics; J. Phys. Chem. A, vol. 105, No. 105; 2001; pp. 2897-2902.
Motzkus, M., Open and Closed Loop Control of Complex Molecules with Shaped fs Pulses, 2003 International Conference Physics and Control. Proceedings (Cat. No. 03EX708), IEEE Piscataway, NJ, USA, vol. 3, 2003, p. 746, vol. 3.
Mustafa Demirplak et al.; "Optical control of molecular dynamics in a liquid"; Journal of Chemical Physics, vol. 116, No. 18; May 8, 2002; pp. 8028-8035.
N. Dudovich et al.; "Quantum Control of the Angular Momentum Distribution in Multiphoton Absorption Processes"; Physical Review Letters, vol. 93, No. 10; Mar. 12, 2004; pp. 103003-1-103003-4.
N. Dudovich et al.; "Single-pulse coherent anti-Stokes Raman spectroscopy in the fingerprint spectral region"; J. of Chem. Phys., vol. 118, No. 20; May 22, 2003; pp. 9208-9215.
N. Karasawa et al.; "Optical pulse compression to 5.0 fs by by use only a spatial light modulator for phase compensation"; J. Opt. Soc. Am. B, vol. 18, No. 11; Nov. 2001; pp. 1742-1746.
N.F. Scherer et al.; "Fluorescence-detected wave packet interferometry. II. Role of rotations and determination of the susceptibility"; J. Chem. Phys., vol. 96, No. 6; Mar. 15, 1992; pp. 4180-4194.
N.F. Scherer et al.; "Time resolved dynamics of isolated molecular systems studied with phase-locked femtosecond pulse pairs"; J. Chem Phys. vol. 93, No. 1; Jul. 1, 1990; pp. 856857.
N.H. Damrauer et al.; "Control of bond-selective photochemistry in CH2BrCI using adaptive femtosecond pulse shaping"; The European Physical Journal D, 20, 2002; pp. 71-76.
Neil Shafer et al.; "Isotope effect in the photodissociation of HDO at 157.5 nm"; J. Chem. Phys., vol. 90, No. 11; Jun. 1, 1989; pp. 6807-6808.
Nicholson, J.W. et al; "Noise sensitivity and accuracy of femtosecond pulse retrieval by phase and intensity from correlation and spectrum only (PICASO)"; J. Opt. Soc. Am. B; vol. 19, No. 2; Feb. 2002; pp. 330-339.
Niels E. Henriksen; "Laser control of chemical reactions"; Chem. Soc. Rev. 3137 42; 2002; pp. 37-42.
Nirit Dudovich et al.; "Coherent Transient Enhancement of Optically Induced Resonant Transitions"; Physical Review Letters, vol. 88, No. 12; Mar. 25, 2002; pp. 123004-1-123004-4.
Nirit Dudovich et al.; "Single-pulse coherently controlled nonlinear Raman spectroscopy and microscopy"; Nature magazine, vol. 418; Aug. 1, 2002; pp. 512-514.
Nisoli, M., et al., "Compression of high-energy laser pulses below 5fs", Optics Letters, (Apr. 15, 1997) vol. 22, No. 8, pp. 522-524, Optical Society of America.
Nisoli, M., et al., "Generation of high energy 10 fs pulses by a new pulse compression technique," Appl. Phys. Lett., vol. 68, No. 20 (May 13, 1996) pp. 2793-2795.
Norbert F. Scherer et al.; "Fluorescence-detected wave packet interferometry: Time resolved molecular spectroscopy with sequences of femtosecond phase-locked pulses"; J. Chem. Phys., vol. 95, No. 3; Aug. 1, 1991; pp. 1487-1511.
Noriaki Tsurumachi et al.; "Interferometric observation of femtosecond free induction decay"; Optics Letters, vol. 19, No. 22, Nov. 15, 1994; pp. 1867-1869.
Nuernberger, Patrick, "Femtosecond quantum control of molecular dynamics in the condensed phase," Invited Article, Physical Chemistry Chemical Physics, The Owner Societies, vol. 9 (2007) pp. 2470-2497.
O'Shea, Patrick et al., "Highly simplified device for ultrashort-pulse measurement" Optics Letter/vol. 26, No. 12/Jun. 15, 2001.

(56) References Cited

OTHER PUBLICATIONS

O.M. Sarkisov et al.; "Control of elementary chemical reactions by femtosecond light pulses"; Quantum Electronics, vol. 31, No. 6; 2001; pp. 483-488.

Ocean Optics Inc.; "HR4000 High-resolution Spectrometer" http://oceanoptics.com/products/hr4000.asp; Jun. 25, 2005 (p. 1 of 4-p. 4 of 4).

Ocean Optics Inc.; "S2000 Miniature Fiber Optic Spectrometer" http://oceanoptics.com/products/s2000.asp; Jun. 25, 2005 (p. 1 of 4-p. 4 of 4).

Ocean Optics Inc.; "USB2000 Miniature Fiber Optic Spectrometer" http://oceanoptics.com/products/usb2000.asp; Jun. 25, 2005 (p. 1 of 7-p. 6 of 7).

Ogilvie, Jennifer P., et al., "Use of coherent control for selective two-photon fluorescence microscopy in live organisms," Optical Society of America (Jan. 2006) 8 pages.

Ohno, Kimihisa, et al., "Adaptive pulse shaping of phase and amplitude of an amplified femtosecond pulse laser by direct reference to frequency-resolved optical gating traces," J. Opt. Soc. Am. B vol. 19, No. 11 (Nov. 2002) pp. 2781-2790.

Oron, Dan, et al., "Scanningless depth-resolved microscopy," Optics Express, vol. 13, No. 5 (Mar. 7, 2005).

Osborn, D.L. et al.; "Spectral and intensity dependence of spatially resolved two-photon conductivity defects on a GaAsP photodiode"; J. Appl. Phys 89; 2001; pp. 626-633.

P. Balling et al.; "Interference in climbing a quantum ladder system with frequency-chirped laser pulses"; Physical Review A, vol. 50, No. 5; Nov. 1994; pp. 4276-4285.

Panasenko, Dmitriy et al.; "Single-shot sonogram generation for femtosecond laser pulse diagnostics by use of two-photon absorbtion in a silicon CCD camera"; Optics Letters; vol. 27, No. 16; Aug. 15, 2002; pp. 1475-1477.

Pastirk, I. et al.; "2D (time-frequency) Femtosecond Four-Wave Mixing At $10^{14} W/cm^2$: Molecular and Electronic Response;" Symposium on Optical Pulse and Beam Propagation III, Photonics West, 2001; 3 pages.

Pastirk, I. et al.; "Control and Characterization of Intramolecular Dynamics with Chirped Femtosecond Three-Pulse Four-Wave Mixing;" J. Phys. Chem. A, vol. 103, No. 49, Sep. 23, 1999; pp. 10226-10236.

Pastirk, I. et al.; "Femtosecond Ground State Dynamics of Gas Phase N2O4 and NO2," Chemical Physics letters, vol. 349, Nov. 23, 2001; pp. 71-78.

Pastirk, I. et al.; "Femtosecond Photo Echo and Virtual Echo Measurements of the Vibronic and Vibrational Coherence Relaxation Times of Iodine Vapor;" Chemical Physics Letters, vol. 333, Jan. 5, 2001; pp. 76-82.

Pastirk, I. et al; "Selective two-photon microscopy with shaped femtosecond pulses"; Opt. Express 11; 2003; pp. 1695-1701.

Pastirk, I., et al., "Multidimensional Analytical Method Based on Binary Phase Shaping of Femtosecond Pulses," J. Phys. Chem. A, vol. 109, No. 11, Feb. 23, 2005; pp. 2413-2416.

Pastirk, I., et al., "No loss spectral phase correction and arbitrary phase shaping of regeneratively amplified femtosecond pulses using MIIPS," Optics Express, vol. 14, No. 20, (Oct. 2, 2006) pp. 9537-9543.

Pastrik, I. et al., "Sequences for Controlling Laser Excitation with Femtosecond Three-Pulse Four-Wave Mixing;" The Royal Society of Chemistry, vol. 113, 1999; pp. 401-424.

Pastrik, I. et al; "Quantum Control of the Yield of a Chemical Reaction;" J. Chem. Phys., vol. 108, No. 11, Mar. 15, 1998; pp. 4375-4378.

Paul R. Bolton et al.; "Propagation of intense, ultrashort laser pulses through metal vapor: refraction-limited behavior for single pulses"; J. Opt. Soc. Am. B, vol. 13, No. 2; Feb. 1996; pp. 336-346.

Paye, J.; "How to Measure the Amplitude and Phase of an Ultrashort Light Pulse with an Autocorrelator and a Spectrometer"; IEEE Journal of Quantum Electronics, vol. 30, No. 11; Nov. 1994; pp. 2693-2697.

Peifang Tian et al.; "Ultrafast measurement of two-photon absorption by loss modulation"; Optics Letters, vol. 27, No. 18; Sep. 15, 2002; pp. 1634-1636.

Pelfang Tian et al., Femtosecond Phase-Coherent Two-Dimensional Spectroscopy, Science American Assoc. Adv. Sci. USA, vol. 300, No. 5625, Jun. 6, 2003, pp. 1553-1555.

Peng, L. W. et al.; "Stepwise Solvation of the Intramolecular-Charge-Transfer Molecule p(Dimethylamino)benzonitrile;" J. Phys. Chem., 91, 1987, p. 6162.

Perry, Michael D., et al., "Terawatt to Petawatt Subpicosecond Lasers", Articles, (May 13, 1994), vol. 264, Science.

Pestov, Dimitry, et al., "Multiple Independent Comb Shaping (MICS): Phase-only generation of optical pulse sequences," Optics Express, vol. 17, No. 16 (Aug. 3, 2009) pp. 14351-14361.

Peter J. Delfyett et al.; "Joint Time-Frequency Meaurements of Mode-Locked Semiconductor Diode Lasers and Dynamics Using Frequency-Resolved Optical Gating"; IEEE Journal of Quantum Electronics, vol. 35, No. 4, Apr. 1999; pp. 487-500.

Pfeiffer, W., et al., "Ultrafast Spatio-Temporal Near-Field Control", IEEE 2005 European Quantum Electronics Conference, 0-7803-8973-5/05, (Jun. 2005) p. 169 (1 page).

Philip H. Bucksbaum; "Ultrafast control"; Nature magazine, vol. 421; Feb. 6, 2003; pp. 593-594. Kuhn & Weyn SR2 Sep. 4, 2001.

Photogen Technologies, Inc., "Photogen-Technology"; www.photogen.com/body/tech_body.html; Dec. 20, 2001 (19 pages).

PiStar Kinetic Circular Dichroism Spectrometer, http://www.phtophysics.com/pistar.php, Nov. 29, 2006; 3 pages.

Posthumus, J.H., "The dynamics of small molecules in intense laser fields," Reports on Progress in Physics, 67 (2004) Institute of Physics Publishing, pp. 623-665.

Postnikova, B.J. et al.; "Towards nanoscale three-dimensional fabrication using two-photon initiated polymerization and near-field excitation"; Microelectron. Eng. 69 (2-4); Sep. 2003; pp. 459-465.

Quiroga-Teixeiro, M.L., et al., "Compression of optical solitons by conversion of nonlinear modes", J. Opt. Soc. Am. B, vol. 12, No. 6, (Jun. 1995), pp. 1110-1116, Optical Society of America.

QWPO-AS, Zero Order Waveplates—Air Spaced, Optical Components and Assemblies, www.cvilaser.com, published Nov. 21, 2005; pp. 8-9.

R. Bartels et al., "Shaped-Pulse Optimization of Coherent Emission of High-Harmonic Soft X-Rays", 2000 Macmillan Magazines Ltd., Nature, vol. 406. Jul. 13, 2000, pp. 164-166.

R. deVivie-Riedle et al.; "Design and interpretation of laser pulses for the control of quantum systems"; Applied Physics B; 2000; pp. 285-292.

R. Netz et al.; "Coherent population dynamics of a three-level atom in spacetime"; Physical Review A, vol. 65; pp. 043406-1-043406-12.

R. Netz et al.; "Observation of Selectivity of Coherent Population Transfer Induced by Optical Interference"; Physical Review Letters, vol. 90, No. 6; Feb. 14, 2003; pp. 063001-1-063001-4.

R. Teets et al.; "Coherent Two-Photon Excitation by Multiple Light Pulses"; Physical Review Letters, vol. 38, No. 14; Apr. 4, 1977; lags. 760-764.

R. van Leeuwen et al.; "Coherent Control of the Energy and Angular Distribution of Autoionized Electrons"; Physical Review Letters, vol. 82, No. 14; Apr. 5, 1999; pp. 2852-2855.

R. van Leeuwen et al.; "Manipulation of differential electron yields via autoionizing wave-packet control"; Physical Review A, Vol, 63; 2001; pp. 033403-1-033403-5.

R. Wolleschensky et al.; "Characterization and Optimization of A Laser-Scanning Microscope in the Femtosecond Regime;" Applied Physics B 67, Lasers and Optics, 1998; pp. 87-94.

R. Zadoyan et al.; "Wavepacket diagnosis with chirped probe pulses"; Chemical Physics, vol. 233; 1998; pp. 353-363.

R.A. Bartels et al.; "Nonresonant Control of Multimode Molecular Wave Packets at Room Temperature"; Physical Review Letters, vol. 88, No. 3; Jan. 21, 2002; pp. 033001-1 through 033001-4.

R.B. Vrijen et al.; "Limitations on quantum ladder climbing in complex systems"; Physical Review A, vol. 56, No. 3; Sep. 1997; pp. 2205-2212.

R.J. Levis et al.; "Closing the Loop on Bond Selective Chemistry Using Tailored Strong Field Laser Pulses"; The Journal of Physical Chemistry, vol. 106, No. 27; Jul. 11, 2002; pp. 6427-6444.

(56) References Cited

OTHER PUBLICATIONS

R.L. VanderWal et al.; "Selectively breaking the O-H bond in HOD"; J. Chem. Phys., vol. 92, No. 1; Jan. 1, 1990; pp. 803-805.
R.R. Jones et al.; "Bound-state interferometry using incoherent light"; J. Phys. B 28 At. Mol. Opt. Phys.; 1995; pp. L405-L411.
R.R. Jones et al.; "Ramsey Interference in Strongly Driven Rydberg Systems"; Physical Review Letters, vol. 71, No. 16; Oct. 18, 1993; pp. 2575-2578.
R.R. Jones; "Interference Effects in the Multiphoton Ionization of Sodium"; Physical Review Letters, vol. 74, No. 7; Feb. 13, 1995; pp. 1091-1094.
R.R. Jones; "Multiphoton Ionization Enhancement Using Two Phase-Coherent Laser Pulses"; Physical Review Letters, vol. 75, No. 8; Aug. 21, 1995; pp. 1491-1494.
Radoslaw Uberna et al.; "Phase and amplitude control in the formation and detection of rotational wave packets in the E1Eg state of Li2"; Journal of Chemical Physics, vol. 108, No. 22; pp. 9259-9274.
Radoslaw Uberna et al.; "Phase control of wavepacket dynamic using shape femtosecond pulses"; Faraday Discuss, vol. 113; 1999; pp. 385-400.
Radoslaw Uberna et al.; "Ultrafast spectroscopy of wavelength-dependent coherent photoionization cross sections of Li2 wave packets in the E1Eg state: The role of Rydberg states"; Journal of Chemical Physics, vol. 114, No. 23; Jun. 15, 2001; pp. 10311-10320.
Reid, D.T. et al.; "Amplitude and phase measurement of mid-infrared femtosecond pulses by using cross-correlation frequency-resolved optical gating"; Optics Letters, vol. 25, No. 19, Oct. 1, 2000; pp. 1478-1480.
Reitze, D.H., et al., "Shaping of wide bandwidth 20 femtosecond optical pulses", Appl. Phys. Lett. 61 (11), (Sep. 14, 1992), pp. 1260-1262, American Institute of Physics.
Richard M. Williams et al.; "Compositional control of rovibrational wave packets in the E(1 Eg) "shelf" state of Li2 via quantum-state-resolved intermediate state selection"; J. Chem. Phys. vol. 106, No. 20; May 22, 1997; pp. 8310-8323.
Richard N. Zare; "Laser Control of Chemical Reactions"; Science magazine, vol. 279; Mar. 20, 1998; pp. 1875-1879.
Richard S. Judson et al.; "Teaching Lasers to Control Molecules"; Physical Review Letters, vol. 68, No. 10; Mar. 9, 1992; pp. 1500-1503.
Robert J. Levis et al.; "Selective Bond Dissociation and Rearrangement with Optimally Tailored, Strong-Field Laser Pulses"; Science Magazine, vol. 292; Apr. 27, 2001; pp. 709-713.
Rodriguez, George, et al., "Coherent Ultrafast MI-FROG Spectroscopy of Optical Field Ionization in Molecular H2, N2, and O2," IEEE Journal on Selected Topics in Quantum Electronics, vol. 7, No. 4 (Jul./Aug. 2001) pp. 579-591.
Roger G.M.P. Koumans et al.; "Time-Resolved Optical Gating Based on Dispersive Propagation: A New Method to Characterize Optical Pulses"; IEEE Journal of Quantum Electronics, vol. 36, No. 2, Feb. 2000; pp. 137-144.
Rosker, M. J. et al.; "Femtosecond Clocking of the Chemical Bond;" Science, vol. 241, Sep. 2, 1988; pp. 1200-1202.
Rosker, M. J. et al.; "Femtosecond Real-Time Probing of Reactions. I. The Technique;" J. Chem. Phys., vol. 89, No. 10, Nov. 15, 1988; pp. 6113-6127.
Roth, M. et al., Acousto-Optic Femtosecond Pulse Shaping in the Ultraviolet, Lasers and Electro-Optics, 2005. (Cleo). Conference in Baltimore, MD., USA, May 22-27, 2005, Piscataway, NJ, USA. IEEE, May 22, 2005, pp. 2244-2246.
Roth, M. et al., Acousto-optical Shaping of Ultraviolet Femtosecond Pulses, Applied Physics B; Lasers and Optics, Springer-Verlag, BE, vol. 80, No. 4-5, Apr. 1, 2005, pp. 441-444.
Roy, I. et al; "Ceramic-based nanoparticles entrapping water-soluble photosensitizing drugs: A novel drug carrier system for photodynamic therapy"; J. Am. Chem. Soc. 125; 2003, pp. 7860-7865.
S. Backus et al.; "16-fs, 1-μJ ultraviolet pulses generated by third-harmonic conversion in air"; Optics Letters, vol. 21, No. 9; May 1, 1996; pp. 665-667.
S. Kovtoun et al.; "Mass-Correlated Pulsed Extraction : Theoretical Analysis and Implementation With a Linear Matrix-Assisted Laser Desorption/Ionization Time of Flight Mass Spectrometer;" Journal of the American Society for Mass Spectrometry, Elsevier Science Inc., vol. 11, 2000; pp. 841-853.
S. Meyer et al.; "Photoelectron distributions from femtosecond pump/probe excitation with chirped probe pulses"; Journal of Chemical Physics, vol. 108, No. 18; pp. 7631-7636.
S. Yeremenko et al.; "The criterion of pulse reconstruction quality based on Wigner representation"; Applied Physics B 70 (Suppl); 2000; pp. S109-S117.
S. Zhang, X. Zhang, J. Huang, L. Deng, Z. Sun, W. Zhang, Z. Wang, Z. Xu, R.Li, Coherent Enhancement of Broadband Frequency Up-Conversion in BBO Crystal by Shaping Femtosecond Laser Pulses, Optics Communications, ScienceDirect, 2006/2007, pp. 559-563.
S.E. Harris; "Control of Feshbach resonances by quantum interference"; Physical Review A66; 2002; pp. 010701-1-010701-4.
S.N. Pisharody et al.; "Phase-controlled stair-step decay of autoionizing radial wave packets"; Physical Review A, vol. 65; 2002; pp. 033418-1-033418-10.
Sanders, A. W. et al.: "Observation of Plasmon Propagation, Redirection, and Fan-Out in Silver Nanowires" Nano Letters, American Chemical Society, Washington, DC, US, vol. 6, No. 8, Jun. 28, 2006, pp. 1822-1826, XP007901978, ISSN: 1530-6984.
Sanislav S. Bychkov et al.; "Laser coherent control of molecular chiral states via entanglement of the rotational and torsional degrees of freedom"; Journal of Raman Spectroscopy; 2002; pp. 962-973.
Sarah M. Gallagher et al.; "Heterodyne detection of the complete electric field of femtosecond four-wave mixing signals"; J. Opt. Soc. Am. B, vol. 15, No. 8; Aug. 1998; pp. 2338-2345.
Sato, Masamichi, et al., "Adaptive Pulse Shaping of Femtosecond Laser Pulses in Amplitude and Phase Through a Single-Mode Fiber by Referring to Frequency-Resolved Optical Gating Patterns", Jpn. J. Appl. Phys., vol. 41 (200); Part 1 No. 6A, Jun. 2002; XP002436366; pp. 3704-3709.
Scaffidi, J., et al., "Spatial and Temporal Dependence of Interspark Interactions in Femtosecond-Nanosecond Dual Pulse Laser-Induced Breakdown Spectroscopy", Applied Optics, vol. 43, No. 27, Sep. 20, 2004, XP-002462408, pp. 5243-5250.
ScanMail 10K—Scanna; Internet publication from Safer America; 2003.
Schreier, F. et al.; "Femtosecond pulse shaping with a stratified diffractive structure"; Optics Communications 185; 2000; pp. 227-231.
Scott A. Diddams et al.; "Characterizing the Nonlinear Propagation of Femtosecond Pulses in Bulk Media"; IEEE Journal of Selected Topics in Quantum Electronics, vol. 4, No. 2; Mar./Apr. 1998; pp. 306-316.
Sebastien Zamith et al.; "Observation of Coherent Transients in Ultrashort Chirped Excitation of an Undamped Two-Level System"; Physical Review Letters, vol. 87, No. 3; Jul. 16, 2001; pp. 033001-1-033001-4.
Serbin, J., et al., "Femtosecond lasers as novel tool in dental surgery," applied surface science, 197-198 (2002) pp. 737-740.
Sergey Yeremenko et al.; "Frequency-resolved pump-probe characterization of femtosecond infrared pulses"; Optics Letters, vol. 27, No. 13; Jul. 1, 2002; pp. 1171-1173.
Sharman, W.M. et al.: "Targeted photodynamic therapy via receptor mediated delivery systems"; Adv. Drug Delivery Rev. 56(1); Jan. 2004; pp. 53-76.
Shimizu, Satoru, et al., "Spectral phase transfer for indirect phase control of sub-20-fs deep UV pulses," Optics Express, vol. 13, No. 17 (Aug. 22, 2005) pp. 6345-6353.
Siders, C.W., et al., "Blue-shifted third-harmonic generation and correlated self-guiding during ultrafast barrier suppression ionization of subatmospheric density noble gases," J. Opt. Soc. Am. B/vol. 13, No. 2 (Feb. 1996) pp. 330-335.
Spielmann, C. et al.; "Ultrabroadband Femtosecond Lasers"; IEEE Journal of Quantum Electronics; vol. 30, No. 4; Apr. 1994; pp. 1100-1114.
Spielmann, C., et al., "Ti: Sapphire Laser Produces Intense Sub-5-Fs Pulses", Laser Focus World, May 97, vol. 33, Issue 5, p. 127.

(56) References Cited

OTHER PUBLICATIONS

Stobrawa, G. et al.; "A new high-resolution femtosecond pulse shaper"; Appl. Phys. B 72; 2001; pp. 627-630.
Stockman, Mark I. et al.; "Coherent Control of Femtosecond Energy Localization in Nanosystems;" Physical Review Letters, vol. 88, No. 6, Feb. 11, 2002; pp. 067402-1-067402-4.
Stuart A. Rice et al.; "Active control of product selection in a chemical reaction: a view of the current scene"; Phys. Chem. Chem. Phys.; 2002; pp. 1683-1700.
Stuart A. Rice; "Active Control of Molecular Dynamics: Coherence versus Chaos"; Journal of Statistical Physics, vol. 101, Nos. 1/2; 2000; pp. 187-212.
Stuart A. Rice; "Interfering for the good of a chemical reaction"; Nature magazine; vol. 409; Jan. 18, 2001; pp. 422-426.
Stuart A. Rice; "Optical control of reactions"; Nature magazine, vol. 403; Feb. 3, 2000; pp. 496-497.
Sullivan, A. et al.; "Quantitative investigation of optical phase-measuring techniques for ultrashort pulse lasers "; J. Opt. Soc. Am. B, vol. 13, No. 9; Sep. 1996; pp. 1965-1978.
Sun, H.B. et al.; "Two-photon laser precision microfabrication and its applications to micronano devices and systems"; J. Lightwave Technol. 21(3); Mar. 2003; pp. 624-633.
Surharev, Maxim et al.; "Coherent Control Approaches to Light Guidance in the Nanoscale;" The Journal of Chemical Physics 124, 2006; XP008086379; pp. 144707-1-144707-8.
Suzuki, Takayuki et al.; "Nontrivial Polarization Shaping of Femtosecond Pulses by Reference to the Results of Dual-Channel Spectral Interferomtry;" Applied Optics, vol. 43, No. 32, Nov. 10, 2004; pp. 6047-6050.
Sweetser, John N. et al.; "Transient-grating frequency-resolved optical gating"; Optics Letters, vol. 22, No. 8; Apr. 15, 1997; pp. 519-521.
Szipöcs, Robert, et al., "Chirped multilayer coatings for broadband dispersion control in femtosecond lasers", Optics Letters, (Feb. 1, 1994), vol. 19, No. 3, Optical Society of America.
T. Brixner et al.; "Abstract—Femtosecond quantum control"; Advances in Atomic, Molecular, and Optical Physics, vol. 46; 46: 1-54; 2001 (1 page).
T. Brixner et al.; "Abstract—Photoselective adaptive femtosecond quantum control in the liquid phase"; Nature; 414 (6859): 57-60; Nov. 1, 2001 (1 page).
T. Brixner et al.; "Feedback-controlled optimization of amplified femtosecond laser pulses"; Applied Physics B 68; 1999; pp. 281-284.
T. Brixner et al.; "Generation and characterization of polarization-shaped femtosecond laser pulses"; Applied Physics B74 (Suppl), 2002; pp. S133-S144.
T. Brixner et al.; "Liquid-phase adaptive femtosecond quantum control: Removing intrinsic intensity dependencies"; Journal of Chemical Physics, vol. 118, No. 8; Feb. 22, 2003; pp. 3692-3701.
T. Brixner et al.; "Photoselective adaptive femtosecond quantum control in the liquid phase"; Nature magazine, vol. 414; Nov. 2001; pp. 57-60.
T. Brixner et al.; "Problem complexity in femtosecond quantum control"; Chemical Physics 267; 2001; pp. 241-246.
T. Feurer et al.; "Measuring the temporal intensity of ultrashort laser pulses by triple correlation"; Appl. Phys. B; 1998; pp. 163-168.
T. Frohnmeyer et al.; "Femtosecond pump-probe photoelectron spectroscopy on Na2: a tool to study basic coherent control schemes"; Applied Physics B 71; 2000; pp. 259-266.
T. Hornung et al.; "Optimal control of one- and two-photon transitions with shaped femtosecond pulses and feedback"; Applied Physics B 71; 2000; pp. 277-284.
T. Kobayashi et al.; "Tunable visible and near-infrared pulse generator in a 5 fs regime"; Appl. Phys. B 70 (Suppl); 2000; pp. S239-S246.
T. Okada et al.; "Optical control of two-photon excitation efficiency of a-perylene crystal by pulse shaping"; Amer. Inst. of Phys., vol. 121, No. 13; Oct. 1, 2004; pp. 6386-6391.
T. Tanabe et al.; "Compensation for a Transfer Function of a Regenerative Amplifier to Generate Accurately Shaped Ultrashort Pulses in Both the Amplitude and Phase"; IEE J. of Selected Topics in QUantum Electonics, vol. 10, No. 1; Jan./Feb. 2004; pp. 221-228.

T. Witte et al.; "Controlling molecular ground-state dissociation by optimizing vibrational ladder climbing"; Journal of Chemical Physics, vol. 118, No. 5; Feb. 1, 2003; pp. 2021-2024.
T.C. Weinacht et al.; "Coherent learning control of vibrational motion in room temperature molecular gases"; Chemical Physics Letters 344; 2001; pp. 333-338.
T.C. Weinacht et al.; "Measurement of the Amplitude and Phase of a Sculpted Rydberg Wave Packet"; Physical Review Letters; vol. 80, No. 25; Jun. 22, 1998; pp. 5508-5511.
T.C. Weinacht et al.; "Toward Strong Field Mode-Selective Chemistry"; J. Phys. Chem. A, vol. 103, No. 49; 1999; pp. 10166-10168.
T.C. Weinacht et al.; "Using feedback for coherent control of quantum systems"; Journal of Optics B: Quantum and Semiclassical Optics; 2002; pp. R35-R52.
Tada, Junji, "Adaptively controlled supercontinuum pulse from a microstructure fiber for two-photon excited fluorescence microscopy," Applied Optics, vol. 46, No. 15, (May 20, 2007) pp. 3023-3030.
Tamaki, Y., "Phase-matched third-harmonic generation by nonlinear phase shift in a hollow fiber," Lasers and Optics Applied Physics B, vol. 67, (1998) pp. 59-63.
Thanopulos I. et al: Laser-Driven Coherent Manipulation of Molecular Chirality, Chemical Physics Letters Elsevier Netherlands, vol. 390, No. 1-3, May 21, 2004, pp. 228-235.
Thomas Hornung et al.; "Teaching optimal control theory to distill robust pulses even under experimental constraints"; Physical Review A, vol. 65; 2002; pp. 021403-1-021403-4.
Thomas J. Dunn et al.; "Experimental Determination of the Dynamics of a Molecular Nuclear Wave Packet via the Spectra of Spontaneous Emission"; Physical Review Letters, vol. 70, No. 22; May 31, 1993; pp. 3388-3391.
Ting, A., et al.; "Remote Atmospheric Breakdown for Standoff Detection by Using an Intense Short Laser Pulse," Applied Optics. Opt. Soc. America, USA, vol. 44, No. 25, XP002476098, Sep. 1, 2005; pp. 5315-5320.
Tomizawa H. et al., Development of Automatically Optimizing System of Both Spatial and Temporal Beam Shaping for UV-Laser Pulse, Proceedings of the SPIE—The International Society for Optical Engineering SPIE-Int. Soc. Opt. Eng USA, vol. 5481, No. 1, 2004, pp. 47-55.
Trebino, R. et al; "Measuring Ultrashort Laser Pulses Just Got a Lot Easier!"; Optics & Photonics News; Jun. 2001; pp. 22-25.
Trebino, Rick et al.; "Measuring ultrashort laser pulses in the time-frequency domain using frequency-resolved optical gating"; Rev. Sci. Instrum. 68 (9); Sep. 1997; pp. 3277-3295.
Trebino, Rick et al.; "The Dilemma of Ultrashort-Laser-Pulse Intensity and Phase Measurement and Applications"; IEEE Journal of Quantum Electronics, vol. 35, No. 4; Apr. 1999; pp. 418-420.
Trebino, Rick, et al., "Using phase retrieval to measure the intensity and phase of ultrashort pulses: frequency-resolved optical gating", J. Opt. Soc. Am. A, vol. 10, No. 5, (May 1993), pp. 1101-1111, Optical Society of America.
Tull, J.X. et al.; "High-Resolution, Ultrafast Laser Pulse Shaping and Its Applications"; Advances in Magnetic and Optical Resonance; vol. 20; 1997; pp. 1-65.
Tzu-Ming Liu et al.; "Triple-optical autocorrelation for direct optical pulse-shape measurement"; Applied Physics Letters, vol. 81, No. 8; Aug. 19, 2002; pp. 1402-1404.
Umstadter, D., et al., "Nonlinear Plasma Waves Resonantly Driven by Optimized Laser Pulse Trains", Physical Review Letters, vol. 72, No. 8, (Feb. 21, 1994), pp. 1224-1227, The American Physical Society.
Urbasch, Gunter, et al., "Distinctino of ortho- and para-Xylene by Femtosecond-Laser Mass Spectrometry," Communications, ChemPhysChem vol. 8 (2007) Wiley-VCH Verlag GmbH&Co. KGaA, Weinheim, pp. 2185-2188.
V. Engel et al; "Two-photon wave-packet interferometry"; J. Chem Phys. 100 (8); Apr. 15, 1994; pp. 5448-5458.
V. Kabelka et al.; "Time-frequency imaging of a single ultrashort light pulse from anularly resolved autocorrelation"; Optics Letters, vol. 20, No. 1; Jun. 1, 1995; pp. 1301-1303.

(56) References Cited

OTHER PUBLICATIONS

V. Prokhorenko et al.; "Coherent control of the population transfer in complex sovated molecules at weak excitation. An experimental study"; The J. of Chem. Phys., 122; 2005; 184502-1-184502-11.
V.A. Apkarian; 'Comment on "Time-resolved laser induced harpoon reactions"'; J. Chem. Phys. vol. 106, No. 12; Mar. 22, 1997; pp. 5298-5299.
V.L. da Silva et al.; "Nonlinear pulse shaping and causality"; Optics Letters, vol. 18, No. 8; Apr. 15, 1993; pp. 580-582.
V.M. Akulin et al.; "Laser Control of Atomic Motion inside Diatomic Molecules"; J. Phys. Chem. A, vol. 102, No. 23; 1998; pp. 4310-4320.
V.S. Malinovsky et al.; "General theory of population transfer by adiabatic rapid passage with intense, chirped laser pulses"; The European Physical Journal D 14; 2001; pp. 147-155.
Valerie Blanchet et al.; "One-color coherent control in Cs2 Observation of 2.7 fs beats in the ionization signal"; Chemical Physics Letters, vol. 233; Feb. 25, 1995; pp. 491-499.
Valerie Blanchet et al.; "Temporal coherent control in the photoionization of Cs2: Theory and experiment"; Journal of Chemical Physics, vol. 108, No. 12; Mar. 22, 1998; pp. 4862-4876.
Valerie Blanchet et al.; "Temporal Coherent Control in Two-Photon Transitions: From Optical Interferences to Quantum Interferences"; Physical Review Letters, vol. 78, No. 14; Apr. 7, 1997; pp. 2716-2719.
VandenBout, D.A. et al.; "Discrete intensity jumps and intramolecular electronic energy transfer in the spectroscopy of single conjugated polymer molecules"; Science 277; 1997; pp. 1074-1077.
Verluise, Frédéric, et al., "Arbitrary dispersion control of ultrashort optical pulses with acoustic waves," J. Opt. Soc. Am. B vol. 17, No. 1 (Jan. 2000) pp. 138-145.
Victor Wong et al.; "Analysis of ultrashort pulse-shape measurement using linear interferometers"; Optics Letters, vol. 19, No. 4; Feb. 15, 1994; pp. 287-289.
Victor Wong et al.; "Linear filter analysis of methods for ultrashort-pulse-shape measurements"; J. Opt.Soc. Am. B, vol. 12, No. 8; Aug. 1995; pp. 1491-1499.
Victor Wong et al.; "Ultrashort-pulse characterization from dynamic spectrograms by iterative phase retrieval"; J. Opt. Soc. Am. B, vol. 14, No. 4; Apr. 1997; pp. 944-949.
Vladimir Kalosha et al.; "Generation of Single Dispersion Precompensated 1-fs Pulses by Shaped-Pulse Optimized High-Order Stimulated Raman Scattering"; Physical Review Letters, vol. 88, No. 10; Mar. 11, 2002; pp. 103901-1-13901-4.
Vladislav V. Yakovlev et al.; "Chirped pulse enhancement of multiphoton absorption in molecular iodine"; Journal of Chemical Physics, vol. 108, No. 6, Feb. 8, 1998; pp. 2309-2313.
von Vacano, Bernhard, et al., "Shaper-assisted collinear SPIDER: fast and simple broadband pulse compression in nonlinear microscopy," vol. 24, No. 5, (May 2007) J. Opt. Soc. Am. B, pp. 1091-1100.
W. Wohlleben et al.; "Coherent Control for Spectroscopy and Manipulation of Biological Dynamics"; Chem. Phys. Chem., 6; 2005; pp. 850-857.
W.J. Walecki et al.; "Characterization of the polarization state of weak ultrashort coherent signals by dual-channel spectral interferometry"; Optics Letters, vol. 22, No. 2; Jan. 15, 1997; pp. 81-83.
W.M. Sharman et al.; "Photodynamic therapeutics: basic principles and clinical applications"; DDT, vol. 4, No. 11; Nov. 1991; pp. 507-517.
Walmsley, Ian A. et al.; "Characterization of the electric field of ultrashort optical pulses"; J. Opt. Soc. Am. B., vol. 13, No. 11; Nov. 1996; pp. 2453-2463.
Walowicz, K.A. et al.; "Multiphoton Intrapulse Interference 1: Control of Multiphoton Processes in Condensed Phases"; J. Phys. Chem A 106 (41); Oct. 17, 2002; pp. 9369-9373.
Waner, M. J. et al.; "Imaging the Molecular Dimensions and Oligomerization of Proteins At Liquid/Solid Interfaces;" J. Phys. Chem. B, vol. 102, No. 9, 1998; pp. 1649-1657.

Wang, He, et al., "Generation of 0.5 mJ, few-cycle laser pulses by an adaptive phase modulator," Optics Express, vol. 16, No. 19 (Sep. 15, 2008) pp. 14448-14455.
Warren, W.S., et al., "Coherent Control of Quantum Dynamics: The Dream is Alive", Articles, Science, (Mar. 12, 1993), vol. 259.
Warren, W.S.; "Chemistry with photons"; Science, vol. 262; Nov. 12, 1993; pp. 1008-1009.
Wefers, Marc M., "Programmable phase and amplitude femtosecond pulse shaping", Optics Letters (Dec. 1, 1993), vol. 18, No. 23, pp. 2032-2034.
Wefers, Marc, et al., "Generation of high-fidelity programmable ultrafast optical waveforms", Optics Letters, (May 1, 1995), vol. 20, No. 9, Optical Society of America.
Weinacht, T.C. et al.; "Controlling the shape of a quantum wavefunction"; Nature, vol. 397; Jan. 1999; pp. 233-235.
Weiner et al.; "Shaping of femtosecond pulses using phase-only filters designed by simulated annealing"; Journal of the Optical Society of America A (Optics and Image Science) USA, vol. 10, No. 5, May 1993; pp. 1112-1120.
Weiner, "Encoding and decoding of femtosecond pulses", Optics Letters, (Apr. 1988), vol. 13, No. 4, Optical Society of America.
Weiner, A.M. et al. "Generation of terahertz-rate trains of femtosecond pulses by phase-only filtering," Optics Letters, vol. 15, No. 1, Jan. 1, 1990, pp. 51-53.
Weiner, A.M. et al.; "Programmable Shaping of Femtosecond Optical Pulses by Use of 128-Element Liquid Crystal Phase Modulator"; IEEE Journal of Quantum Electronics; vol. 28, No. 4; Apr. 1992; pp. 908-920.
Weiner, A.M., "Enhancement of coherent charge oscillations in coupled quantum wells by femtosecond pulse shaping", J. Opt. Soc. Am. B, vol. 11, No. 12, (Dec. 1994), pp. 2480-2491, Optical Society of America.
Weiner, A.M., "Femtosecond Optical Pulse Shaping and Processing", Prog. Quant. Electr. (1995) vol. 19, pp. 161; 230-233.
Weiner, A.M., "Femtosecond pulse shaping using spatial light modulators," Review Article, Review of Scientific Instruments, vol. 71, No. 5 (May 2000) pp. 1929-1960.
Weiner, A.M., "High-resolution femtosecond pulse shaping", J. Opt. Soc. Am. B., vol. 5, No. 8, (Aug. 1988), pp. 1563-1572, Optical Society of America.
Weiner, A.M., "Programmable femtosecond pulse shaping by use of a multielement liquid-crystal phase modulator", Optics Letters, (Mar. 15, 1990), vol. 15, No. 6, pp. 326-328, Optical Society of America.
Weiner, A.M., "Spectral holography of shaped femtosecond pulses", Optics Letters, vol. 17, No. 3 (Feb. 1, 1992), pp. 224-226, Optical Society of America.
Weiner, A.M., et al., "Femtosecond multiple-pulse impulsive stimulated Raman scattering spectroscopy", J. Opt. Soc. Am. B., vol. 8, No. 6, (Jun. 1991), pp. 1264-1275.
Weiner, A.M.; "Femtosecond pulse shaping using spatial light modulators"; Rev. Sci. Instrum. vol. 71(5); 2000; pp. 1929-1960.
Weiner, Andrew M. et al.; "Femtosecond Pulse Shaping for Synthesis, Processing and Timeto-Space Conversion of Ultrafast Optical Waveforms"; IEEE Journal of Selected Topics in Quantum Electronics; vol. 4, No. 2; Mar./Apr. 1998; pp. 317-331.
Weiner, Andrew M., Programmable Shaping of Femtosecond Optical Pulses by Use of 128-Element Liquid Crystal Phase Modulator, (1992) vol. 28, No. 4, pp. 908-919, IEEE Journal of Quantum Electronics.
Wnuk, Pawel, et al., "Coherent control and dark pulses in second harmonic generation," Optics Communications 272, ScienceDirect (2007) pp. 496-502.
Wolfgang Kiefer et al.; "Femtosecond time-resolved spectroscopy of elementary molecular dynamics"; Naturwissenschaften; 2002; pp. 250-258.
Wollenhaupt, M. et al.; "Femtosecond Laser Photoelectron Spectroscopy on Atoms and Small Molecules: Prototype Studies in Quantum Control;" Annu. Rev. Phys. Chem., 56, 2005; pp. 25-56.
Wu, C. et al., Mass and Photoelectron Spectrometer for Studying Field-Induced Ionization of Molecules, International Journal of Mass Spectrometry, Elsevier Science Publishers, Amsterdam, NL, vol. 216, No. 3, May 15, 2002, pp. 249-255.

(56) References Cited

OTHER PUBLICATIONS

Wu, Chengyin et al., Laser-Induced Dissociation and Explosion of Methane and Methanol, J. Phys. B. At. Mol. Opt. Phys; Journal of Physics B: Atomic, Molecular and Optical Physics, Jun. 14, 2002, vol. 35, No. 11, pp. 2575-2582.

X. Chen et al.; "Temporally and spectrally resolved amplitude and phase of coherent four-wave-mixing emission from GaAs quantum wells"; Physical Review B, vol. 56, No. 15; Oct. 15, 1997; pp. 9738-9743.

Xu, B et al.; "Quantitative Investigation of the Multiphoton Intrapulse Interference Phase Scan Method for Simultaneous Phase Measurement and Compensation of Femtosecond Laser Pulses;" J. Opt. Soc. Am. B, vol. 23, No. 4, Apr. 2006; pp. 750-759.

Xu, C. et al.;"Two photon optical beam induced current imaging through the backside of integrated circuits"; Appl. Phys. Lett. 71; 1997; pp. 2578-2580.

Xu, J.H., et al., "Study of Pulse Compression from 1.5 μm Distributed Feedback Lasers by a Gires-Tournois Interferometer", Fiber and Integrated Optics, vol. 13, (1994), pp. 365-372.

Y. Ding et al.; "Time-Domain Image Processing Using Dynamic Holography"; IEEE Journal of Selected Topics in Quantum Electronics, vol. 4, No. 2; Mar./Apr. 1998; pp. 332-341.

Y. Oishi, A. Suda, F. Kannari, K. Midorikawa, Intense Femtosecond Pulse Shaping Using a Fused-Silica Spatial Light Modulator, Optics Communications, ScienceDirect, 2006/2007, pp. 305-309.

Y.J. Yan et al.; "Pulse shaping and coherent Raman spectroscopy in condensed phases"; J. Chem. Phys 94 (2); Jan. 15, 1991; pp. 997-1001.

Yan, Y.J. et al.; "Electronic dephasing, vibrational relaxation, and solvent friction in molecular nonlinear optical line shapes"; J. Chems. Phys.; Oct. 15, 1988; pp. 5160-5176.

Yang, W. et al.; "High-ratio Electro-optical Data Compression for Massive Accessing Networks Using AOM-based Ultrafast Pulse Shaping"; Journal of Optical Communications; vol. 22, No. 1; 2001; pp. 694-697.

Yaron Silberberg; "Physics at the attosecond frontier"; Nature, vol. 414, Nov. 29, 2001; pp. 494-495.

Yelin, D. et al.; "Laser scanning third-harmonic-generation microscopy in biology"; Optics Express; vol. 5, No. 8; Oct. 11, 1999; pp. 169-175.

Yoshihiro Takagi et al.; "Multiple- and single-shot autocorrelator based on two-photon conductivity in semiconductors"; Optics Letters, vol. 17, No. 9; May 1, 1992; pp. 658-660.

Yu, Huang, et al., Application of Adaptive Feedback Loop for Ultra-Violet Femtosecond Pulse Shaper Control, Optics Express Opt. Soc. America USA, vol. 14, No. 21, Oct. 2006.

Yu-Chen Shen et al.; "What can short-pulse pump-probe spectroscopy tell us about Franck-Condon dynamics?"; Journal of Chemical Physics, vol. 110. No. 20; May 22, 1999; pp. 9793-9806.

Yu-hui Chiu et al.; "Vibrational mode effects, scattering dynamics and energy disposal in reaction of C2H2 with methane"; J. Chem. Phys., vol. 102, No. 3; Jan. 15, 1995; pp. 1199-1216.

Yuri T. Mazurenko; "Spectral Holography and Spectral Nonlinear Optics of Ultrashort Pulses"; Journal of the Chinese Chemical Society, vol. 47, No. 4A; 2000; pp. 679-683.

Z.W. Shen et al.; "Selective preparation of ground state wave-packets: a theoretical analysis of femtosecond pump-dump-probe experiments on the potassium dimmer"; The European Physical Journal D 14; 2001; pp. 167-172.

Zang, Hegui, et al., "Study on Frequency-doubling Effect of the Dually Doped KTP Crystals," Journal of Synthetic Crystals vol. 29, No. 2 (May 2000).

Zeek, Erik; "Pulse Shaping for High-Harmonic Generation;" Dissertation Submitted in Partial Fulfillment of the Requirements for the Degree of Doctor of Philosophy (Applied Physics) in the University of Michigan, 2000; 126 pages.

Zeidler, D. et al.; "Adaptive compression of tunable pulses from a non-colinear-type OPA to below 16 fs by feedback-controlled pulse shaping"; Appl. Phys. B 70 (Suppl); 2000; pp. S125-S131.

Zhang, Q. et al.; "Concerted Elimination Dynamics From Highly Excited States;" Faraday Discussions, 108, 1997; pp. 63-80.

Zhang, Q. et al.; "Femtosecond Dynamics of Photoinduced Molecular Detachment From Halogenated Alkanes. II. Asynchronous Concerted Elimination of $I_2$ From $CH_2I_2$;" J. Chem. Phys., vol. 109, No. 11, Sep. 15, 1998; pp. 4428-4442.

Zheng, Z. et al. "Spectral phase correlation of coded femtosecond pulses by second-harmonic generation in thick nonlinear crystals"; Opt. Lett. 25; 2000; pp. 984-986.

Zheng, Z. et al.; "Coherent control of second harmonic generation using spectrally phase coded femtosecond waveforms"; Chem. Phys. 267; 2001; pp. 161-171.

Zhenwen Shen et al.; "Pump-dump control and the related transient absorption spectroscopies"; Journal of Chemical Physics, vol. 110, No. 15; Apr. 15, 1999; pp. 7192-7201.

Zhou, Jianping, et al., "Generation of 21-fs millijoule-energy pulses by use of Ti:sapphire", Optics Letters, vol. 19, No. 2, (Jan. 15, 1994), pp. 126-128, Optical Society of America.

Zhu, Xin, et al., "In-situ femtosecond laser pulse characterization and compression during micromachining," Optical Society of America (2007) 8 pages.

Zipel, W.R. et al.; "Nonlinear magic: multiphoton microscopy in the biosciences"; Natire Biotechnology, 121 (11); Nov. 2003; pp. 1369-1377.

Zohar Amitay et al.; "Phase-tailoring molecular wave packets to time shift their dynamics"; Chemical Physics 267; 2001; pp. 141-149.

"Coherent® Silhouette, Ultrafast Pulse Shaper," Key Features brochure. Web. Jan. 29, 2008 http://www.coherent.com/Lasers/index.cfm?Fuseaction=show.print&ID=1485.

"Coherent® Silhouette, Ultrafast Pulse Shaping and Measurement," brochure, (2007) 2 pages. Coherent, Inc.

Takasago, Kazuya, et al., "Design of Frequency-Domain Filters for Femtosecond Pulse Shaping," Part 1, No. 2A (Feb. 1996)pp. 624-629. Jpn. J. Appl. Phys.

LASER PULSE SYNTHESIS SYSTEM

CROSS-REFERENCE TO RELATED APPLICATION

This application claims priority to U.S. Provisional Application No. 61/146,889 filed on Jan. 23, 2009, which is incorporated by reference herein.

BACKGROUND AND SUMMARY

The application relates generally to laser systems and more particularly to a system for synthesizing multiple pulses.

It is known to measure femtosecond laser pulses using a phase and amplitude modulator by programming phase and amplitude to achieve an autocorrelation. One such traditional device is disclosed in B. Vacano, et al., "Shaper-assisted Collinear SPIDER: fast and simple broadband pulse compression in nonlinear microscopy," J. Opt. Soc. Am. B, vol. 24, no. 5, 1091 (May 2007). The phase and amplitude modulator device is expensive, and time consuming and difficult to set up accurately.

Conventional interferometric autocorrelation obtained by physical movement of optic components is disclosed in A. Weiner, "Review Article: Femtosecond pulse shaping using spatial light modulators," Rev. Sci. Instrum., vol. 71, no. 5, 1930 (May 2000). Optical pulse train generation is also disclosed in U.S. Pat. No. 6,577,782 entitled "Direct Space-to-time Pulse Shaper and Optical Pulse Train Generator" which issued to Leaird and Weiner on Jun. 10, 2003, which is incorporated by reference herein. This patent recognizes difficulties in use of Fourier transform pulse shapers with high-bit-rate data telecommunications.

In accordance with the present invention, a laser pulse synthesis system is provided. A further aspect of the present system uses a phase-only modulator to measure ultrashort laser pulses. An additional aspect achieves interferences between split subpulses even though the subpulses have different frequencies. Yet another aspect of a laser system employs multiple independent frequency comb phase shaping of a laser pulse. In another aspect, a laser system includes pulse characterization and arbitrary or variable waveform generation through spectral phase comb shaping. In still another aspect of the present laser system, minimal correlation phase functions are used to substantially prevent nonlinear optical processes in the shaped field. In another aspect, a laser system is used for nonlinear optical imaging, micromachining, communications and/or molecular identification. A method of using one or more of these aspects is also provided.

The present laser system is advantageously less expensive than traditional laser systems. For example, phase-only modulators are much less expensive than conventional phase and amplitude modulators. Furthermore, certain aspects of the present system employ split subpulses each having differently shaped characteristics which are much less sensitive to air turbulence and other environmental disturbances than traditional optical methods designed to generate multiple pulses using partially reflective optics. Moreover, the present system is more amenable to the placement of a pulse shaper within or before an amplifier. Additional advantages and features of the present invention will become apparent from the following description and appended claims, taken in conjunction with the accompanying drawings.

BRIEF DESCRIPTION OF DRAWINGS

FIG. 1f shows a laboratory configuration of the laser system. FIGS. 1b and 1d illustrate an IR spectrum and example of the piecewise phase that splits the original pulse envelope into two replicas at ±100 fs. The discontinuity period is exaggerated for clarity. The actual period corresponds to ~1 nm (3 pixels on SLM). FIGS. 1c and 1e show expected SPAC and iSPAC spectrograms of a TL pulse, obtained by scanning the time delay between the two pulse envelope replicas adjusting and not adjusting the carrier phase, respectively. FIG. 1a shows expected intensity-like and interferometric autocorrelation of the TL pulse obtained by integration of the SHG signal from SPAC and iSPAC traces.

FIG. 2(a) illustrates an expected example of a piecewise phase that splits the original pulse into four replicas at 100 fs, 0 fs, −100 fs, and −250 fs. The time delay of the last one is then tuned from −250 fs to 250 fs to produce an interferometric cross-correlation. The discontinuity period is exaggerated for clarity. The actual expected period corresponds to ~0.6 nm (2 pixels on SLM). FIG. 2(b) illustrates at the Top: an expected iSPACC trace for three TL pulses; at the Center: an expected iSPACC trace for three pulses, with negative (−200 fs$^2$), zero, and positive (200 fs$^2$) linear chirp. The fourth pulse is kept TL and it is used to obtain the cross correlation iSPACC. At the Bottom: an expected iSPACC trace for three pulses with varied quadratic chirp, chosen to be −5000 fs$^3$, 0 fs$^3$, and 5000 fs$^3$.

PC is a polarization controller, EDFA is an Erbium doped fiber amplifier, HNLF is a highly nonlinear fiber, L is a lens, BIBO is a nonlinear BIBO crystal, PD is a photodetector, and OSA is an optical spectrum analyzer.

Figure 8:
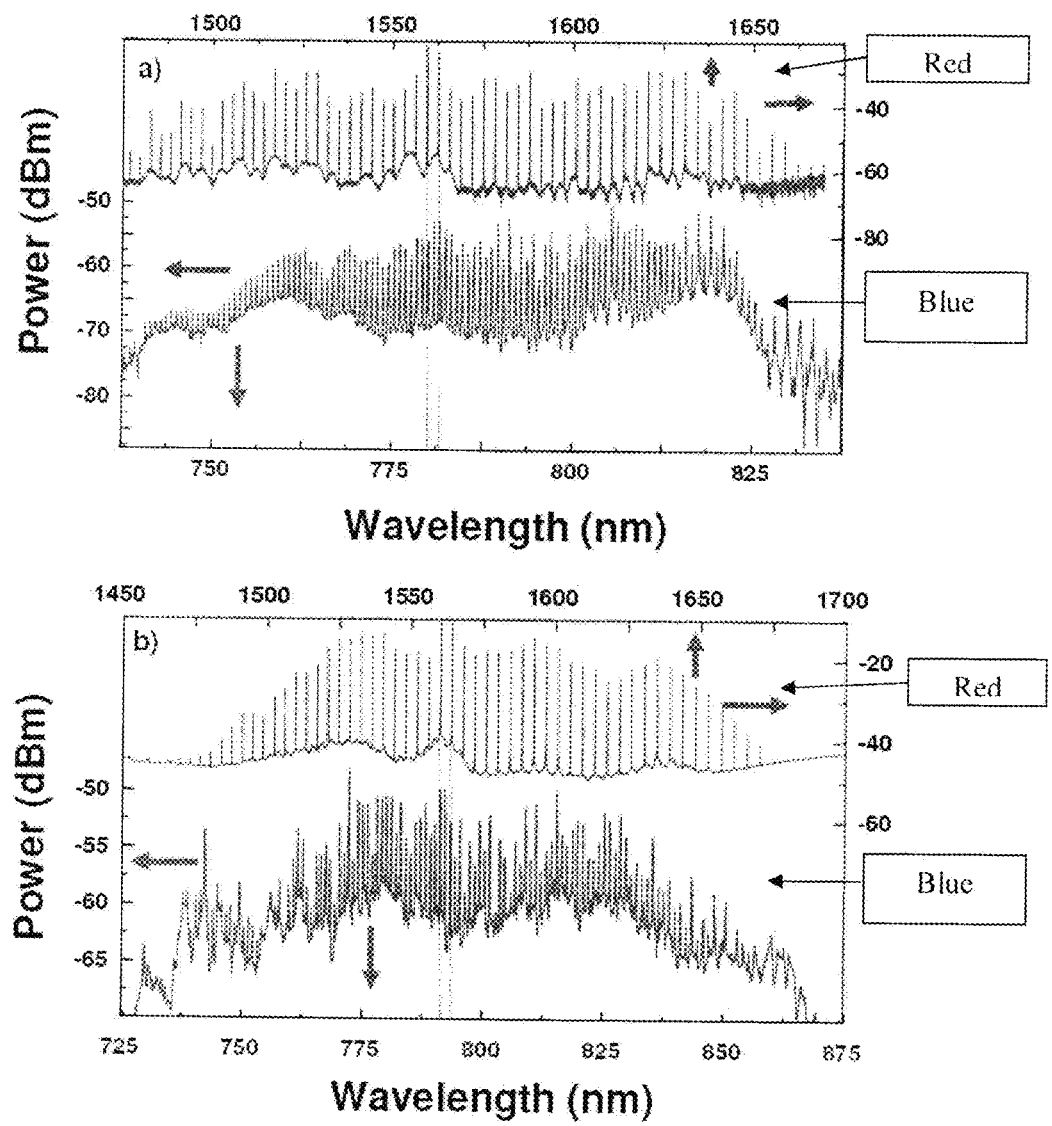

FIG. 8 is a set of graphs of expected spectra of FWM-fiber-combs at 1555 nm, and their second harmonic spectra. FIGS. 8(a) and (b) correspond to the 2-mm and 0.1-mm long non-linear BIBO crystal. The collection efficiency for the second harmonic was far from optimized and the dotted vertical lines indicate the input lasers.

Figure 9:
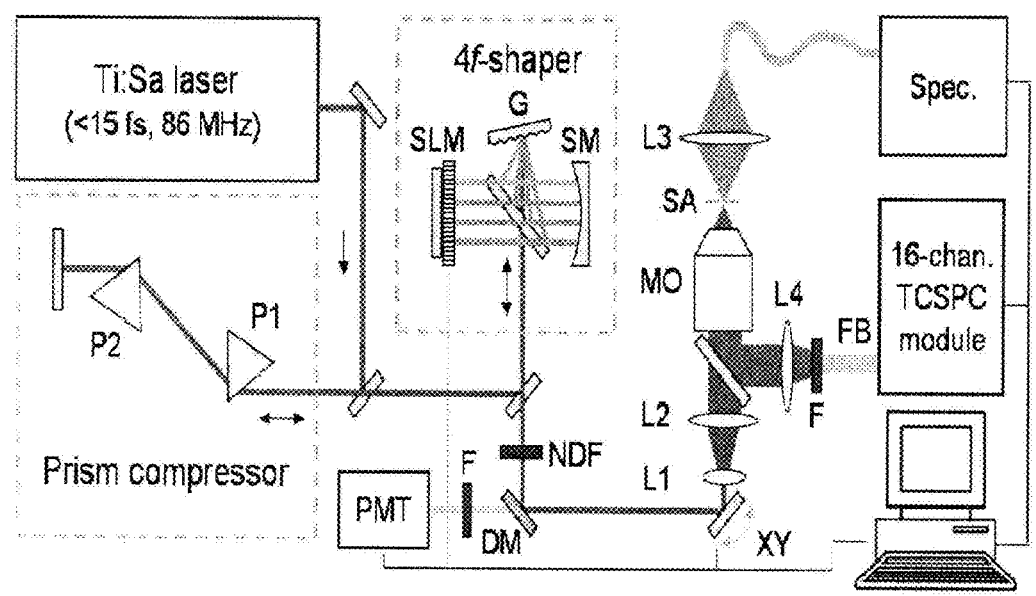

FIG. 9 is a diagrammatic view showing the laser system used in imaging.

Figure 10:
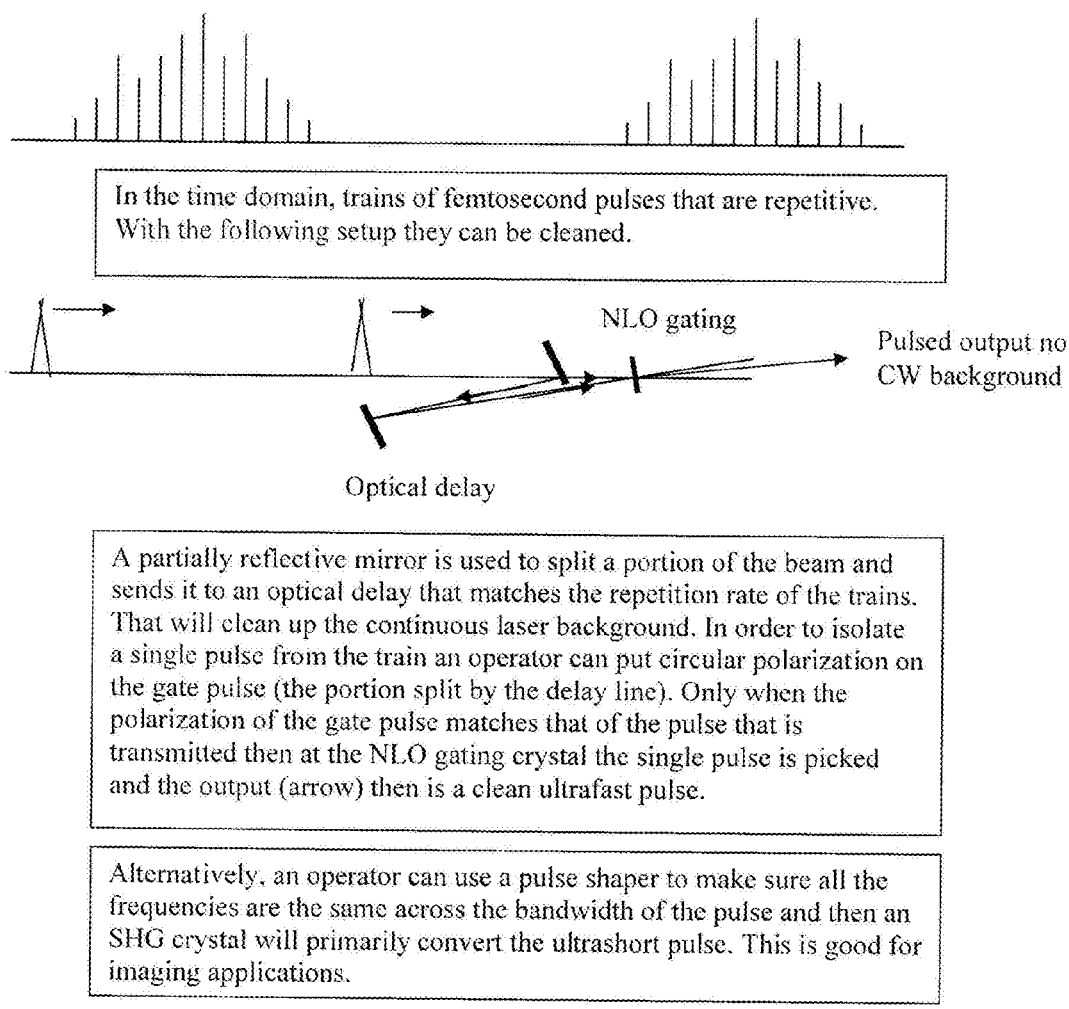

FIG. 10 is a set of diagrammatic views of the frequency comb laser system and how cw pump lasers are removed from the output.

Figure 11:
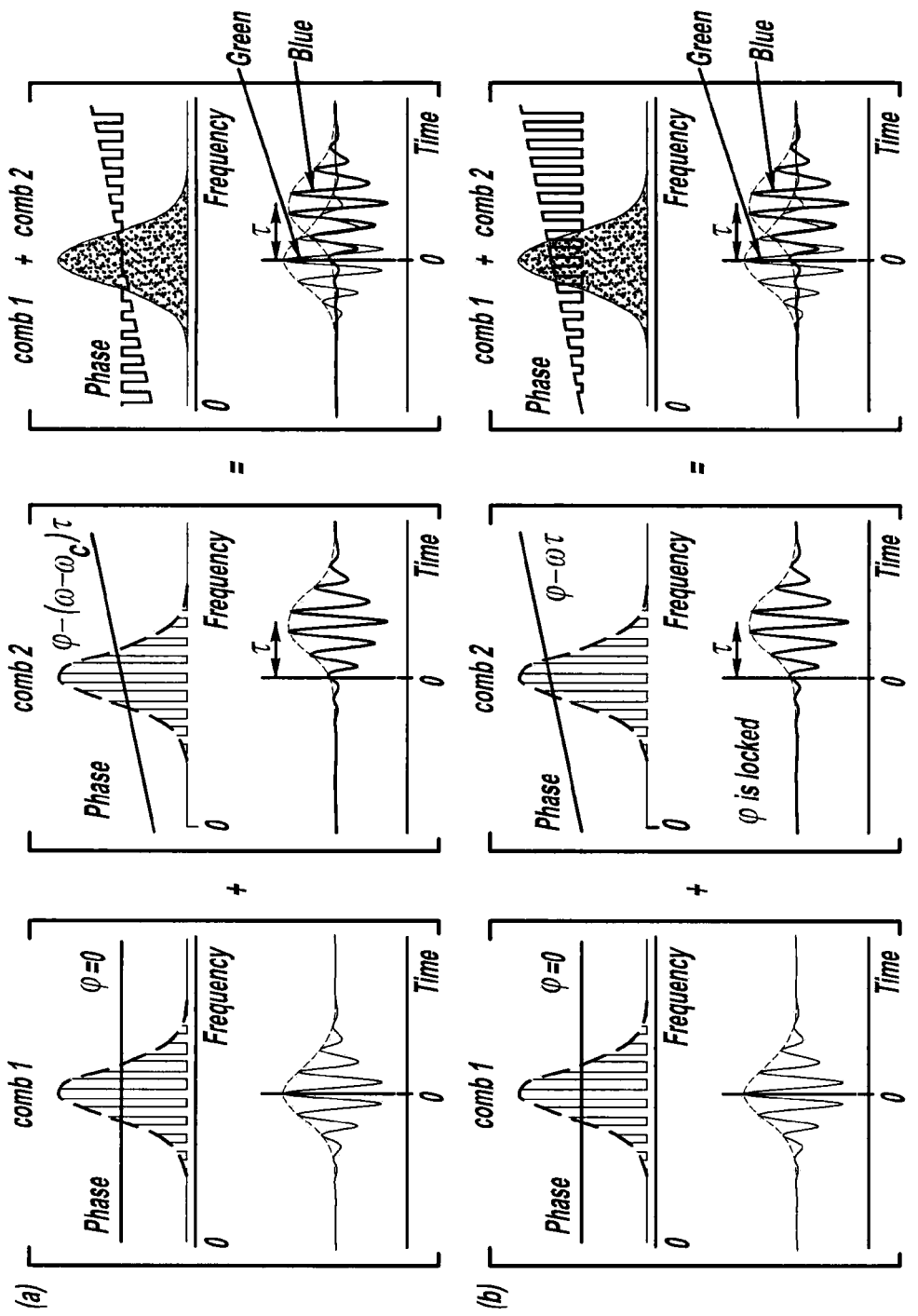

FIG. 11 shows graphs of pulse self-characterization via MICS.

Figure 12:
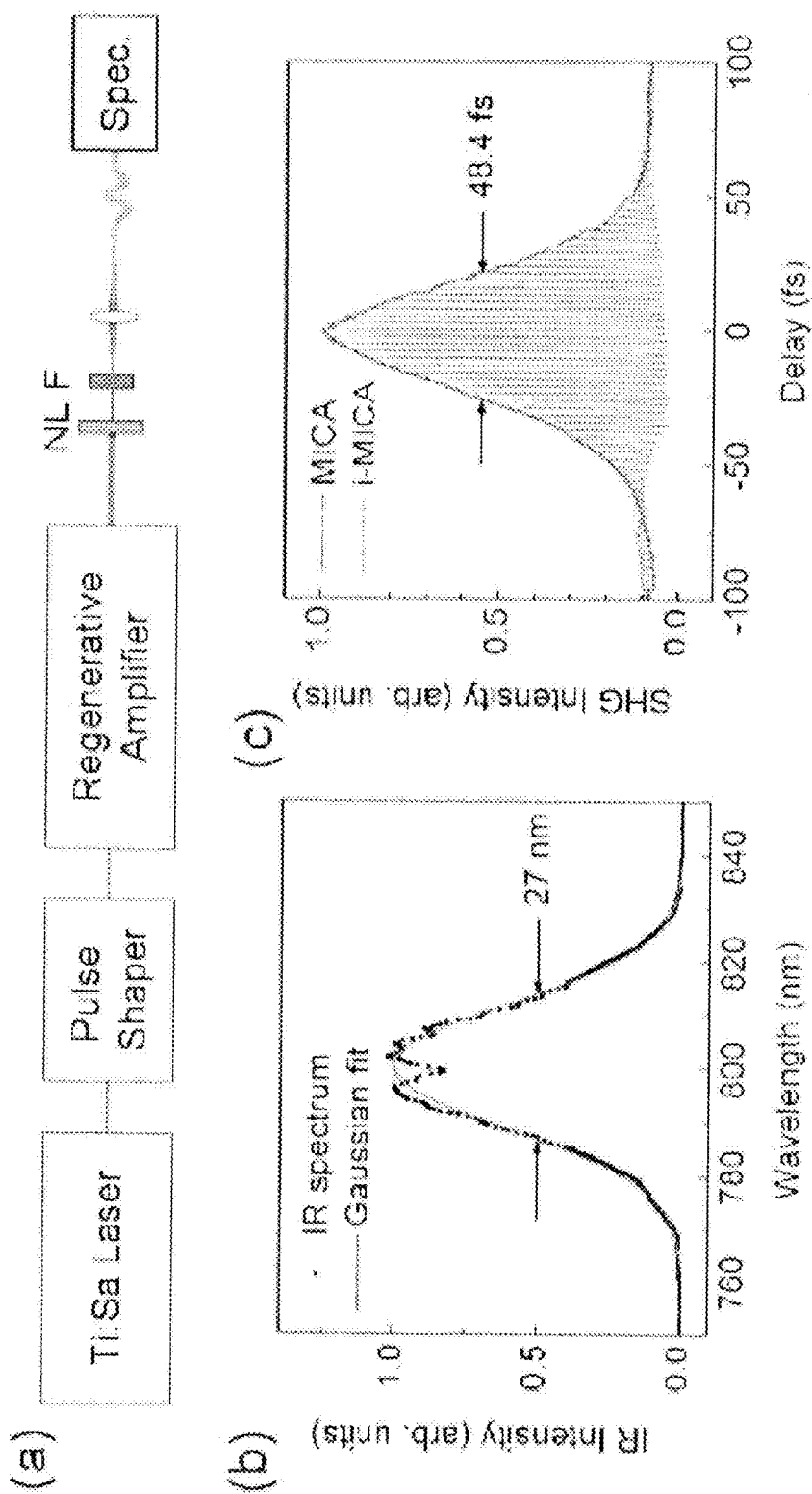

FIG. 12 shows a schematic diagram of an amplified laser system at (a), and graphs of expected MICA and i-MICA traces at (b) and (c).

Figure 13:
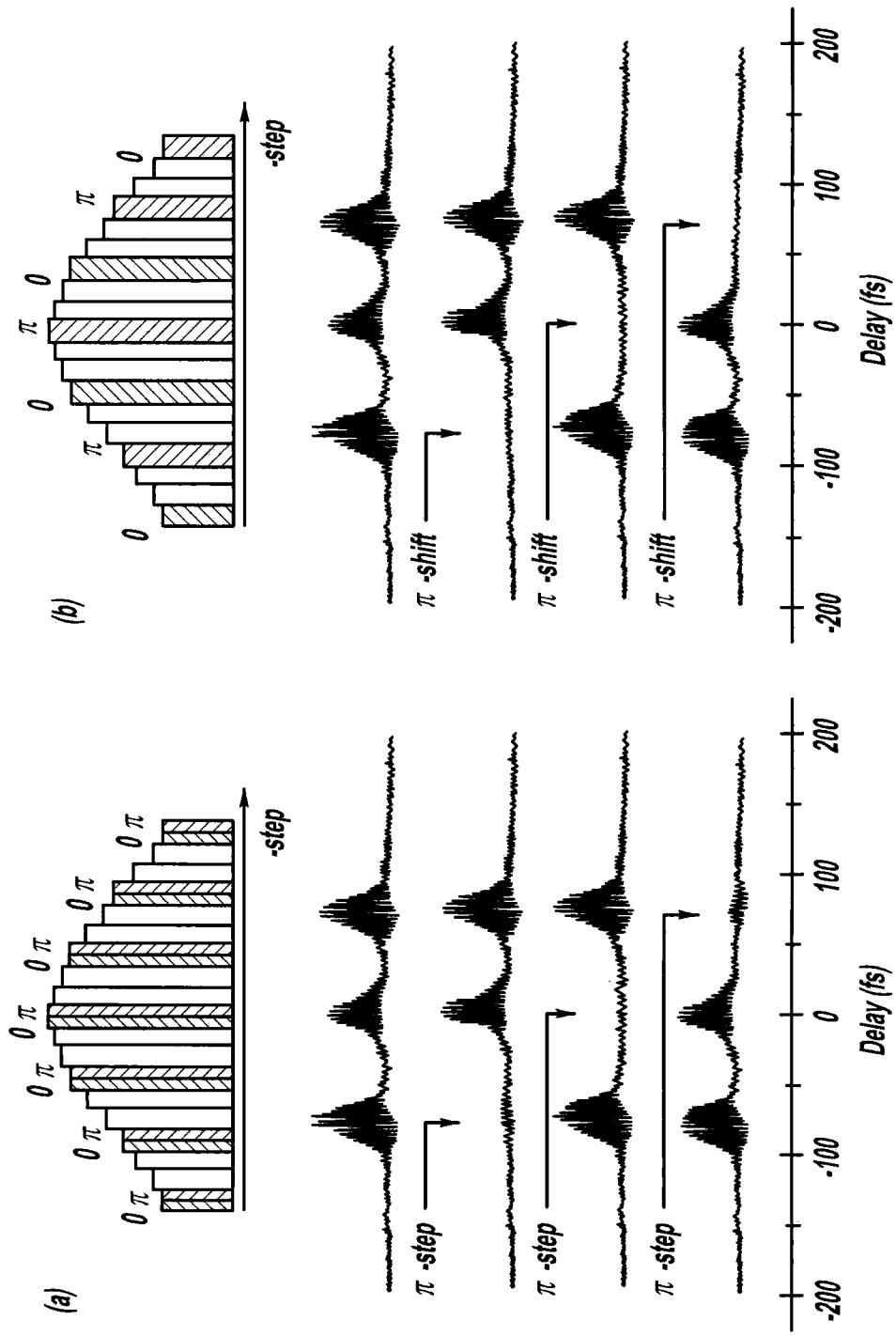

FIG. 13 shows graphical representations of pulse sequence coding via binary shaping.

DETAILED DESCRIPTION

Figure 1A:
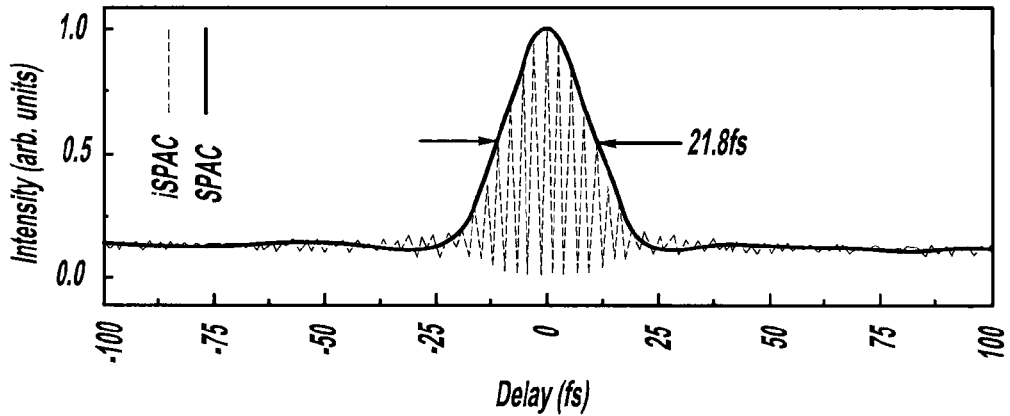
FIGS. 1a-f show a laser system, and expected spectral phase combs and pulse characterization employing the system.
Figure 1B:
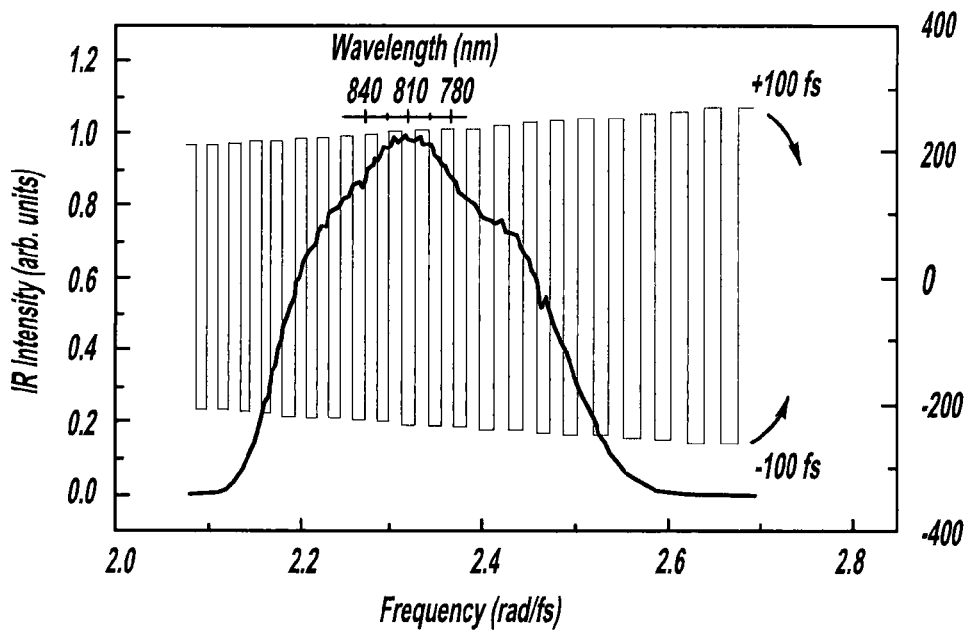
Figure 1C:
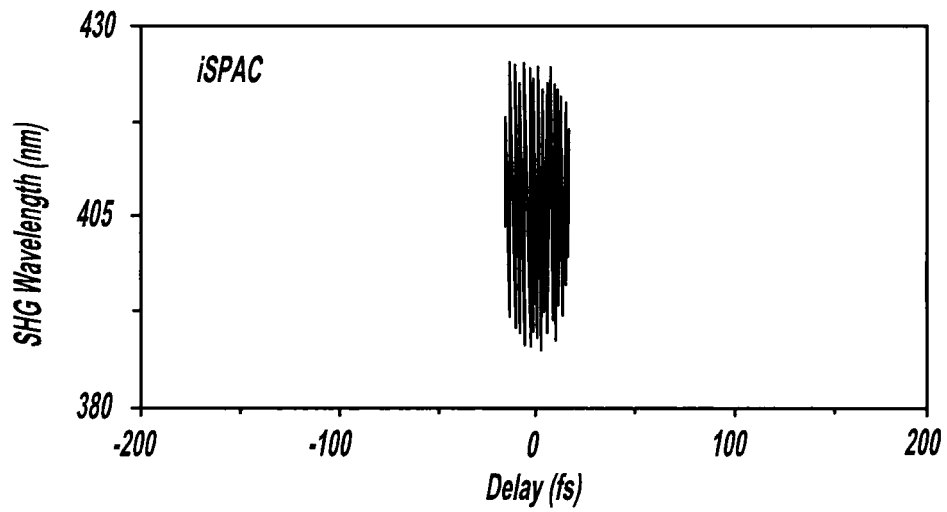
Figure 1D:
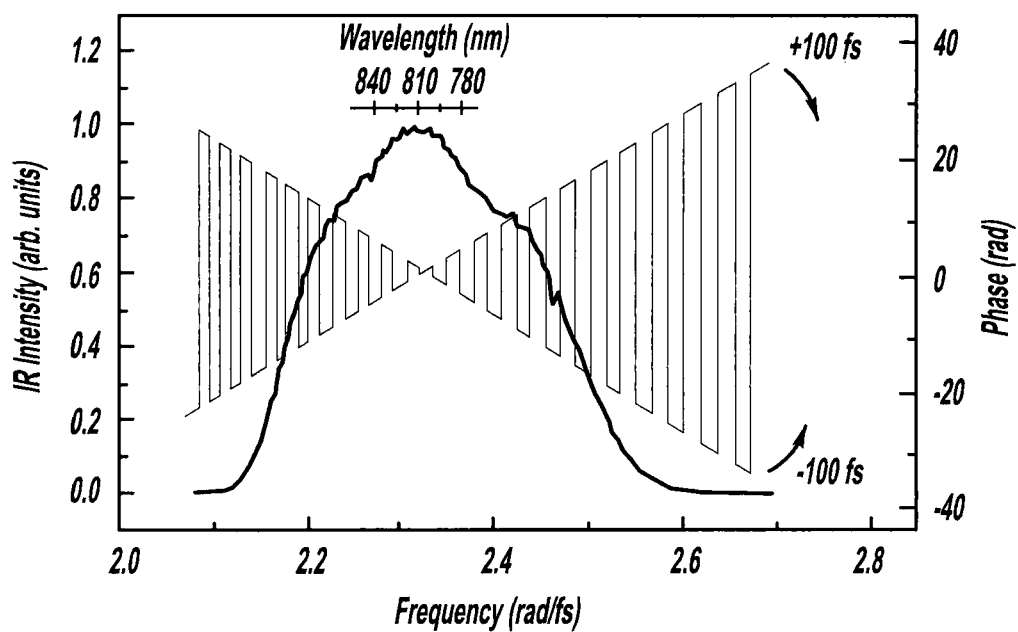
Figure 1E:
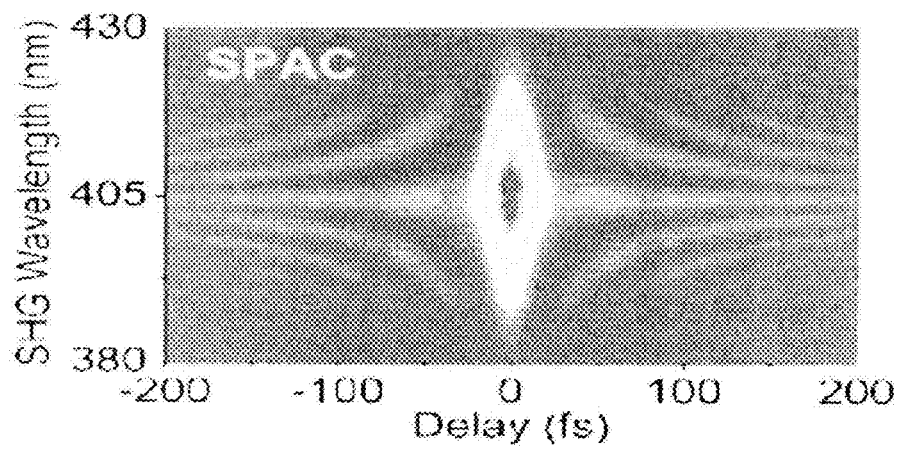
Figure 1F:
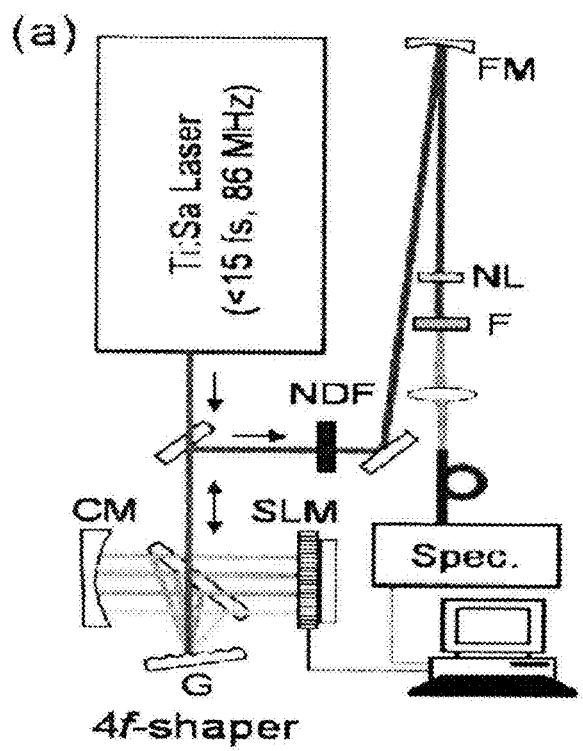

A laser autocorrelation system of the present application is shown in FIG. 1f as including a laser which operably emits laser beam pulses, a grating G, a curved mirror CM, a spatial light modulator pulse shaper SLM, a neutral density filter NDF, a focusing mirror FM, a nonlinear crystal NL and a BG 39 filter F. A computer controller, having a programmable set of software instructions stored in memory therein, is connected to a spectrometer detector and the pulse shaper. The controller operably controls the pulse shaper by sending pixel voltage signals representative of a phase function.

In one aspect of the present laser system, pulse characterization and variable waveform generation via multiple independent spectral phase comb shaping are employed. Multiple independent spectral phase comb pulse shaping is useful for generation and in-situ characterization of variably different, optical pulse trains, where the spectral phase of every pulse in the train is independently controlled. Variable multi-pulse train generation is derived from phase-only shaping of several spectral phase combs ("SPC"). From a spectral comb approach, the laser spectrum is considered to be a superposition of combs belonging to different pulses within the train. For generating a two-pulse-train, the laser spectrum is formally split into two independent combs that sample the entire pulse spectrum and the desired phase masks are imposed on each of the combs. The comb-specific phase masks form a piecewise phase function across the original laser spectrum which generates the desired programmed pulse sequence. In contrast to line-byline shaping, in our approach the width of a single line in a comb still well exceeds the scale defined by the repetition rate of the laser source. However, the spectral width and spacing between the comb lines are chosen to be small enough to sample the laser spectrum properly.

More specifically, the experimental setup for SPC shaping includes a standard Ti:Sapphire laser oscillator (KMLabs, 86 MHz rep. rate, ~100-nm FWHM bandwidth) and a phase-only folded-4 f pulse shaper with a programmable, 640 pixel, spatial light modulator (CRi SLM-640-P, Cambridge Research & Instrumentation, Inc) at its Fourier plane. The output laser beam is attenuated and focused on a thin (~20 µm) KDP crystal, mounted on a glass slide. Second-harmonic generation ("SHG") in the nonlinear crystal, collected into a fiber-coupled spectrometer (Ocean Optics S-2000), is used as a feedback signal for pulse dispersion compensation via multiphoton intrapulse interference phase scan software steps ("MIIPS") as well as for shaper-assisted characterization of programmed waveforms. No optical delays are used to obtain the expected data presented.

Alternatively, the laser could be a Clark-MXR Impulse all-diode-pumped Yb-doped fiber oscillator/amplifier producing up to 10 µJ per pulse at repetition rates between 200 kHz and 25 MHz (20 W average power). This source is ideally suited because of its compact footprint (2×3 ft), high repetition rate, and stability; however it is specked at ~250 fs. In order to shorten the pulses additional bandwidth will be gained by optical parametric amplification ("OPA") in a BBO crystal, a method that has been used successfully at 800 nm, and 1600 nm. Although extremely large bandwidths of 1,000 nm have been observed by OPA, the goal is to generate 300 nm ("FWHM") of near-Gaussian bandwidth that can be compressed to pulses with an expected transform-limited ("TL") duration of 5.4 fs.

For microscopy, a high-resolution phase-polarization pulse shaper controlled by a MIIPS program will be used to compress the laser source and deliver TL pulses at the focus of the microscope objective. For this technology the pulse shaper is a typical 4 f with a spatial light modulator at the Fourier plane. It is set up in transmission or in reflection mode. It can also be double passed so that the light goes through the entire shaper twice before exiting. Subpulse replicas are created by 'sampling' the original pulse wherein small bits of its spectrum are taken in order to recreate the subpulses. The subpulses created can therefore be essentially identical to the parent pulse. This works because the pulses themselves can be thought of arising from a comb of frequencies (a bunch of coherent laser lines that are in phase). The subpulses select frequencies from the parent comb and form sub-combs that can then be manipulated by controlling their phase (and when using a dual mask spatial light modulator their polarization as well).

The replica subpulses can be delayed with respect to a linear phase function that is centered on the carrier frequency ("SPAC") or they can be delayed with a linear phase function that is anchored at frequency=0 ("iSPAC"). In the first case, the delayed pulses remain in phase and do not cause nonlinear optical interference and this has some advantages. In the second case, the delayed pulses cause nonlinear optical interference and this has also some advantages. For this technology, the more pixels the better. Boulder Nonlinear Systems, Inc. of Boulder, Colo. produces a liquid crystal, spatial light modulator (its Linear Series model) with 12,288 pixels which is ideally suited for this aspect of the present system. Alternately, the spatial light modulator from CRi that has 640 pixels and can control phase and polarization is also very useful.

Frequency-resolved autocorrelation traces of the laser pulse at the focus can be attained via SPC shaping by creating two pseudo-replicas and recording the SHG spectrum as a function of their relative time delay. The operator can keep the carrier phase fixed and shift only the envelopes of the two pulses to obtain intensity-like autocorrelation, as shown in FIGS. 1d and 1e, for a transform-limited ("TL") pulse, obtained after MIIPS compensation for phase distortions. Another option is to shift the envelope and the carrier phase simultaneously, as an operator would have for a mechanical delay line, to acquire an expected interferometric trace, as shown in FIGS. 1b and 1c. The two measurements are referenced as SPAC and iSPAC, respectively, where SPAC stands for spectral phase autocorrelation (also referenced as MICA herein). SPAC is not as demanding on the number of experimental points as an iSPAC (also referenced as i-MICA herein) measurement is. However, it is sensitive to the choice of the carrier frequency and might produce misleading results if the effective carrier frequency is changing across the pulse duration or the pulse spectrum is strongly asymmetric. Expected Integrated SHG spectra, as illustrated in FIG. 1a, give one-dimensional intensity-like and interferometric autocorrelation curves, from which the pulse duration can be extracted.

Figure 2:
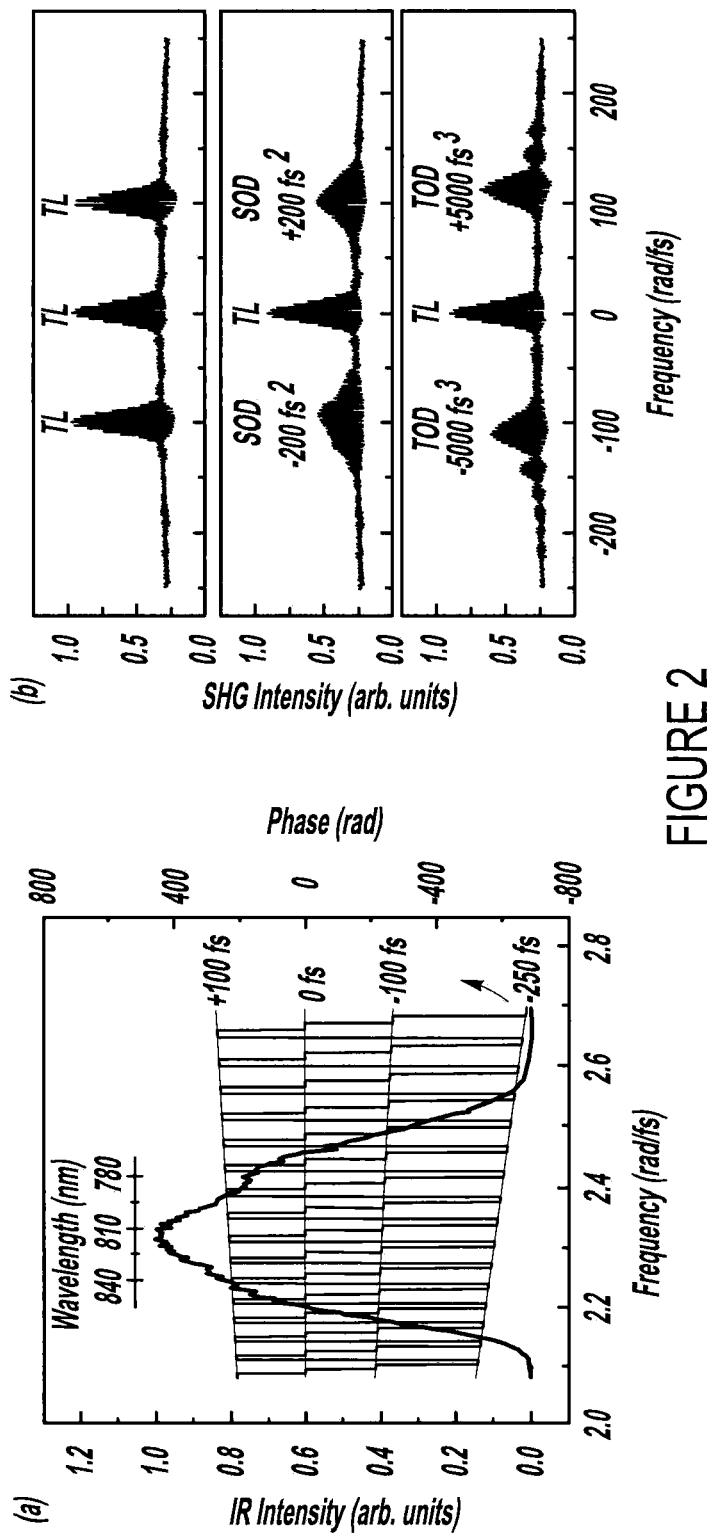
FIG. 2 shows graphs of a variable optical pulse train generation via SPC shaping where

The present system and method can be readily extended for the generation and in-situ characterization of multiple pulses, with a wide variety of different types of phase functions. FIG. 2 demonstrates the generation of three pulses with varied phase properties and their interferometric spectral phase assisted cross-correlation ("iSPACC") expected by scanning a TL pulse that is part of the pulse train. Keeping the second pulse in the train TL, zero, linear, and quadratic chirp are encoded on the phases of the first and third pulses. Second- and third-order dispersion ("SOD" and "TOD", respectively) terms, added to MIIPS compensation mask, are programmed to be $\pm 200$ fs$^2$ and $\pm 5000$ fs$^3$.

Figure 3:
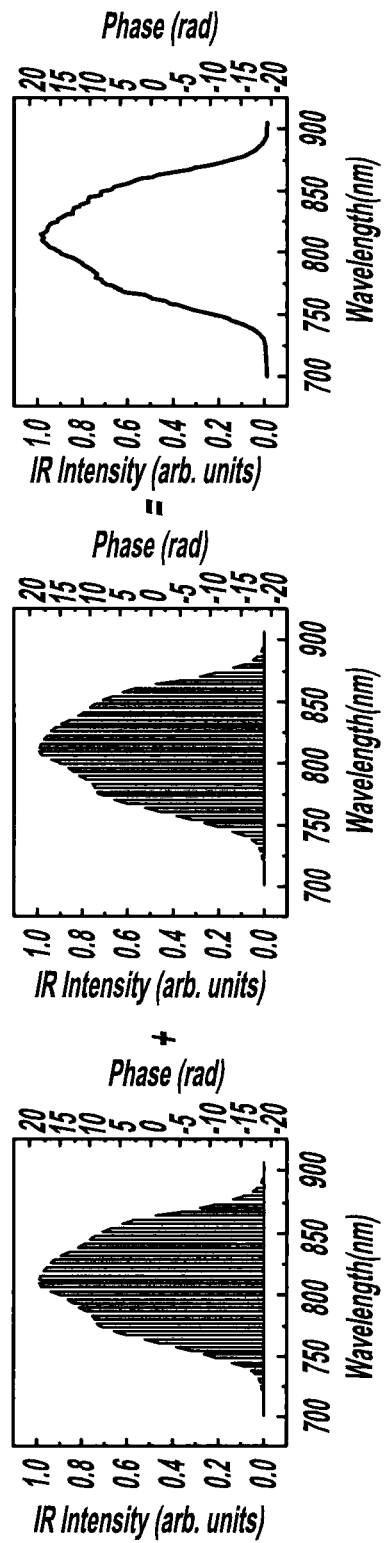
FIG. 3 shows graphs of an expected spectrum of a femtosecond laser pulse as a comb of independent frequencies to construct a new type of piece-wise phase function that splits the beam into replicas by separately addressing sub-combs of frequencies. Each pulse replica can be addressed by introducing separate phase functions using piece-wise phase functions.

Referring to FIG. 3, the femtosecond laser is a comb of independent frequencies to construct a new type of piece-wise phase function that splits the beam into replicas by separately addressing sub-combs of frequencies. Each pulse replica can be addressed by introducing separate phase functions using piece-wise phase functions. As a first example a linear phase designed to delay each replica pulse in the time domain. One pulse is delayed and the other advanced in time, the slope determines the sign and magnitude of the time delay between the pulses.

To summarize, the present laser system and method of using the laser system include SPCs suitable for intuitive variable multi-pulse generation and in-situ characterization via phase-only shaping. The discussed paradigm enhances the capabilities of phase-only shaping and extends the potential of available means for arbitrary (i.e., variable) optical waveform generation. For instance, SPC can be readily combined with polarization shaping to produce trains of pulses with controlled polarization, which might find numerous applications in nonlinear optical spectroscopy and optical communications.

In another aspect, a laser of the present application system is capable of true variable waveform generation. The system is capable of generating from a single ultrashort pulse multiple individually addressable pulses which share the entire bandwidth properties of the input pulse. Pulse sequences with two to one hundred sub-pulses, where each pulse in the sequence can be tailored to have a user-defined bandwidth, spectral phase, polarization and time delay will be generated. The laser when coupled to an inverted microscope creates an ideal platform for multimodal nonlinear optical imaging. The wavelength and energy per pulse will make it ideal for depth resolved biomedical imaging. The ability to break the pulse into several replica greatly reduces photobleaching and photodamage effects. This source is also ideally suited for single-beam coherent anti-Stokes Raman scattering ("SB-CARS") which can be used for molecule selective biomedical imaging, the detection of explosives and pathogens, and for characterizing the combustion in jet turbines. The train of pulses can be tuned to photon frequencies in solids to improve machining efficiency. The system also improves the instrumentation for chemical sensing including spectroscopy and imaging. Therefore, the development of a phase and polarization modulated ultrafast laser source for nonlinear optical imaging and molecular identification is achieved. This source requires the construction of an optical parametric amplifier, and a broad-bandwidth ultrahigh resolution pulse shaper.

This laser source is able to deliver user-defined pulse sequences where each of the pulses can be as short as 5 fs, and each pulse can be tailored in phase-frequency-and-time. The time delay between the pulses can be controlled with attosecond precision and the phase between the pulses can also be arbitrarily controlled within 0.01 rad.

By introducing a linear phase in every other region of the spectrum of the pulse, replica pulses are created that have the same pulse duration of the original. One is delayed and the other advanced in time, the slope determines the sign and magnitude of the time delay between the pulses. Periodic sampling of the pulses may lead to the undesirable formation of satellite peaks, however, non-periodic sampling (e.g., using different wavelengths) should greatly reduce these satellites. This allows for the performance of time-resolved experiments but without using optical delay lines. The measurements are completed by programming the phase of each replica pulse into the pulse shaper by the controller Because there are no moving parts the time delay can be controlled with single-attosecond accuracy and the phase between the two pulses can be controlled with 0.01 radian accuracy, limited only by the phase accuracy permitted by the spatial light modulator.

Figure 4:
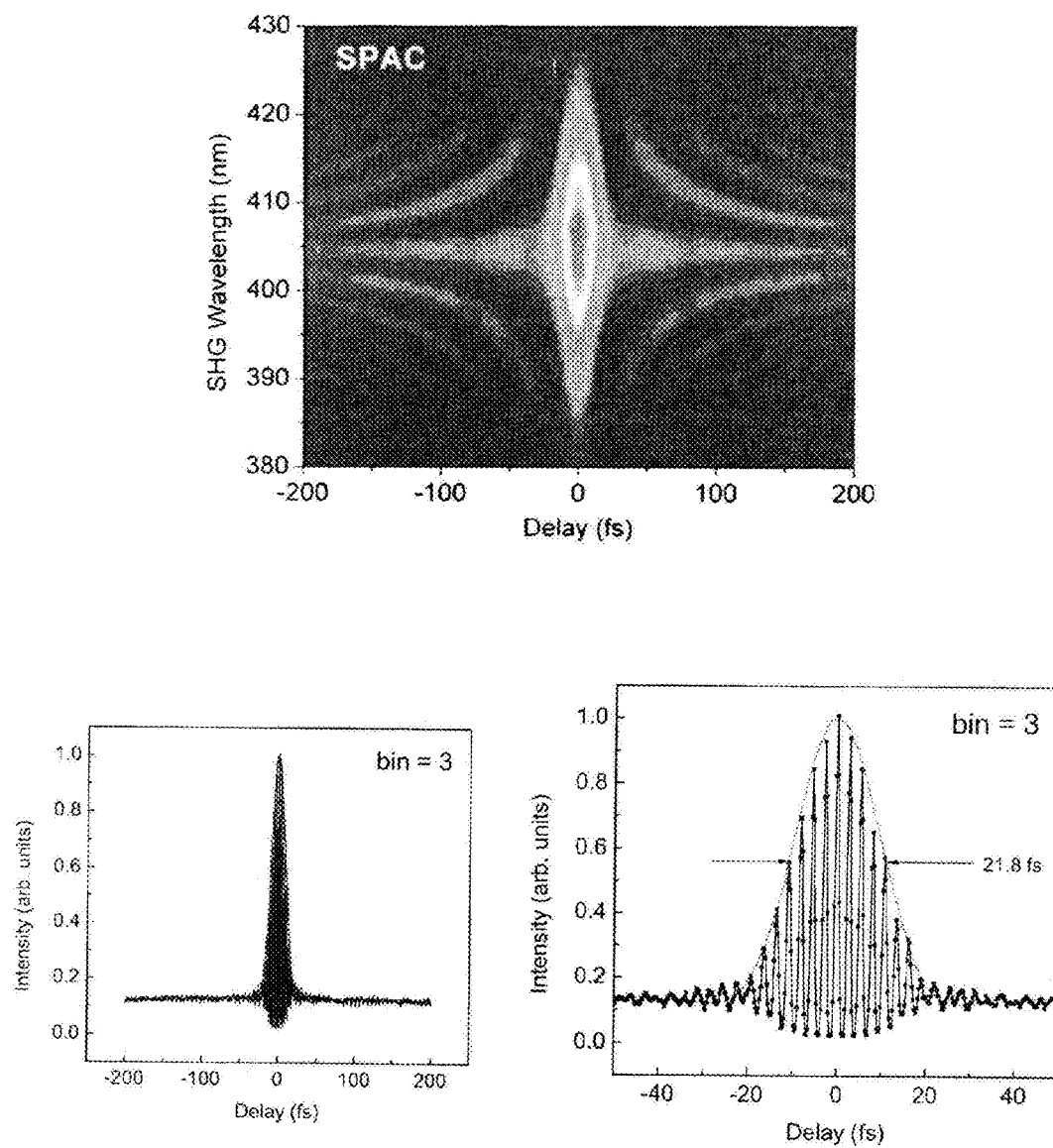
FIG. 4 illustrates expected spectra where, by introducing a linear phase in every other region of the spectrum of the pulse, replica pulses are created that have the same pulse duration of the original. One is delayed and the other advanced in time, the slope determines the sign and magnitude of the time delay between the pulses. Periodic sampling of the pulses may lead to the formation of satellite peaks; however, non-periodic sampling greatly reduces those satellites. This allows for the performance of time-resolved experiments but without using optical delay lines.

FIG. 4 shows another aspect of the present system and method used for autocorrelation and an interferometric autocorrelation. Here, both pulses are scanned in the time domain. The minimum time step is ~1 attosecond, the maximum delay in the exemplary 640 pixel, phase-only shaper is one hundred times the pulse duration. When the pulses are overlapped in time the 5 HG signal is expected to be much more intense. The pulses can be carrier-frequency phase locked (no oscillations observed), or not phase locked (interference is observed). When the spectrum is shown as a function of time, the measurement is also known as a cross-frequency resolved optical gating ("X-FROG") measurement. Only two pulses are needed. The multi-comb phase shaping approach can be used to create a large number of pulses, each one with a user-determined delay, phase function and polarization. The phase function is defined for each pulse. This expected result is shown in FIG. 6 where the first pulse at −100 fs has a cubic phase function (−5000 fs$^3$), the central pulse is TL, and the third pulse has a cubic phase function (+5000 fs$^3$).

A large number of subpulse replicas can be employed. For example, nine subpulse replicas can be created using a 640 pixel spatial light modulator. By extrapolation, a 12,888 spatial light modulator should allow to create one hundred and eighty individually addressable subpulse replicas. For spatial light modulators that have dual masks, such as the CRi 640 PA, the controller can control each replica using the phase function, and then the second mask can be used to control the individual polarization of each replica (any degree of rotation).

Figure 5:
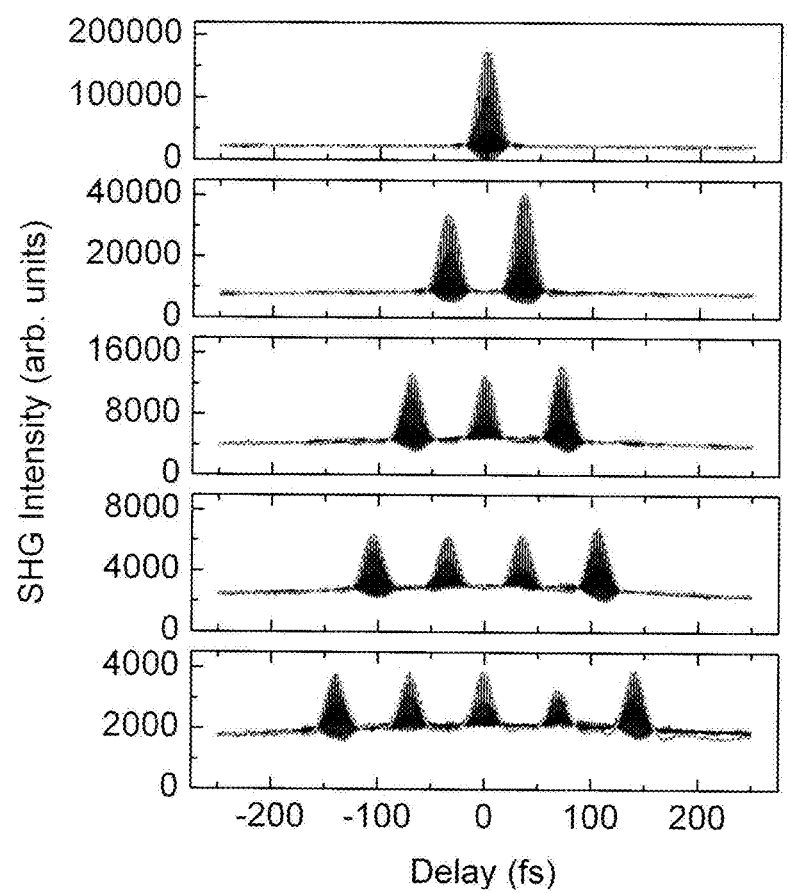
FIG. 5 is a series of graphs of an expected generation on a number of replica pluses using a single 20 fs laser pulse can be converted into two pulses (top). One of the pulses is centered at t=0 delay, while the other pulse is scanned from −200 to +200 fs in order to obtain an autocorreletion (shown as the smooth outside line) or an interferometric autocorrelation (shown as the undulating inside line). The subsequent graphs in this figure demonstrate the expected creation of n+1, 20 fs replica pulses created by the arbitrary waveform generator. In all cases, one TL pulse is reserved for scanning and obtaining the autocorrelation.

FIG. 5 shows the expected formation of several subpulses, each with a particular time delay. For each of the cases in FIG. 5 an additional pulse is formed and scanned across the train of pulses in order to obtain the cross-correlation shown. This further illustrates the expected generation of a number of replica pluses using multi-comb phase shaping concept. A single 20 fs laser pulse can be converted into two pulses (top). One of the pulses is centered at t=0 delay, while the other pulse is scanned from −200 to +200 fs in order to obtain an autocorrelation (shown as the smooth outside line) or an interferometric autocorrelation (shown as the undulating inside line). The subsequent graphs in this figure demonstrate the expected creation of n+1, 20 fs replica pulses created by the arbitrary waveform generator. In all cases, one TL pulse is reserved for scanning and obtaining the autocorrelation.

Figure 6:
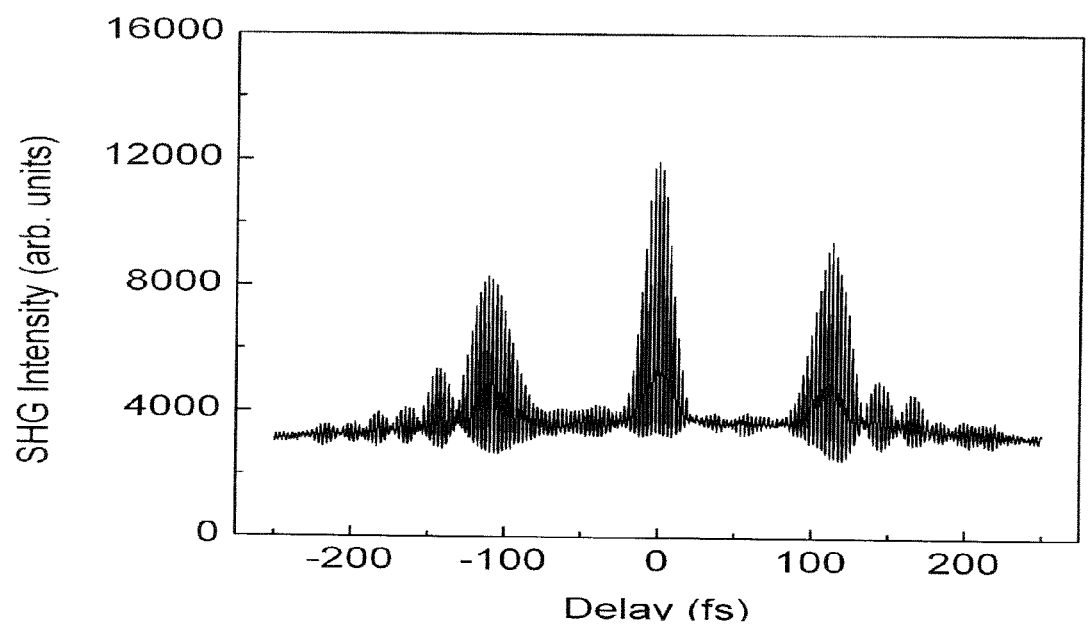
FIG. 6 is a graph of an expected pulse train containing a transform-limited pulse at t=0, and pulses with negative and positive third order dispersion at positive and negative 100 fs. This pulse sequence happens to be symmetric but there is no limitation to symmetric pulse sequences. The variable waveform generation AWG will be able to generate any type of pulse sequences.

FIG. 6 is a graph of an expected pulse train containing a transform-limited pulse at t=0, and pulses with negative and positive third order dispersion at positive and negative 100 fs. This pulse sequence happens to be symmetric but there is no limitation to symmetric pulse sequences. The variable waveform generation will be able to generate any type of pulse sequences.

The expected results represented a simplified example of the system using a variable waveform generator with 640 pixels that create 8+1 pulses. It is preferable, however, to generate at least 32 pulses in order to use it with secure communications applications. Therefore, four times more pixels will be needed. Furthermore, the present system may cause the appearance of satellite peaks several thousands of femtoseconds before and after the central pulses as previously discussed, however, controller software algorithm that uses pseudorandom number sequences to create the replica pulses will greatly reduce these satellite peaks. This approach will greatly benefit from much greater number of pixels. The use of multiple subpulses for nonlinear biomedical imaging is expected to reduce laser induced damage. Thus, the present system is ideal for creating multiple subpulses but without using cumbersome pulse divider using partially reflecting mirrors.

The typical pulse and subpulse durations envisioned are between 5 to 500 fs. The nonlinear optical interference created between different frequencies but otherwise identically replicated subpulses enhances interferometric autocorrelation but without the need of mechanically moving optics; the present system does it with the less complex and more accurate computer controlled pulse shaper. Furthermore, the present system does not require a separate device to block the light.

Cross Correlation:

For a given pulse with given spectral phase and spectrum, the pulse is divided into two or more subpulses. Each subpulse is individually delayed (see SPAC or iSPAC). When two pulses are delayed and a nonlinear optical signal is collected that depends on both (for example the second harmonic generation, and preferably it is detected with a spectrometer) then a cross-correlation between these two subpulses is obtained. When the SHG is dispersed, the equivalent of a frequency resolved and time resolved information is obtained, which can be interferometric (iSPAC) or non-interferometric (SPAC).

The pulse is thereby optimized for some particular task such as transmitting through a microscope objective for biomedical imaging or for micromachining. It is then possible to select a subpulse that is transform limited and cross-correlate it with a subpulse that is optimized for the other task. The cross correlation involves using a linear phase to delay one of the sub pulses with respect to the other and to collect a nonlinear signal (preferably the second harmonic generation SHG, and preferably it is detected with a spectrometer), which depends on both pulses. This cross correlation provides time and frequency resolved information on the optimum pulse for the task.

Reducing Photobleaching and Photodamage in Biomedical Imaging:

Splitting the pulse into multiple pulse replicas by partially reflective optics reduces the amount of photobleaching and photodamage that femtosecond pulses induce on the biological specimen. The reason why this works is because it takes one strong pulse and breaks it into multiple replicas (less intense pulses at a higher repetition rate). This task is carried out by the present system using the pulse shaper very easily without the need of any additional optics. Furthermore, adjusting to the optimal number of pulses and the time delay between them can be accomplished by software and voltage changes in the pixels (no moving mechanical parts), and this is much more convenient than aligning beam splatters and mirrors.

Micromachining:

Micromachining uses an ultrashort pulse to ablate material in a timescale faster than thermal energy transport. When fast micromachining rates are desired, a more intense ultrashort pulse causes thermal damage. This is because at higher intensity the ultrashort pulse behaves as a longer pulse. It is therefore advantageous to split the ultrashort pulse into several subpulses that are just under the thermal threshold. The time between the pulses can be further adjusted to minimize thermal conduction. The time can be chosen to cancel impulsive phonon transmission by timing the consecutive subpulses.

Secure Communications:

With this technology it is very easy to generate many sub-pulses. With the 12,288 SLM, 128 individually addressable subpulses are generated. These are useful for 128-bit communications. The amplitude of each pulse can be controlled to get 0 and 1 values for binary communication. An encryption key can be easily added to the binary code. The time delay between the pulses can also be controlled and set to a particular value. In addition, an extra sub-pulse can be used to sweep across all the other pulses to facilitate reading the information without the need for a synchronized laser for the reading function. Alternatively, a laser pulse synchronized with the sending pulse needs to be correlated with the message pulse to read it. With the 640, 8 pulses are generated and used for 8-bit communications.

In yet another aspect, the technique of the present system can be combined with MIIPS to provide verification that the pulses are transform limited. This technique is useful to modulate the phase of pulses between the oscillator and the amplifier. This technique can be used to obtain four-wave mixing spectroscopic signals from pathogens and from explosives. See, for example, PCT Patent Publication No. WO 2007/064703 entitled "Laser Based Identification of Molecules Characteristics" to Dantus et al., which is incorporated by reference herein. This technique can be used to generate individually tailored sub-pulses in the teraHertz region of the spectrum. That region of the spectrum is very useful for detection of explosives and weapons because it can see through clothing, boxes and some containers. This technique can be used for metrology. This would be to measure the thickness of coatings with sub-micron precision. This technique can be used with amplified laser pulses to control the bonding cleavage of large biomolecules like proteins and metabolites and their ions.

In one aspect of the present laser system, a method of using such a system is carried out as follows:

(1) A first portion onset of the SLM pixels is selected (e.g., every other pixel, every third pixel, random pixels, etc.).

(2) The computer controller supplies a mathematical function to the selected first portion. For example, a linear phase function is used where the slope determines temporal delay.

(3) A second and different portion or set of the SLM pixels is selected.

(4) The controller supplies a different function to the second portion.

(5) The controller controls both functions. The uncontrollable gaps in between the pixels of the SLM are considered to have a zero function. The pulse shaper thereby splits the original pulse into two subpulses.

(6) The laser output undergoes a nonlinear optical ("NLO") process.

(7) A spectrometer detector measures the NLO signal from the pulses and sends a corresponding signal to the controller for analysis or display.

(8) The controller then changes the slope or other characteristic of the function applied to one or both of the portions of the SLM shaper.

(9) The above steps are repeated until the replica subpulses are one or more pulse durations apart from each other as automatically measured by the detector.

A method of using another aspect of the present laser system includes:

(1) emitting at least one laser pulse;

(2) shaping the pulse with a phase-only modulator;

(3) separating the pulse into at least two replica subpulses by using a phase in the modulator that interacts with only some of the frequencies of the pulse but not all of the frequencies of the pulse; and (4) measuring a characteristic of at least one of the subpulses after step (c);

(5) supplying a linear phase function to only some of the pixels of the modulator for at least one of the subpulses; and (6) supplying a different phase function to other of the pixels of the modulator for at least another of the subpulses, simultaneously with step (e).

(7) As another option, the shaper is a two-dimensional phase mask which supplies different functions to a single pulse.

A method of using another aspect of the present laser system includes:

(1) separating a laser pulse into at least two subpulses; and (2) shaping a chirped sub-pulse with a first phase and shaping an unchirped sub-pulse with a second phase, in a piecewise manner; and (3) shaping the pulse with a phase and polarization modulator.

A method of using another aspect of the present laser system includes:

(1) generating and characterizing of optical pulse trains where a spectral phase of every laser pulse in the train is independently controlled;

(2) using portions of a frequency comb that sample the original and/or entire pulse spectrum to generate a train of pulse replicas;

(3) imposing the desired phase mask on each of the sub-pulse spectra;

(4) thus creating a piecewise phase function across the original and/or entire pulse spectrum to generate the desired pulse sequence; and (5) obtaining frequency-resolved autocorrelation of the pulse at the focus by creating at least two pseudo-replicas and recording a second harmonic generation spectrum as a function of their relative time delay.

A method of using another aspect of the present laser system includes:

(1) emitting a laser pulse;

(2) shaping the pulse;

(3) splitting the pulse into subpulses being identical to the original pulse except having different frequencies;

(4) causing interference between the subpulses; and (5) measuring interferometric autocorrelation of the subpulses;

(6) the interference being destructive;

(7) measuring a carrier frequency of at least one of the subpulses;

(8) changing a carrier frequency of at least one of the subpulses; and (9) changing the interference with a pulse shaper and without mechanical component movement.

Any of these methods can be used to direct the pulse train, for example, onto a workpiece or specimen surface for improved ablation, as compared to a single pulse.

Frequency Comb Source:

FIG. 9 illustrates another embodiment of the present laser system where P1,2 are SF-11 prisms, G is a 600/mm ruled grating, SM is a spherical mirror, SLM is a spatial light modulator, NDF is a neutral density filter, DM is a dichroic mirror, XY is a 2D laser beam scanner, L1-4 are lenses, MO is a microscope objective, SA is a sample, F is a shortpass emission filter, PMT is a photomultiplier tube, Spec. is a spectrometer, FB is a fiber bundle, and TCSPC is a time-correlated single-photon counter. This exemplary laser system includes five major blocks: a pulse laser of the design shown in FIG. 7, a prism-pair compressor, a folded 4 f pulse shaper, a laser scanning microscope, and an acquisition system. The laser produces a train of infrared ("IR") femtosecond pulses with full-width-at-half-maximum ("FWHM") spectral bandwidth of 100 nm, centered at the wavelength of the two CW lasers. The laser output beam, after collimation, is sent through a SF11 prism-pair compressor, which serves two purposes. First, it compensates for SOD, acquired by the laser pulse along the optical train. Second, it allows for a direct comparison with prism-pair compensated systems used elsewhere.

After the prism subsystem, the IR beam is coupled into the folded 4 f pulse shaper. The spectral components of an ultrashort laser pulse are dispersed by a plane-ruled reflection grating (600 line/mm; Newport Corp., CA) and then focused with a 3-in. (1 in.=25.4 mm) silver-coated f=500 mm spherical mirror (Thorlabs, Inc., NJ) onto a 640-pixel liquid-crystal single-mask SLM (CRi SLM-640-P, Cambridge Research & Instrumentation, Inc.). The pulse shaper is calibrated and controlled by MIIPS software (BioPhotonic Solutions, Inc., MI). The total throughput of the pulse-shaping system, from the laser to the 4 f shaper output is estimated to be slightly above 50%, due to multiple reflections from metallic mirrors and two reflections from the grating.

The laser beam is scanned by a pair of mirrors that oscillate in the x and y directions. A dichroic filter (700DCSPXR, Chroma Technology Corp.) in front of the galvanic scanner (QuantumDrive-1500, Nuffield Technology, Inc.) separates the collected fluorescence or SHG signal and the scattered excitation light. A 3:1 lens telescope, imaging the scanning mirrors to the back aperture of a microscope objective, is used to expand the laser beam and overfill the objective input lens. The water-immersion objective (Zeiss LD C-APOCHROMAT 40×/1.1, working distance of 0.62 mm for a 0.17 mm thick cover glass) is mounted in an adapted Nikon Eclipse TE-200 inverted microscope, fed through the mercury lamp port. The TPEF (or SHG) signal is collected by the same objective. By switching between a dichroic filter and a metallic mirror, it is then either coupled into a fiber bundle that guides the acquired photons into a multi-channel time-correlated single-photon counter (TCSPCSPC-830, Becker&Hick] GmbH, Germany) or gets de-scanned and focused onto a photomultiplier tube (PMT, HC120-05MOD, Hamamatsu). The signal recording and beam scanning are synchronized by a computer through a data acquisition board (PCI-6251, National Instruments).

For MIIPS compensation, a SHG signal from a thin non-linear crystal (<100-μm KDP crystal) at the focal plane of the objective, is collected in a forward direction and fiber-coupled into a spectrometer (USB4000, Ocean Optics, Inc.). The SHG spectrum is recorded while a sine function with the known amplitude, period, and phase is scanned across the pulse spectrum. From the peak position of the SHG spectrum, the computer uses a software algorithm to retrieve the second derivative of the unknown phase and constructs the compensation phase mask. Several consecutive iterations, made by MIIPS software, insure an accurate correction of the phase distortion.

Figure 7:
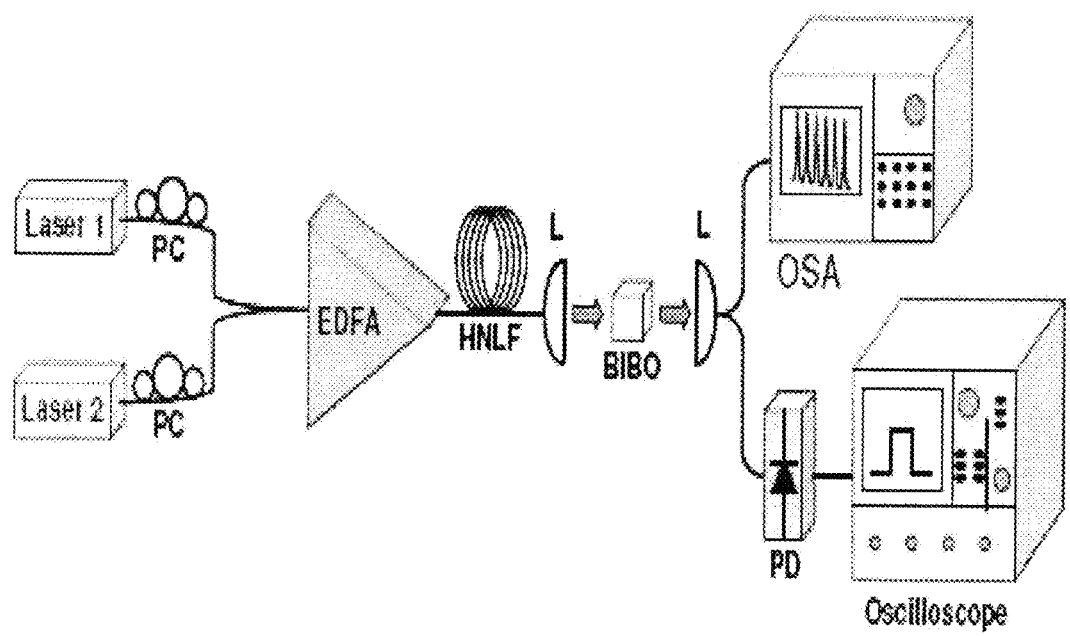
FIG. 7 is a diagrammatic view of a laser system used to generate an optical frequency comb OFC by cascaded four wave mixing FWM in a highly nonlinear fiber. Lasers 1 and 2 are standard telecom extended-cavity semiconductor lasers.

The present system further exploits the stability and low cost of the continuous wave ("CW") lasers by using a pair of amplified telecommunication CW diode lasers to generate ultrashort pulses resulting in a source with the capabilities of a traditional ultrafast laser and the stability and cost of a CW laser. FIG. 7 shows a laser system used to produce a cascaded FWM frequency comb. Two extended-cavity telecommunication semiconductor lasers provided CW, single-frequency output powers of 10 dBm each, and are tuned through S, C and L-bands, from 1440 to 1620 nm. The two lasers are combined and amplified by two cascaded Erbium Doped Fiber Amplifiers (EDFAs, represented as a single one in the figures). The first EDFA is a pre-amplifier with a typical average output power of 15 mW, whereas the second one is a booster with average output power up to 1 W. In order to obtain high peak powers, these pump signals passed through an amplitude modulator, which produced pulses typically 40-ns long with low duty cycle (7 is separation). Peak powers of ~8 W are used for each laser. In addition, a phase-modulator is used. The pulses were then sent to two segments of low-dispersion HNLFs (from Sumitomo), and the generated spectrum is analyzed in an optical spectrum analyzer. The parameters for the first and second fiber segments were, respectively: lengths $L_1$=15 m and $L_2$=5 m; nonlinear coefficients $y_1$=15 $W^{-1}$ $km^{-1}$ and $y_2$=10 $W^{-1}$ $km^{-1}$; zerodispersion wavelengths $\lambda_{01}$=1570 nm and $\lambda_{02}$=1530 nm; dispersion slopes $S_{o1}$=0.015 ps/nm²/km and $S_{02}$=0.02 ps/nm²/km.

FIG. 8 shows the expected full nonlinear conversion of the comb by second harmonic generation. Second harmonic or sum frequency generation between two single-frequency lasers require only matching of phase velocities, which can be achieved by birefringence or temperature tuning. For broadband light sources, such as femtosecond lasers or a FWM-fiber-comb, broadband sum-frequency generation requires, in addition, also matching of the group velocities and the group velocity dispersion ("GVD"). For short pulses (<100 fs), with large bandwidths, matching of high-order dispersion terms, such as cubic and fourth order dispersion, is also required. For this reason thin crystals are usually employed for broadband input sources (or ultrashort pulses), minimizing group velocity mismatch but also leading to smaller efficiencies. Even for thin crystals, the bandwidth of second harmonic generation is limited by the spectral phase of the fundamental laser. Since each generated frequency at 2 f results from the simultaneous contribution of all frequency pairs symmetrically displaced from f, if the phase varies along the spectrum, each of those pairs will produce its sum frequency with a corresponding different phase, leading to destructive interference and low output power. If however the spectral phase is constant, corresponding to TL pulses, thin crystals can generate the broadest second harmonic spectrum.

As shown in FIG. 7, the setup for second harmonic and sum frequency generation consists simply of focusing the output of the HNLF into a nonlinear crystal. 2-mm and 100-µm long crystals (AR-coated, cut for critical phase matching at room temperature, with θ=10.9°, φ=0°) are employed, whose expected SH spectra are plotted in FIG. 2, together with the corresponding fundamental spectra. For SHG and SFG of 1.55 µm, BBO is a good choice since it has an extremely large phase matching bandwidth (600 nm is calculated for a 10 mm long crystal). BIBO, another crystal for the same family is preferred, whose phase-matching bandwidth at 1.55 µm is 250 nm for the 2-mm long crystal. Compared to BBO, it has higher (9%) nonlinear coefficient, larger (48%) acceptance angle and less (60%) walk-off than BBO. The second harmonic power was estimated from the incident powers and the crystal efficiency. For fundamental peak powers of 8 W at ω1=2 nπc/1562 nm and $f_2$=2πc/1565 nm, the maximum second harmonic peak power at 782 nm is estimated from the nonlinear coefficient ($\eta$=3.7×10$^{-5}$ $W^{-1}$ for the 2-mm BIBO crystal), under optimum focusing conditions [24], as $P_{(\omega1+\omega2)}=\eta P_{\omega1} P_{\omega2}$=2.4 mW. The estimated average power is 14 µW, for 40 ns pulses separated by 7 µs. In FIG. 2a, 61 fundamental frequencies (including the pump lasers) generate 122 comb lines centered at 790 nm and separated by 0.8 nm (380 GHz) in a 100-nm bandwidth. In FIG. 2b (for the 100 µm crystal), a SH bandwidth of 120 nm is achieved, with frequency spacing of ~1 nm (480 GHz). The frequency spacing in the fundamental spectrum is preserved in the second harmonic because each fundamental frequency f produces its second harmonic at 2 f, but each frequency pair symmetrically located around f produces a sum frequency in between. In addition, each SH frequency also has contributions from multiple SFG between many line pairs. Higher nonlinear conversion efficiency can be obtained by using longer crystals, while still keeping large phase-matching bandwidths. For comparison, the efficiency of second harmonic generation (SHG) in combs produced in silica microresonators might be largely limited by the relatively low fundamental power.

Reference should now be made to FIGS. 7, 8 and 10. By introducing a pair of intense CW lasers with different frequencies (say $f_1$, and $f_2$) into a highly nonlinear index fiber where multiple-wave mixing takes place, hundreds of different laser lines with frequencies $f_1+f_2$, 2 $f_1-f_2$, 2 $f_2-f_1$, 3 $f_1-2 f_2$, 3 $f_2-2 f_1$, i.e., are created. This process for creating a wide band of frequencies, which is necessary but not sufficient to create ultrashort pulses, has already been demonstrated in labs elsewhere. To achieve ultrashort pulse generation, it is necessary to control the phase of each frequency component of the output. When the phases of all the frequencies in the bandwidth are brought to the same value, ultrashort (<10 fs) pulses will result, using an inexpensive and durable ultrashort pulse laser built from inexpensive CW diode lasers and used for biomedical imaging. A loop is constructed so that one pulse from the source, gates' a subsequent pulse by a coherent frequency mixing process such as degenerate four wave mixing or by second harmonic generation. This would eliminate the continuous wave component and leave only the pulsed component. Using some polarization control (introducing some circular rotation on the gating pulses) on the gating loop it would be possible to further clean the source from being a train of femtosecond pulses to being a source of single femtosecond pulses. The laser system of the present application uses a first laser pulse to time gate a second laser pulse. A nonlinear optical medium, such as crystal or polymeric optic, is placed where the two pulses meet. Hence, a less expensive CW laser can be used. By combining two or more CW lasers in a nonlinear medium (such as a fiber) one is able to drive the creation of multiple laser lines that are coherent and travel collinearly with the beam. By adjusting the phase of these lines, an operator is able to create ultrashort pulses. FIG. 10 shows how the present system cleans-up the pulse trains one can use SHG or the optical delay. Alternatively, the output can be focused on a second crystal such as quartz, sapphire or barium fluoride to create an even broader and smoother output spectrum. Finally, the output could also be used to drive an optical parametric amplifier, which would then have a broader output that could be tuned in wavelength. Unlike in prior systems, by adjusting the phase of these lines (which also requires locking the phase between the two CW beams), one is able to create ultrashort pulses. Based on the bandwidth, the pulses that can be generated are as short as 5-25 fs. In contrast, prior systems did not lock the two lasers or adjust the phase of all the frequencies generated, did not further clean up the trains of pulses into single ultrashort pulses, and did not measure what the duration of the ultrashort pulse was.

The system is used for a wide range of imaging research projects including exploring morphological differences in heart muscle resulting from high-fat diets, and to study the failure of tendons. The laser-scanning microscope will allow nonlinear optical approaches for example second harmonic imaging which has been proven ideal for imaging muscle and tendon tissue. The source will also facilitate research into material processing and micromachining as disclosed in PCT Patent Publication No. WO 2007/145702 entitled, "Laser Material Processing System" to Dantus, which is incorporated by reference herein.

MICS:

FIG. 11 shows pulse self-characterization via multiple-independent-comb shaping ("MICS"). The green lines (such as in the left column of FIG. 11) indicate a first pulse and the blue lines (such as the central column of FIG. 11) indicate a second pulse.

MICA and i-MICA Measurements:

The difference between multiple-independent-comb assisted autocorrelation ("MICA") and interformetric multiple-independent-comb assisted autocorrelation ("i-MICA") procedures is presented schematically in FIG. 11. For MICA, the encoded linear phase function takes zero value at the chosen carrier frequency $\omega_c$; in other words, it does not affect the field phase at $\omega_c$. It causes the pulse envelope to shift in time but does not preserve its absolute phase, as illustrated in FIG. 11(a), which shows expected pulse shaping for MICA. When pulse shaping for i-MICA, shown in FIG. 11(b), the linear phase function crosses zero at $\omega=0$. It shifts the pulse while keeping its absolute phase intact. This is ideal for a mechanical optical delay line.

Characterization of the Amplifier Output:

Referring to FIG. 12, MICS-based pulse characterization is employed on an amplified laser system (FIG. 12(a)) when a pulse shaper (preferably using a MIIPS Box from BioPhotonics Solutions, Inc.) is located between the laser oscillator (preferably obtained from KM Labs of Boulder, Colo.) and a regenerative amplifier (preferably using a Spitfire model from Spectra Physics). The linear one-dimensional SLM has 128 pixels (preferably a Cri SLM-128-P model).

Pulse characterization at the output of an amplified laser system is shown in FIG. 12(a). The system includes a non-linear crystal NL and a color filter F (of a BG39 type). FIG. 12(b) shows an output laser spectrum, and FIG. 12(c) illustrates expected MICA and i-MICA traces. The autocorrelation FWHM corresponds to a pulse duration of 34.2 fs.

The laser preferably employs a pulse duration less than one picosecond and a pulse shaper is capable of introducing at least two different phase functions, each sampling the available spectral bandwidth of the pulse. This creates pulse replicas with the same pulse duration as the original pulse. The replicas can be controlled in their relative amplitude, bandwidth, duration, inter-replica time delay, and absolute phase between replica pulses, by a computer controller, software instructions (stored in the computers' memory) and the pulse shaper. This control is provided by distributing each phase function across the spectrum of the pulse. The laser beam pulse acts upon a target specimen or workpiece. Optionally, an amplifier may be employed.

When measuring, a detector operably detects nonlinear optical excitation, which may include at least one of: two photon absorption, two photon fluorescents, two photon ionization, second harmonic generation, third harmonic generation, multiphoton ionization, and the like. The detector integrates the frequency response or, alternately, may disperse the response to provide a spectrum. For machining, the pulse shaper is used to create multiple pulse replicas and controls their pulse duration, the enter-pulse separation and their intensity, in order to optimize the ablation of the target. Such optimization can speed up the process while minimizing or preventing thermal damage. In this situation, the target can be a solid such as silicon, gallium arsenide, diamond, quartz, silica, tissue, or a cornea. For biomedical imaging, the pulse shaper is used to create multiple pulse replicas and controls their pulse duration, the inter-separation and intensity, in order to optimize fluorescence or nonlinear optical signals from the target.

For pulse characterization, the method characterizes an amplified system in which the phase of the input pulse to the amplifier gets shaped in such a way as to measure the output pulses using a simple detector that can be placed at the target. The pulse is measured by autocorrelation. If phase distortions are found, then the software instructions causes pulse shaper to correct them; the system then re-measures and/or obtains a cross-correlation between the corrected and uncorrected pulse replicas. It is noteworthy that nonlinear optical interference can be obtained at the output which serves as an internal reference to calibrate the measurement, but this is not linear interference. Linear interference would cause the amplifier to shut down, however, in the present situation, the amplifier is unaffected by the method. Without the present method, the system would otherwise need a dedicated pulse measurement device and a pulse measurement could not be done at the target but less desirably, at the device. For example, many conventional pulse measurement methods cannot correct phase distortions since they only measure them. An additional option provides an additional reference pulse which can be programmed or created by the pulse shaper. The reference pulse scans across the pulse sequence in order to provide a cross-correlation of the sequence.

Pulse Sequence Coding Via Binary Shaping:

There are at least two simple approaches to generate "0 states" in a given pulse train. Referring to the first approach of FIG. 13(a), the phase of every other pixel within a single comb tooth (and every tooth) is shifted by $\pi$ relative to the phase of its neighbor. The implied assumption is that the comb teeth are assigned an even number of SLM pixels (2 pixels in this case). Referring to FIG. 13(b), the second approach uses a similar comb tooth width (i.e., the same number of pixels per tooth). The two approaches give almost the same expected result but with two minor points in favor of the second approach. For the 3+1 pulse sequence, the second approach gives better fidelity in cancellation of pulses 1 and 3. Also, binary shaping in the first approach slightly affects the amplitude of other pulses. It is believed that both effects are due to more pronounced cross-talk between SLM pixels, when the first approach is used. Finally, the second technique imposes no restrictions on the number of SLM pixels per comb tooth; even one pixel per tooth suffices.

This feature of the present system and method provides a laser pulse having a duration shorter than one picosecond. A pulse shaper introduces at least two distinct phase functions with each sampling the available spectral bandwidth of the pulse. This creates pulse replicas with the same pulse duration as the original pulse. A computer controller, software instructions and the pulse shaper serve to automatically control the replicas and their relative amplitude, bandwidth, duration, inter-replica time delay and absolute phase between replica pulses. This is carried out by distributing each phase function across the spectrum of the pulse while creating pulse sequences encoded with information. A detector operably detects the pulse sequences based on a nonlinear optical process.

The way to create missing impulses in a sequence (i.e., the zeros), can be provided as follows. For a given replica that needs to be cancelled, the computer and software causes the shaper to introduce π phase shifts in contiguous pixels, and the total number of zero and π pixels is equal. Another approach provides that for a given replica that needs to be cancelled, the computer and software cause the shaper to introduce π phase shifts in alternate phase locations so that the total number of zero and π pixels is equal. Moreover, another approach distributes the pixels of the missing pulse among the other pulses; this is expected to provide good results but changes the intensity of the other pulses. As an option, an additional reference pulse can be programmed or introduced by the pulse shaper. The reference pulse scans across the pulse sequence in order to provide a cross-correlation of the sequence.

The foregoing description of the embodiments has been provided for purposes of illustration and description. The disclosed embodiments make use of pulsed laser sources, however, changes in the type of laser used, for example, Ti-Sapphire, Yterbium, and Erbium, whether amplified or not, can all be employed. Similarly, there are many different ways to modify the phase of the different frequency components, for example, liquid crystal, acousto-optic modulators, deformable mirrors, tilting mirrors, and moving mirrors. The disclosed embodiments are not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the present invention.

The invention claimed is:

1. A method of using a laser system, the method comprising:
   (a) emitting at least one laser pulse;
   (b) shaping the pulse with a phase-only modulator;
   (c) separating the pulse into at least two replica subpulses by using a phase in the modulator that interacts with at least two frequency subsets of the pulse, each subset representing a pulse;
   (d) measuring a characteristic induced by at least one of the subpulses after step (c);
   (e) supplying a linear pulse function to only some pixels of the modulator for at least one of the subpulses; and
   (f) supplying a different phase function to other of the pixels of the modulator for at least another of the subpulses, simultaneously with step (e).

2. The method of claim 1, wherein the shaper is a two-dimensional phase mask which supplies the different functions to a single pulse.

3. The method of claim 1, wherein the measured characteristic is a duration of the pulse.

4. The method of claim 1, wherein the measured characteristic is autocorrelation.

5. The method of claim 1, wherein the measured characteristic is cross-correlation.

6. The method of claim 1, wherein the modulator is a programmable spatial light modulator, and the subpulses are temporally separated.

7. A method of using a laser system comprising:
   (a) separating a laser pulse into at least two subpulses in time but not in space;
   (b) independently shaping each of the subpulses using different chirp functions in a piecewise manner, performing the shaping of the subpulses with a phase-only modulator;
   (c) supplying a first shaping function to some pixels of the modulator for the one of the subpulses; and
   (d) supplying a second and different shaping function to some pixels of the modulator for at least a second of the subpulses.

8. The method of claim 7, further comprising shaping the pulse with a phase-only modulator.

9. The method of claim 7, further comprising shaping the pulse with a phase- and polarization-only modulator.

10. The method of claim 7, further comprising using software instructions to automatically vary a pulse shaper to shape the subpulses.

11. The method of claim 7, further comprising generating and characterizing optical pulse trains where a spectral phase of every laser pulse in the train is independently controlled.

12. The method of claim 7, further comprising using the laser pulse for machining a workpiece.

13. The method of claim 7, further comprising using the laser pulse for biomedical imaging.

14. A method of using a laser system comprising:
   (a) separating a laser pulse into at least two subpulses in time but not in space;
   (b) independently shaping each of the subpulses using different chirp functions in a piecewise manner; and
   (c) characterizing the laser pulse in which the phase of an input pulse to an amplifier is shaped to enable measuring of the output pulse using a spectrometer located substantially at a target, and without requiring mechanical movement of any optics during operation.

15. The method of claim 14, further comprising performing the shaping of the subpulses with a phase-only modulator, supplying a first shaping function to some pixels of the modulator for the one of the subpulses, and supplying a second and different shaping function to some pixels of the modulator for at least a second of the subpulses.

16. A method of using a laser system, the method comprising:
   (a) generating and characterizing optical pulse trains where a spectral phase of every laser pulse in the train is independently controlled;
   (b) splitting a laser spectrum into at least two groups of frequencies distributed over an entire spectrum bandwidth;
   (c) adjusting the two groups of frequencies such that a desired amplitude and bandwidth for each subpulse is achieved;
   (d) imposing the desired phase mask on each of the subsets of frequencies; and
   (e) creating a piecewise phase function across the original spectrum to generate a desired pulse sequence.

17. The method of claim 16, further comprising using a frequency comb to generate the multi-pulse train.

18. The method of claim 16, further comprising obtaining frequency resolved autocorrelation of the pulse at the focus by creating at least two pseudoreplicas and recording a second harmonic generation spectrum as a function of their relative time delay.

19. The method of claim 16, further comprising shaping the subpulses with a phase-only modulator, supplying a first shaping function to some pixels of the modulator for the one of the subpulses, and supplying a second and different shaping function to some pixels of the modulator for at least a second of the subpulses.

20. The method of claim 16, further comprising using software instructions to automatically vary a pulse shaper to shape the subpulses.

21. The method of claim 16, further comprising using the laser pulse for machining a workpiece.

22. The method of claim 16, further comprising using the laser pulse for biomedical imaging.

23. The method of claim 16, further comprising detecting nonlinear optical excitation in the laser pulse.

24. A method of using a laser system, the method comprising:
   (a) emitting a laser pulse;
   (b) shaping the pulse;
   (c) splitting the pulse into subpulses being of identical duration to the original pulse except having different frequencies;
   (d) causing nonlinear optical interference between the subpulses, and changing the interference with a pulse shaper and without mechanical component movement; and
   (e) measuring interferometric correlation between the subpulses.

25. The method of claim 24, wherein the interference is constructive.

26. The method of claim 24, wherein the interference is destructive.

27. The method of claim 24, further comprising temporally delaying one interfering subpulse from another.

28. The method of claim 24, further comprising measuring a carrier frequency of at least one of the subpulses.

29. The method of claim 24, further comprising changing a carrier frequency of at least one of the subpulses.

30. The method of claim 24, further comprising encoding communications information into the subpulses with a pulse shaper.

31. The method of claim 24, further comprising using the subpulses for optical imaging.

32. The method of claim 24, further comprising using the subpulses to micromachine a workpiece.

33. The method of claim 24, further comprising double passing the pulse through the pulse shaper to reduce space-time coupling.

34. The method of claim 24, wherein the correlation is autocorrelation.

35. The method of claim 24, wherein the correlation is cross-correlation.

36. A method of using a laser system, the method comprising:
   (a) emitting at least one original laser pulse, each having a duration of less than 1 picosecond;
   (b) shaping the original laser pulse with at least two distinct phase functions;
   (c) using each phase function to sample available spectral bandwidth of the original pulse;
   (d) creating pulse replicas, each having the same pulse duration as the original pulse;
   (e) controlling the replica pulses by distributing each of the phase functions across the spectrum of the associated pulse;
   (f) creating an additional reference pulse with a pulse shaper and software instructions; and
   (g) causing the reference pulse to scan across a pulse sequence to provide a cross-correlation of the sequence.

37. The method of claim 36, further comprising controlling relative amplitude between the replica pulses.

38. The method of claim 36, further comprising controlling relative bandwidth between the replica pulses.

39. The method of claim 36, further comprising controlling relative duration between the replica pulses.

40. The method of claim 36, further comprising controlling relative inter-replica time delay between the replica pulses.

41. The method of claim 36, further comprising controlling absolute phase between the replica pulses.

42. The method of claim 36, further comprising using the laser pulse for machining a workpiece.

43. The method of claim 36, further comprising using the laser pulse for biomedical imaging.

44. The method of claim 36, further comprising detecting nonlinear optical excitation in the laser pulse.

45. The method of claim 36, further comprising characterizing the laser pulse in which the phase of an input pulse to an amplifier is shaped to enable measuring of the output pulse using a spectrometer located substantially at a target, and without requiring mechanical movement of any optics during operation.

46. A method of using a laser system, the method comprising:
   (a) emitting at least one original laser pulse, each having a duration of less than 1 picosecond;
   (b) introducing at least two distinct phase functions by pulse shaping;
   (c) creating pulse replicas, each having the same pulse duration as the original pulse;
   (d) distributing each phase function across the spectrum of the associated pulse;
   (e) encoding pulse sequences with information;
   (f) detecting the pulse sequences based on a nonlinear optical process;
   (g) creating an additional reference pulse; and
   (h) causing the reference pulse to scan across a pulse sequence to provide a cross-correlation of the sequence.

47. The method of claim 46, further comprising introducing $\pi$ phase shifts in contiguous pixels of a pulse shaper, where the total number of zero and $\pi$ pixels is equal, if a given replica pulse needs to be cancelled.

48. The method of claim 46, further comprising introducing $\pi$ phase shifts in alternate phase locations, where the total number of zero and $\pi$ pixels is equal, if a given replica pulse needs to be cancelled.

49. The method of claim 46, further comprising a pulse shaper and software instructions creating the additional reference pulse.

50. The method of claim 14, further comprising using a spectrometer to send a signal to a controller containing software that automatically controls and varies a pulse shaper.

51. The method of claim 50, wherein the controller includes the software which causes the pulse shaper to introduce $\pi$ phase shifts in contiguous pixels of the shaper, where the total number of zero and $\pi$ pixels is equal, if a given replica pulse needs to be cancelled.

52. The method of claim 50, wherein the controller includes the software which causes the pulse shaper to introduce $\pi$ phase shifts in alternate phase locations, where the total number of zero and $\pi$ pixels is equal, if a given replica pulse needs to be cancelled.

53. The method of claim 14, wherein a duration of the laser pulse is less than 1 picosecond.

54. The method of claim 1, further comprising:

using CW diode lasers to generate the at least one laser pulse with a duration less than 10 fs; and generating an optical frequency comb with at least one nonlinear fiber.

55. The method of claim 1, further comprising:

using the at least one laser pulse for microscopy; and performing the separating and measuring steps with programmed software instructions in a computer.

56. The method of claim 7, further comprising:

using CW diode lasers to generate multiples of the laser pulse, at least some of which having a duration less than 10 fs; and generating an optical frequency comb with at least one fiber.

\* \* \* \* \*